United States Patent [19]

Thompson et al.

[11] 4,375,090

[45] Feb. 22, 1983

[54] METHOD FOR INTERPRETING SEISMIC RECORDS TO YIELD INDICATIONS OF GAS/OIL IN AN EARTH FORMATION SUCH AS A SANDSTONE, LIMESTONE, OR DOLOSTONE

[75] Inventors: Don D. Thompson, Corona Del Mar; Robert J. S. Brown, Fullerton; Richard J. Runge, Anaheim, all of Calif.

[73] Assignee: Chevron Research Company, San Francisco, Calif.

[21] Appl. No.: 83,189

[22] Filed: Oct. 9, 1979

Related U.S. Application Data

[63] Continuation of Ser. No. 863,828, Dec. 23, 1977, abandoned.

[51] Int. Cl.³ .............................................. G01V 1/30
[52] U.S. Cl. ........................................ 367/73; 367/75; 364/421
[58] Field of Search ..................... 367/73, 75; 364/421

[56] References Cited

U.S. PATENT DOCUMENTS 3,241,102 3/1966 Peterson ................................. 367/75

OTHER PUBLICATIONS

Zemstova et al., "Rozvedochnaya Geofizika", 1966, pp. 3-17.

*Primary Examiner*—Nelson Moskowitz
*Attorney, Agent, or Firm*—H. D. Messner; Edward J. Keeling

[57] ABSTRACT

The present invention indicates that acoustic characteristics associated with gas/oil-containing strata such as a sandstone, limestone or dolostone, including reflectivity coefficients can be normalized (and favorably compared) with similar characteristics calculated and displayed by means of a machine-implemented data processing method in which well logging and geologic data are fed thereto to calculate such characteristics without the need for shear-wave velocities.

In more detail, in accordance with the invention brine-saturated bulk and shear moduli, (i.e., $Kw^*$ and $Gw^*$) of a sandstone, limestone or dolostone can be predicted as a function of, say, brine-saturated P-wave modulus ($Pw^*$) alone (independent of shear-wave velocity). In that way, resulting acoustic values including seismic velocities and amplitudes (also, reflectivities) as a function of a saturation operator can ultimately be provided. Such values, when compared to actual field-generated characteristics, are surprisingly accurate predictors of the amount of gas/oil saturation in the zone of interest. The method has particular accuracy in designating gas zones within formations of interest due to use of the complete Benedict-Webb-Rubin non-ideal gas law in pseudo-reduced form, as cited in *Journal of Current Petroleum Technology*, vol. 22, pp. 889-895.

10 Claims, 8 Drawing Figures

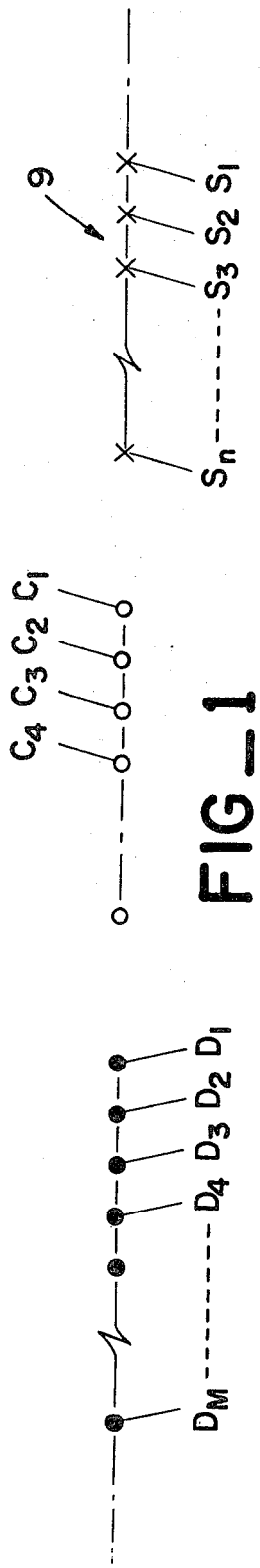
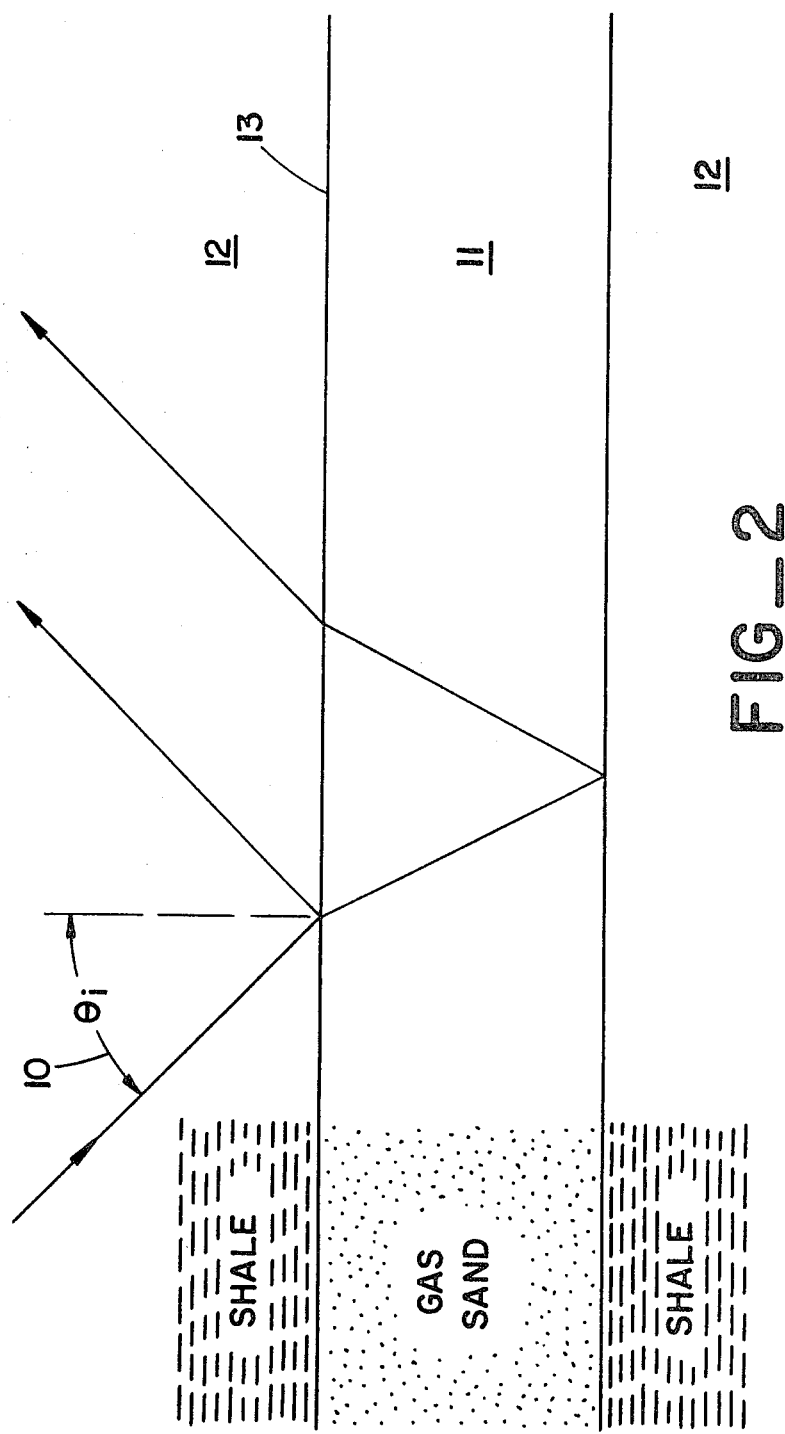

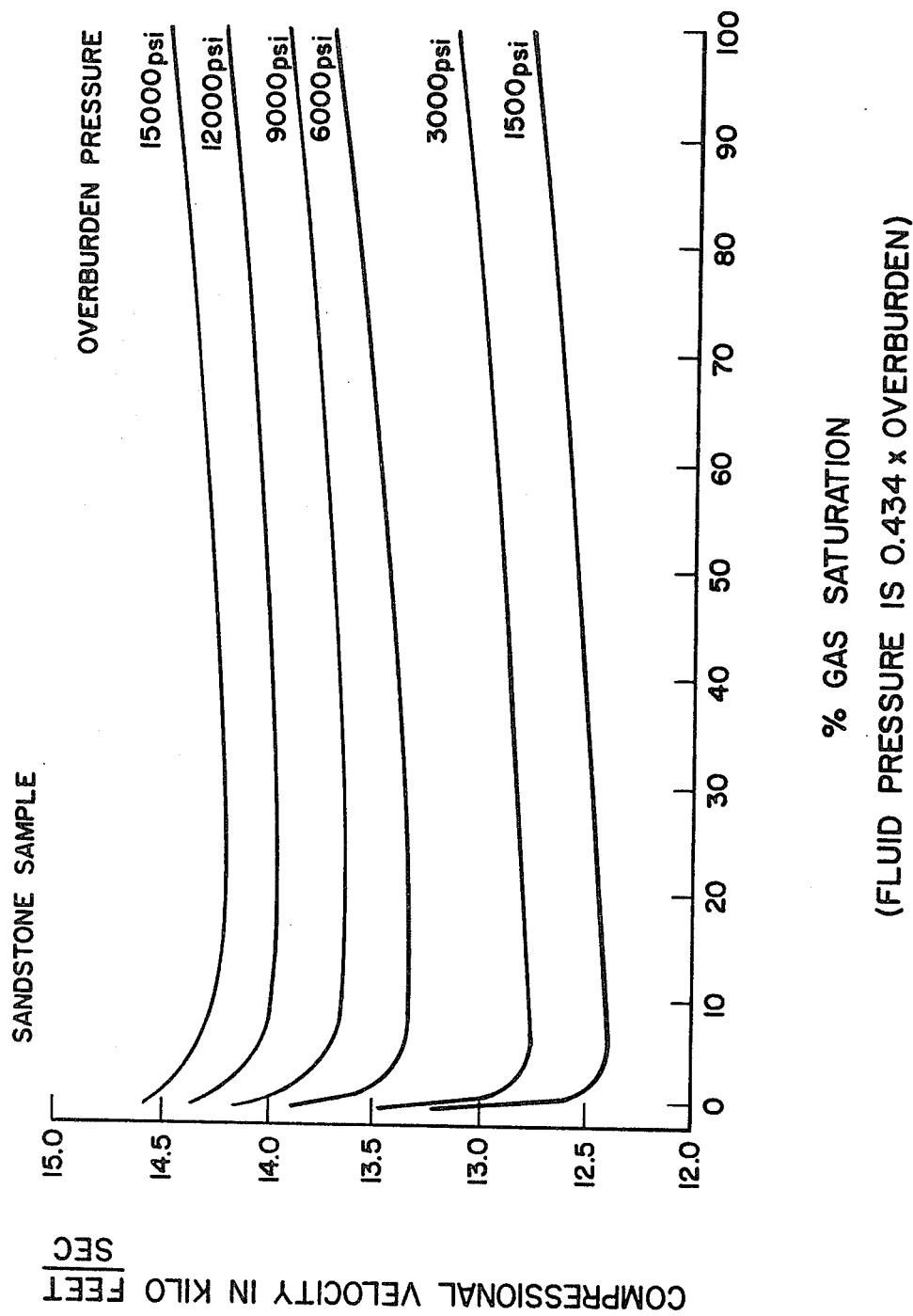
FIG_3

```
┌─────────────────────────────────────┐         ┌─────────────────────────────────────┐
│ FROM CALCULATED SYNTHETIC           │         │ COMPARE THE PREDICTED SYNTHETIC     │
│ PETROPHYSICAL PARAMETERS INCLUDING  │         │ ACOUSTIC PARAMETERS WITH SIMILAR    │
│ BRINE-SATURATED SHEAR AND BULK      │         │ FIELD ACQUIRED DATA SO AS TO        │
│ MODULI, FRAME MODULUS AND P-WAVE    │         │ PREDICT PRESENCE AND AMOUNTS OF     │
│ MODULUS VALUES, PREDICT SYNTHETIC   │─────────│ SAID OIL/GAS SATURATION IN THE      │
│ ACOUSTIC PARAMETER INCLUDING        │         │ SUBSURFACE ENVIRONMENT OF INTEREST  │
│ VELOCITIES AS A FUNCTION OF AN      │         │                                     │
│ OIL/GAS SATURATION IN A PARTICULAR  │         │                                     │
│ SUBSURFACE ENVIRONMENT              │         │                                     │
└─────────────────────────────────────┘         └─────────────────────────────────────┘
                    │                                              │
                    │         ┌──────────────────────┐             │
                    │         │ INCREMENT FOR A NEW  │             │
                    └─────────│ OIL/GAS SATURATION   │─────────────┘
                              └──────────────────────┘
```

FIG_4

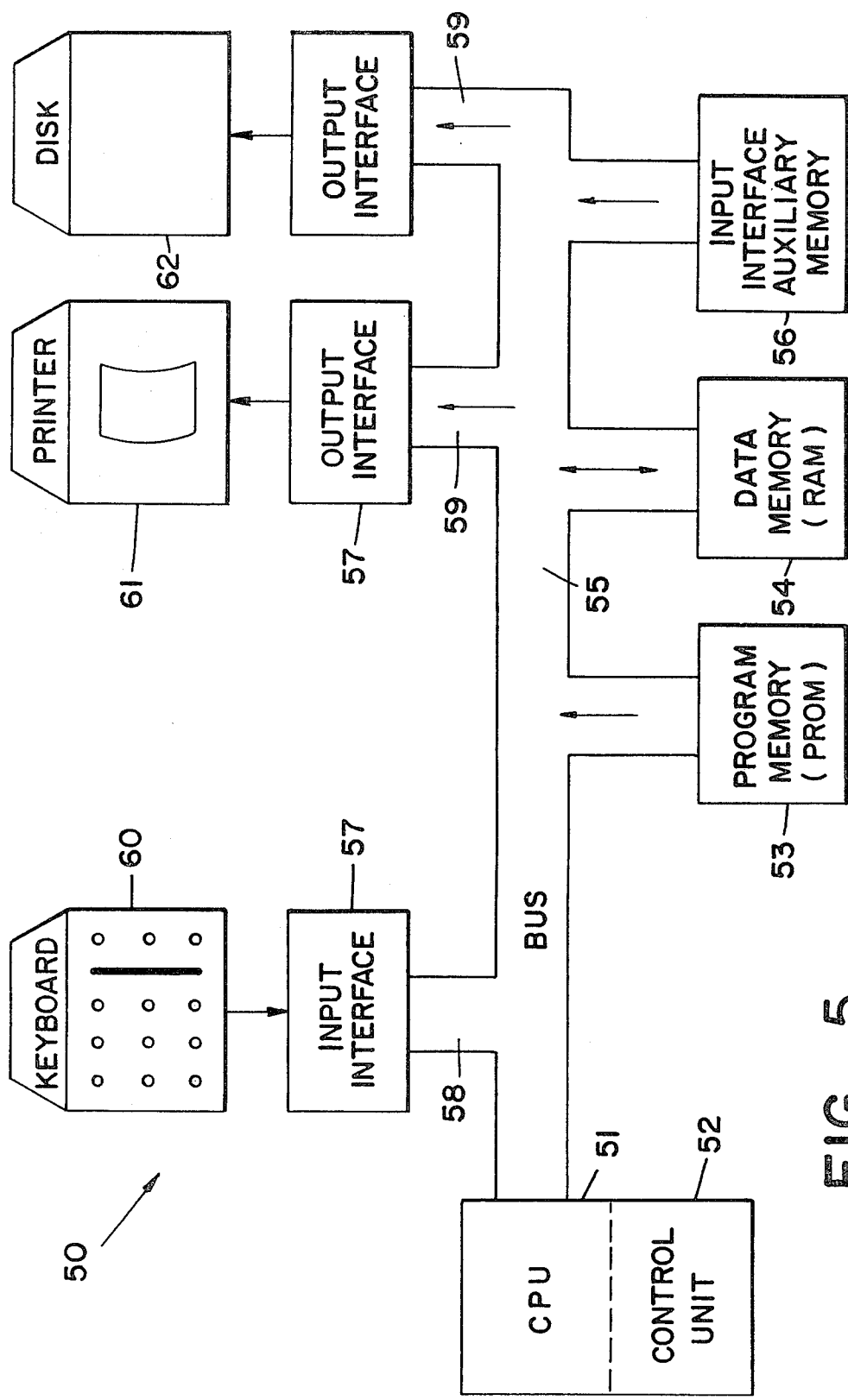
FIG_5

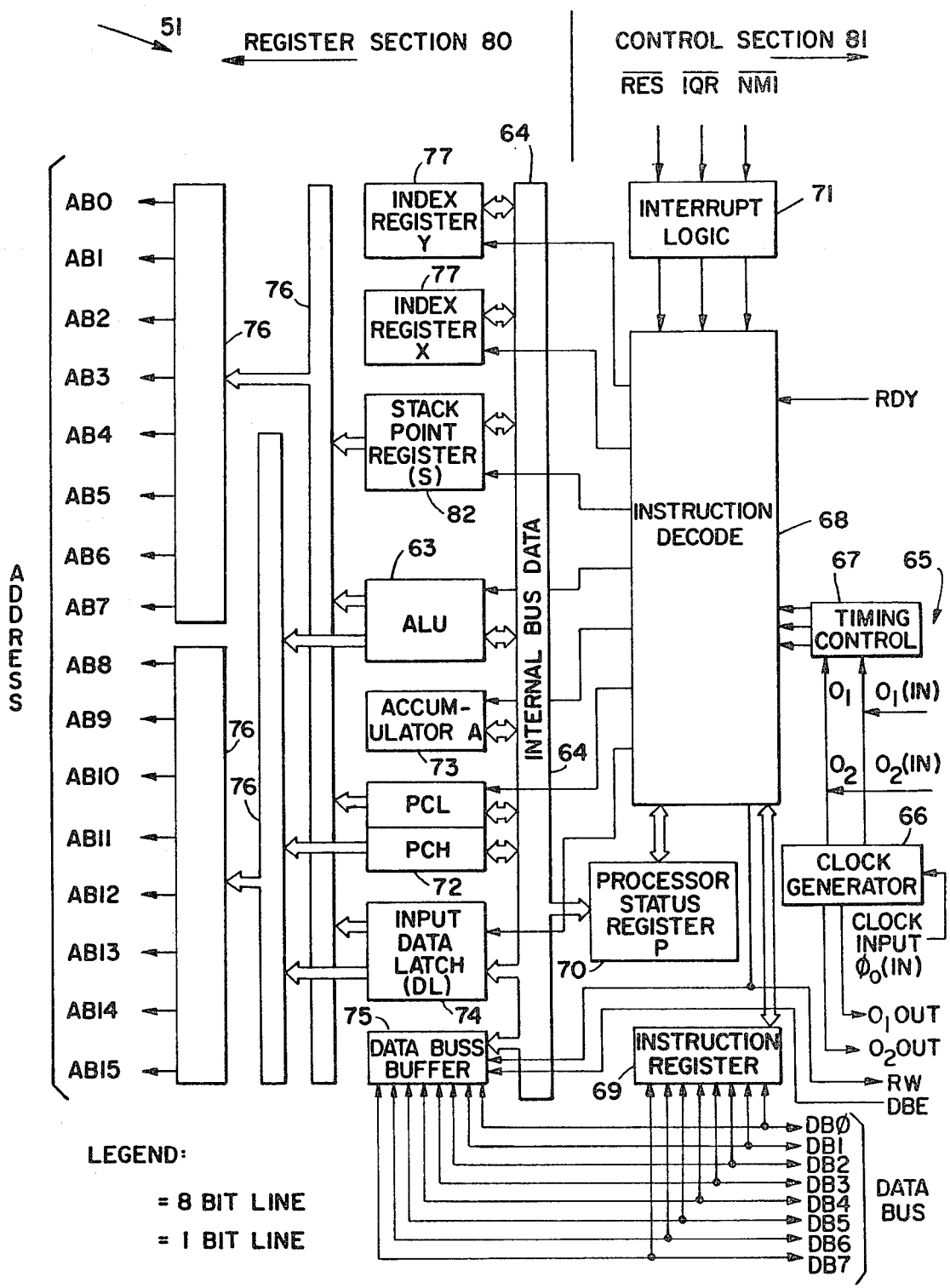
FIG_6

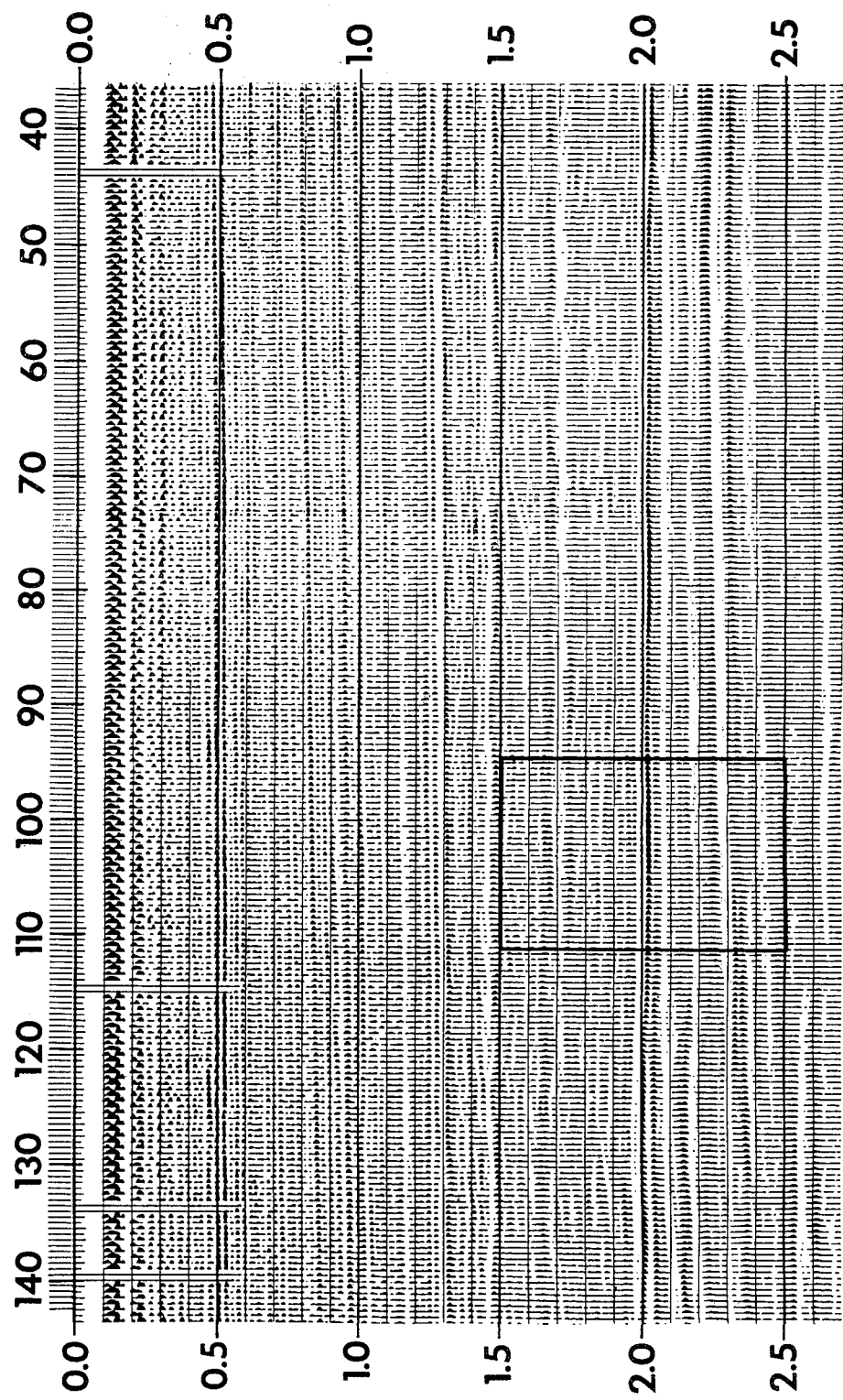
FIG_7

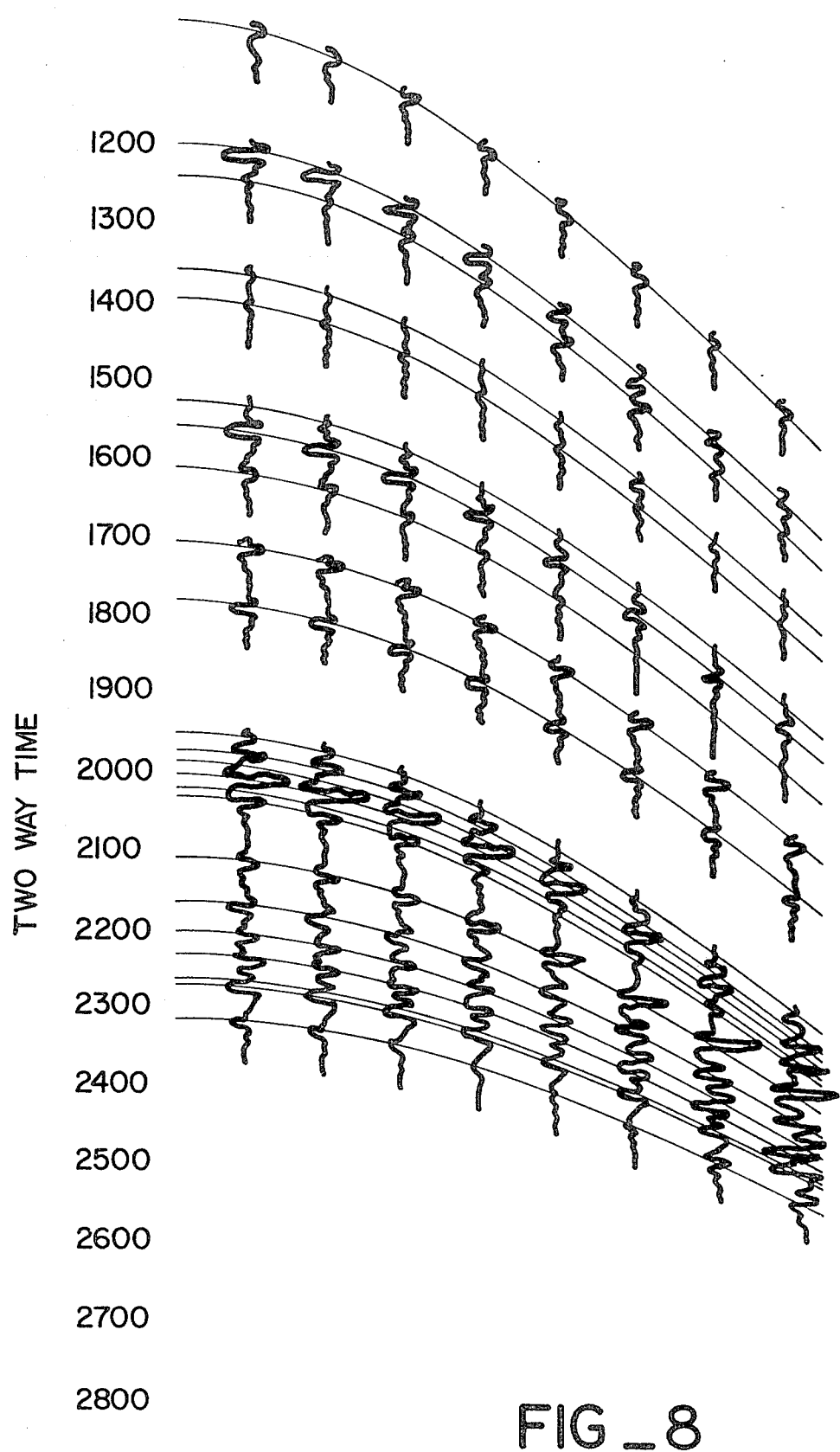
FIG_8

METHOD FOR INTERPRETING SEISMIC RECORDS TO YIELD INDICATIONS OF GAS/OIL IN AN EARTH FORMATION SUCH AS A SANDSTONE, LIMESTONE, OR DOLOSTONE

This is a continuation of application Ser. No. 863,828, filed Dec. 23, 1977, now abandoned.

DISCLAIMER

While the Abstract, supra, has been carefully written, the purpose of such statements is to provide a non-legal description of the contents of this application as a searching, scanning and classification aid for technical persons. Accordingly, all hereinbefore-presented statements are not intended to be used in understanding or otherwise comprehending the principles of the invention hereinafter described in detail and are not, more particularly, to be used in interpreting or in any way limiting the scope or fair interpretation of the claims appended hereto.

RELATED APPLICATIONS

Don D. Thompson, Robert J. S. Brown and Richard J. Runge, Ser. No. 81,292, filed Oct. 2, 1979, for "Method for Interpreting Seismic Records to Yield Indications of Gas/Oil in an Earth Formation", and now abandoned, and Don D. Thompson, Robert J. S. Brown and Richard J. Runge, Ser. No. 82,382, filed Oct. 2, 1979, for "Method for Interpreting Well Log Records to Yield Indications of Gas/Oil in an Earth Formation Such as a Sandstone, Limestone, or Dolostone" and now abandoned.

FIELD OF THE INVENTION

The present invention pertains to the art of seismic prospecting for petroleum reservoirs, and more particularly to the art of interpreting high-intensity reflection amplitude anomalies observed on acoustic record traces into diagnostic indicators of the presence and amounts of gas/oil in the underlying subsurface strata.

BACKGROUND OF THE INVENTION

For several decades, seismic prospecting for petroleum has involved the creation of acoustic disturbances above, upon, or just below the surface of the earth, using explosives, air guns, or large mechanical vibrators. Resulting acoustic waves propagate downwardly in the earth, and are partially reflected back toward the surface when acoustic impedance changes within the earth are encountered. A change from one rock type to another, for example, may be accompanied by an acoustic impedance change, so that the reflectivity of a particular layer depends on the velocity and density content between that layer and the layer which overlies it, say according to the formula $$C\,\text{Reflect}_r = Ar/Ai = \frac{V_2 d_2 - V_1 d_1}{V_2 d_2 + V_1 d_1}$$

where AR is the amplitude from the reflected signal and Ai is the amplitude of the incident signal; $V_1$ is the compressional velocity of the wave in the overlying medium 1; $V_2$ is the compressional velocity in the medium layer below the contact line; $d_1$ is the density of the overlying medium 1; and $d_2$ is the density of the underlying medium.

Today's seismic interpretors have made good use of ultra-high amplitude anomalies in seismic traces to infer the presence of natural gas in situ. So-called "bright-spot" analysis has been used to good advantage to indicate several large gas reservoirs in the world, especially in the Gulf Coast of the United States. Such analysis is now rather common in the oil industry, but it is not without its critics, especially in the area of predicting gas saturation based on the characteristics of the amplitude anomalies of the traces alone.

The present invention improves the ability of the seismologist to correctly interpret gas as well as gas/oil content of a formation normalized to (and comparable with) a series of patterned acoustic characteristics associated with zones of similar mineralogy and determinable gas or gas/oil saturations.

OBJECT OF THE INVENTION

An object of the invention is the provision of a novel method of correctly predicting gas and/or gas/oil saturations of hydrocarbon-bearing structures using at least in part high-intensity anomalies provided by traces, including seismic traces.

SUMMARY OF THE INVENTION

The present invention indicates that acoustic characteristics associated with gas/oil-cntaining strata such as sandstone, limestone or dolostone can be normalized (and favorably compared) with similar synthetic values calculated and displayed by means of a machine-implemented data processing method in which well logging and geologic data are fed thereto to calculate such values.

In more detail, in accordance with the invention brine-saturated bulk and shear moduli, (i.e., $Kw^*$ and $Gw^*$) of a sandstone, limestone or dolostone can be predicted, say, as a function of brine-saturated P-wave modulus ($Pw^*$) (independent of shear-wave velocity), thereafter a surprisingly accurate estimation of bulk moduli of the fluid-filled pore spaces as a function of gas and/or oil saturation can occur. In that way, various synthetic values (say velocities, amplitudes, etc.) as a function of depth and of gas/oil saturation can be provided. Ultimately, such values when compared to actual field-generated values have accurate prognostic capabilities as to the amount of gas/oil saturation in the zone of interest. The method has particular accuracy in designating gas zones within formations of interest due to use of the complete Benedict-Webb-Rubin non-ideal gas law in pseudo-reduced form.

DESCRIPTION OF THE DRAWINGS

Further features of the invention will become more apparent upon consideration of the following detailed description of the invention when taken in connection with the accompanying drawings, wherein:

FIG. 1 is a plan view of a grid of centerpoints produced in the field by the systematic positioning and energization of an array of seismic sources and detectors whereby a series of locational traces associated with individual centerpoints between respective source-detector pairs are ultimately generated;

FIG. 2 is a model of typical reflecting horizons within an earth formation that can be associated with the characteristics of the locational traces of FIG. 1;

FIG. 3 is a plot of percentage of gas saturation vs. compressional velocity as a function of change in pressure (depth) of a particular subsurface material;

FIG. 4 is a diagram of process steps for carrying out the method of the present invention using, in at least part, programmed digital computing system;

FIGS. 5 and 6 are schematic diagrams of elements within the digital computing system of FIG. 4;

FIGS. 7 and 8 illustrate the diagnostic capability of the method of the present invention in predicting the presence of and amounts pertaining to gas strata in an actual field example.

PREFERRED EMBODIMENTS OF THE INVENTION

Before discussion of an embodiment of the invention with an actual field environment, a brief description of the mathematical and theoretical concepts behind the discovery may prove beneficial and are presented below.

Firstly, it may be of interest to indicate lithology limitations associated with the present invention. Anomalies associated with gas or gas/oil sands or sandstone over shale rock cap are one example where the method of the present invention offers surprising predictive capabilities. Another example relates to gas-saturated limestone or gas/oil-saturated limestone over shale. Still another is fluid-saturated dolostone capped by shale or the like. Secondly, it should be pointed out that certain relationships of various petrophysical parameters are also of great importance, viz., bulk and shear moduli of a rock formation as a function of the P-wave modulus in the zone of interest.

Now, in more detail, attention should be directed to the Figures, particularly FIG. 1, in which the field-collection phase of the present invention is shown. Note that, inter alia, FIG. 1 illustrates in some detail how seismic multi-centerpoint data are collected in the field, and derivations of terms of interest in this application occur: e.g., the term "centerpoint" is a geographical location located midway between a series of sources $S_1, S_2 \ldots S_n$ of a geophysical field system 9 and a set of detectors $D_1, D_2 \ldots D_m$ at a datum horizon near the earth's surface. The centerpoints are designated $C_1, C_2 \ldots C_p$ in the Figure, and are associated with a trace derived by placement of a source at that centerpoint location followed immediately by relocating a detector thereat.

I.e., if the sources $S_1 \ldots S_n$ are excited in sequence at the source locations indicated, traces received at the different detector locations shown can be related to common centerpoints therebetween. If such traces are summed, a gather or group of traces is formed. I.e., if the reflecting interface is a flat sand horizon containing gas, or oil/gas fractions, the depth point where reflection occurs will define a vertical line which passes through the centerpoint of interest. Applying static and dynamic corrections to the field traces is equivalent (under the above facts) to placing the individual sources $S_1, S_2 \ldots S_n$ at the centerpoint in sequence followed by replacement with the detectors $D_1 \ldots D_m$ of interest at the same locations. If the traces associated with a common centerpoint are summed, a series of enhanced traces, sometimes called CDPS traces, is provided.

FIG. 2 illustrates reflection phenomena of a three-layer model typical of a young, shallow geologic section 10, such as found in the Gulf Coast, illustrating how reflection phenomena associated with traces of the field system 9 of FIG. 1 can be related to the presence of gas alone.

Section 10 includes a gas sand 11 embedded in a shale stratum 12. A 20% velocity reduction can occur at interface 13, say from 10,000'/sec to 8000'/sec, and a 10% density reduction from 2.40 g/cc to 2.16 g/cc, can likewise happen.

Actual P-wave reflection coefficient Apr of gas sand 11 can be calculated by Equation (1) below: also, P-wave transmission displacement amplitude coefficient Apt can similarly be related in accordance with Equation (2) below.

$$A_{Pr} = \frac{\bar{f} - \bar{\tau} - \bar{\kappa}}{\bar{f} + \bar{\tau} + \bar{\kappa}} \tag{1}$$

$$A_{Pt} = \frac{h_2 \cdot 2a_1 k_1^2 (c_1 \nu + c_2 \xi)}{h_1(\bar{f} + \bar{\tau} + \bar{\kappa})} \tag{2}$$

$$\frac{\bar{f}}{f} = k_1^2 k_2^2 \delta(a_1 c_2 \mp a_2 c_1) \tag{3}$$

$$\frac{\bar{\tau}}{\tau} = b^2 \eta^2 \mp a_1 c_1 \nu^2 \tag{4}$$

$$\frac{\bar{\kappa}}{\kappa} = a_2 c_2 (\xi^2 \mp 4 a_1 c_1 \zeta^2 b^2) \tag{5}$$

$$\eta = \delta \epsilon_\Sigma - \epsilon_1 \tag{6}$$
$$\zeta = \delta - 1 \tag{7}$$
$$\nu = \delta \epsilon_2 + 2b^2 \tag{8}$$
$$\xi = \epsilon_1 + 2\delta b^2 \tag{9}$$
$$\epsilon_i = k_i^2 - 2b^2 \tag{10}$$
$$\delta = \mu_2/\mu_1 \tag{11}$$
$$\mu_i = \rho_i V_{si}^2 \tag{12}$$
$$b = h_1 \sin\theta \tag{13}$$
$$a_i^2 = h_i^2 - b^2 \tag{14}$$
$$c_i^2 = k_i^2 - b^2 \tag{15}$$
$$h_i = 1/V_{pi} \tag{16}$$
$$k_i = 1/V_{si} \tag{17}$$

$V_{pi}$ = P-WAVE VELOCITY
$V_{si}$ = S-WAVE VELOCITY
$\rho_i$ = DENSITY
$i$ = LAYER INDEX
$\theta$ = ANGLE OF INCIDENCE Equations (1) and (2) are, of course, the two basic equations of wave travel in an earth formation and are for isotropic media with the layer index being i=1 for the incident medium and i=2 for the underlying medium. Equations (3) through (17) simply define intermediate variables.

As an example of calculations associated therewith, if $\theta = 0°$ (normal incidence), the P-wave reflection coefficient Apr is equal to about −0.16 and +0.16, respectively, assuming a Poisson's ratio of 0.1 for sand 11 and 0.4 for the shale 12 of FIG. 2. Such values are larger, of course, than reflections from barren strata.

And how various gas fractions affect elastic moduli and seismic velocity, which can be of monumental interest to seismologists, is depicted in FIG. 3.

FIG. 3 also illustrates to some degree the complexity that is involved in relating various petrological parameters one to the other to the elastic moduli in the presence of gas. E.g., FIG. 3 shows that very small gas saturations cause nearly as much reduction in moduli of compression as do larger gas saturations. In highly porous sandstone a very small gas saturation may lead to a substantial reduction in compressional wave velocities, especially at low differential pressures. However, an increased gas saturation leads to a density decrease which may cause a velocity increase, partly offsetting the initial velocity decrease. Also, effects of gas saturation are greatest for rocks of highly compressable elastic framework: Thus, in most low-porosity carbonates of high differential pressure, the effect of gas saturation is minimal.

Briefly, the present invention shows that appropriate expressions can, in fact, be provided for calculating the elastic moduli of competent and incompetent strata based on reasonable assumptions, followed by a determination of synthetic characteristics as a function of oil/gas saturations. Comparison techniques with actual field-collected data then can be utilized. Result: accurate estimations of gas/oil saturations for sandstone, limestone or dolostone occur. The expressions for providing such data are derived, in part, from surprising laboratory measurements to be described below. Also, well logging and other geologic data of the zone of interest are involved to some degree. Additionally, for ease of printing, several Greek symbols have been omitted and the following equivalents substituted:

$\rho\text{gas} = \text{rho-gas}$
$\rho_B = \text{rho-B}$
$\gamma_r = \text{gamma-r}$
$\alpha_r = \text{alpha-r}$

General Principles

Expressions shown below relate densitites, velocities and elastic moduli. First, in accordance with Biot-Gassmann theory:

$$\rho_B V_p^2 = P^* = K^* + (4/3)G^* \quad (18)$$

and $$\rho_B V_s^2 = G^* \quad (19)$$

Here, rho-B is the bulk density (including contributions of pore fluids; Vp is the P-wave velocity, or plane-compressional-wave velocity; Vs is the shear-wave velocity; P* is the P-wave elastic modulus; K* is the compressional modulus (reciprocal of the compressibility) and G* is the shear modulus, or modulus of rigidity.

General Definitions

The rocks in these equations are assumed to be macroscopically homogeneous and isotropic. In fact, macroscopic isotropy and homogeneity are assumed to exist when petrological parameters are represented by only density and two other parameters, such as Vp and Vs or else G* and K*. The asterisk superscript (*) applied to an elastic modulus indicates reference to porous rock with fluid (any mixture of brine, oil and gas) in the pores. By measurement of rho-B, Vp and Vs, other parameters such as P*, K*, G*, Young's modulus or Poisson's ratio can be imparted.

Two additional macroscopic elastic moduli, the solid-material elastic modulus Km or Gm and the solid-frame modulus Ka, can be used.

If the solid material of a porous rock is reassembled in such a manner that there is no pore space, the resulting elastic moduli depend on the manner in which the material is assembled. However, upper and lower limits to the moduli can be computed. For such hypothetical rocks without pore space, upper and lower limits are not widely separated, and the means between these limits will be indicated by subscripts "m". Thus, Km and Gm are solid-material moduli. These quantities are set forth below in Table I.

TABLE I

| Elastic Data and References for Some Sedimentary Minerals | | | | |
|---|---|---|---|---|
| Mineral | Bulk Modulus in Kbars | Shear Modulus in Kbars | Grain Density | References |
| Quartz | 380 | 444 | 2.65 | (1) |
| Calcite | 767 | 323 | 2.71 | (2) |
| Dolomite | 948 | 457 | 2.87 | (2) |
| Biotite ("Clay") | 504 | 275 | 2.68 | (1) |
| Anhydrite | 563 | 291 | 2.98 | (3) |
| Siderite | 1240 | 510 | 3.96 | (4) |
| Barite | 546 | 238 | 4.51 | (1) |
| Hematite | 978 | 931 | 5.24 | (1) |
| Pyrite | 1581 | 1487 | 5.02 | (1) |
| Rutile | 2230 | 1035 | 4.26 | (1) |
| Halite | 252 | 153 | 2.16 | (1) |

(1) G. Simmons, J. Grad. Res. Center, Vol. 39, 3/65, SMU Press
(2) P. Humbert & F. Plicque, Compt. Rendus B275, 391 (1972)
(3) W. Schwerdtner, Can. J. Earth Sci., 2, 673 (1965)
(4) N. Christensen, J. Geophys. Res. 77, 369 (1972)

But if the pore space in a porous rock is all connected, and if the differential pressure in the fluid in the pores is held constant during a small change in the externally applied pressure, the ratio of the pressure change to the relative change in the bulk volume is the solid-frame modulus of compressibility, Ka. This modulus is sometimes referred to as the modulus of compressibility of the rock with the pore system empty. However, many oilfield rocks contain clays which may be altered by actually drying the rocks to empty the pore system. It is also possible that certain surface forces may be different when all water is removed from the pore system of a rock. It is also possible that there are several different possibilities for finding values of Ka.

If all pore space is connected, and if the rock is macroscopically homogeneous and isotropic, a change in the pore pressure cannot lead to macroscopic shear strains, since excluded from the specification of the system is anything which could define direction. Therefore, the compressibility of the fluid cannot influence the macroscopic shear modulus of the rock. Thus, G*=Ga for a rock satisfying the above conditions.

Note, however, that the dynamic elastic moduli of rocks usually depend on the static stresses and therefore on the fluid pressure in the pore system. This, in turn, affects the differential pressure, or the pressure supported by the elastic framework of the rock. Furthermore, note the requirement that there be time for the fluid pressure to equalize throughout the pore system. If the pore space is not connected, this cannot happen at all. If there are localized regions of low permeability, there may not be enough time for pressure equalization in the pore system if pressure changes are applied at high frequency. The time required for pressure equalization depends not only on the local permeability of the material but on the microscopic distribution of the pore fluid components. This consideration applies, for example, if the pore fluid is a mixture of brine and gas. The higher the seismic or sonic frequency, the finer must be the mixture of brine and gas.

However, in estimating gas/oil-saturation effects in accordance with the present invention, input parameters can be limited to compressional velocity, density and porosity, as set forth below.

The Effect of Gas Saturation

Gassmann derived an equation (Gassmann, F., "Elasticity of Porous Media" in Vierteljahrschrift der Naturforshenden Gesellschaft in Zurich, Heft I, 1951) and given also in a book by White (J. E. White, "Seismic Waves: Radiation, Transmission and Attentuation", McGraw-Hill, N.Y., 1965), relating K* and Ka.

$$K^* = K_a + K_f \frac{(1 - K_a/K_m)^2}{(1 - K_f/K_m)\phi + (K_f/K_m)(1 - K_f/K_m)} \quad (20a)$$

or the equivalent, $$K_a = K^* - K_f \frac{(1 - K^*/K_m)^2}{(1 - K_f/K_m)\phi - (K_f/K_m)(1 - K^*/K_m)} \quad (20b)$$

or another equivalent, $$\frac{1}{K_m - K^*} - \frac{1}{K_m - K^{*'}} = \frac{1}{\phi}\left[\frac{1}{K_m - K_f} - \frac{1}{K_m - K'_f}\right] \quad (20c)$$

or still another equivalent, $$(K^* - K_a)/K_m = K_{fc}/K_m = b - a = \quad (20d)$$

$$\frac{(1-a)^2}{f\phi + (1-a)} = \frac{(1-b)^2}{f\phi - (1-b)}$$

where $a = K_a/K_m$; $b = K^*/K_m$; $g = G^*/G_m = G_a/G_m$; $f = (K_m/K_f) - 1$.

Here $\phi$ is the fractional porosity, Kf is the compressibility modulus of the fluid in the pores, and the primes (') indicate values for a different pore fluid system. Thus, if Kf'=0, the K*' becomes Ka. If the pore fluid is a multiphase system, such as any mixture of brine, oil and gas, Kf can be calculated by noting that the compressibility of a fluid mixture is the volume-weighted average of the compressibilities of the components. Thus, for a gas-brine mixture, $$\frac{1}{K_f} = \frac{S_{gas}}{K_{gas}} + \frac{(1 - S_{gas})}{K_{brine}} \quad (39)$$

where Sgas is the fractional gas saturation.

It can be seen from Equations 19 and 20a-20e that, if G*, P*, Km, Kf and $\phi$ are known, calculations are straightforward. But since G* and Km are not known, simultaneous solutions of equations is a distinct possibility and is set forth in detail below. If K* for two different values of Kf is measured, two equations with two unknowns are provided and both Ka and Km can be determined. Km may be computed with adequate accuracy from estimates of the composition of the solid framework of the rock, as set forth below, in which case measurements of K* and $\phi$, together with knowledge or estimates of Kf and Km give values of Ka.

Equations 18, 19 and 20a-20e are rigorously true if the rock is macrohomogeneous, macroisotropic, all pore space connected, time is allowed for pressure equalization in the pore fluid, and the material of the solid framework is microhomogeneous and microisotropic. The assumptions of microisotropy and microhomogeneity are not satisfied rigorously for real rocks. The lack of microisotropy is probably well accounted for by the spatial averaging employed in the determination of the "isotropized" values of the compressional moduli of the rock-forming minerals given in Table I, supra. It is highly probable that anisotropic mineral grains are deposited more or less randomly. Even if they are not, the directions of the stress vary greatly in a granular rock, justifying the spatial averaging.

The effects of microhomogeneity of the solid material of the rock may affect the strict validity of Equations 20a-20e supra if one or the components of the solid framework does not carry its share of the load and if that component has a compression modulus substantially different from those of other components. A candidate would be a sand consisting of a quartz framework with a large amount of clay or other materials with higher compressional moduli and attached in such a manner that it does not significantly share the stress.

It should be noted that if shear-wave logs would be available for the basin of interest, the bulk modulus can be calculated from the P- and S-wave transit times in the density of the zone of interest in accordance with Equations 18 and 19, supra. Unfortunately, the shear-wave logs needed for direct measurement of K* are not available for most basins.

Hence, a method is needed for accurately determining bulk and shear moduli of rock formations in such basins, these moduli being needed for use in the Biot-Gassmann relationship, i.e., the Equations 20a-20d supra, to model the influences of pore fluids on the bulk modulus, and therefore on the compression wave velocity. While these fluids may be either brine, liquid, hydrocarbon or gas or any combination thereof, the present invention relates to brine-gas mixtures principally but not exclusively.

In accordance with the present invention, only compressional velocity of the brine-saturated material, its brine-saturated density and porosity measurements are needed to estimate bulk and shear moduli for the zone of interest as functions of pressure, temperature and fluid content (gas saturation).

These equations which are set forth below and above permit an in-situ estimate of K* and G* as defined above, which may be based on measurement of the P-wave modulus of the aggregate (i.e., Pw*) only, and do not require the need for shear-wave velocity. Also, a gas correction term applies only to well-consolidated sandstones, not to sand packs or loosely or poorly consolidated sands, as set forth in detail and discussed below.

A key to the above discovery that Pw* can be used to estimate the elastic moduli of the formation of interest on the basis of empirical expressions of the form $$\hat{G}_w^* = f_1(P_{ol}^*) \quad (21)$$

where G* is the shear modulus, and the bulk modulus by the form $$\hat{K}_w^* = f_2(P_{ol}^*) \quad (22)$$

where Pol* is the P-wave modulus. The subscript "ol" means "observed in the laboratory". Of course, the subscript "ow" is also operative in this context: in circumstances where P-wave modulus is "observed from well log data", as explained below.

The empirical coefficients for the above Equations 21 and 22 have been found for sands without performing undue experimentation and, moreover, produce correlation coefficients in a range of 0.927 to 0.962.

In general, Equations 21 and 22 are proven excellent predictors. E.g., the above equations have been found to give correlation coefficients of 0.96 and 0.93 respectively at the highest pressure conditions. A standard acoustic measurement system (AMS) can be used to determine densities, porosities and three moduli (P*, K* and G*) as a function of pressure of known materials to predict the coefficients of the above equations.

Note also that values of P-wave modulus estimated from well logs is in accordance with $$P_{ow}w = \rho_B V_p^2 \quad (35)$$

where rho-B is the density and Vp is the compressional velocity from such logs, as explained below.

However, mineralogy can also be a determining factor.

Note that the present invention not only allows the experimentor to specify that the formation is initially 100% brine saturated, but also to be able to specify that the lithology is sandstone, limestone, or dolostone. Detailed mineralogy permits him also to make a more accurate estimate, but it is not a necessary input variable. If detailed mineralogy is known, the volume percent of each component must be input in a manner shown in the method set forth below.

The program uses the Voigt-Reuss-Hill (VRH) method to calculate the bulk modulus, Km, and the shear modulus, Gm, of the solid part of the rock.

If the detailed mineralogy is not used, the method of the present invention automatically defaults to "average" values of Km and Gm for each lithology.

If a rock is widely different in composition from "average" rocks, detailed mineralogy is necessary in order to do accurate estimates. For example, if a limestone contained quartz beyond about 25%, the Km, Gm default values for limestones could lead one into significant errors in estimation of fluid effects.

The limestone equations have practical validity in areas well represented by that particular sampling used above. Experience has shown that such data are particularly good predictors of velocity and porosity values in the Ardmore and Arcoma basins in the Midcontinent of the United States of America. However, the Biot-Gassmann relationship as set forth in Equation 20b should be used:

$$K_a = K^* - K_f \frac{(1 - K^*/K_m)^2}{(1 - K_f/K_m)\phi - (K_f/K_m)(1 - K^*/K_m)} \quad (20b)$$

where
- Ka = frame modulus (the bulk modulus with empty pores)
- Km = bulk modulus of the solid material
- Kf = bulk modulus of the fluid (including the gas) in the pores.

The second term of the right-hand member of Equation 20d is referred to as the fluid correction term, Kfc, so that K* = Ka + Kfc, as previously indicated.

Mathematical Modeling of Gas or Oil in Sandstone Formations

Equations 21 and 22 are assumed to be applicable in the area under study, as determined from well logs via equation 35. Without this assumption, calculation of fluid saturation effects on the P-wave modulus is not possible.

Parenthetically, there must be available from well logs *rho-B, $\phi$ and Vp, from which the observed P-wave modulus, Pow*, is calculated ("ow" means "observed from well logs") by equation 35, supra. These data must come from a section of the well known to be 100% brine saturated. From these steps, the elastic moduli can be calculated.

FIG. 4 is a flow diagram of the data transformation process of the present invention.

Briefly, in the initial step, predicted shear modulus, Gw*, for the depth (pressure) is calculated from the predictor Equation 21 supra, i.e., $$\hat{G}_w^* = f_1(P_{oi}^*) \quad (21)$$

In step (2), there is the calculation of the predicted bulk modulus, $\hat{K}_w^*$, for the depth (pressure) from the predictor Equation 22 supra, i.e., $$\hat{K}_w^* = f_2(P_{oi}^*) \quad (22)$$

In step (3), to model gas-saturated formations, there is next calculated $\hat{K}_a$ via Equations 20a–20d. In these statistical terms, Equations should be modified to read $$\hat{K}_a = K_w^* - \frac{K_{br}(1 - \hat{K}_w^*/K_m)^2}{(1 - K_{br}/K_m)\phi - K_{br}/K_m(1 - \hat{K}_w^*/K_m)} \quad (20e)$$

where Kbr is the bulk modulus of brine. Assume a pressure-independent value of 25 Kbar. The bulk modulus of the solid material, Km, is also assumed to be pressure-independent.

From the several sandstone samples, a mean Km of 393 Kbar is noted with a standard deviation of less than 10%. This value can be used as a starting point if one has no other data.

It is physically impossible for $\hat{K}_w^*$ to exceed Km. However, the predicted modulus, $\hat{K}_w^*$, can exceed the mean value of Km. In that event, either:
1. abort the method for that set of data, or
2. independently determine the true value of Km.

Errors in Ka are apt to be largest for porosities less than about 5%. Above that value, we had no problems in this step of the calculation.

In step (4), calculation of $\hat{K}_{gas/oil}^*$, the predicted modulus with gas/oil present, can be in accordance with:

$$\hat{K}_{gas/oil}^* = K + \frac{(1 - \hat{K}_a/K_m)^2}{\phi/K_f + (1 - \phi)/K_m - \hat{K}_a/K_m^2} \quad (23)$$

where Kf equals the bulk modulus of a liquid-gas mixture. It is equal to $$1/K_f = S_{gas}/K_{gas} + S_{oil}/K_{oil} = (1 - S_{gas} - S_{oil})K_{br} \quad (24)$$

where Sg and Soil are the fractional gas and oil saturations and Kg is the bulk modulus of the gas. The latter is both temperature- and pressure-dependent.

Note that Ka and G* are independent of the fluid so that these values need not be recalculated. However, K* is a dependent variable with regard to the fluid in the pores of the rock of interest. Hence, its value is a function of the total bulk modulus of the fluid Kf.

Estimation of the bulk modulus of the gas and oil can be rigorous. Approximate methods to estimate the fluid modulus, Kf, for use in the Biot-Gassmann relations can be used, and are set forth supra.

Attempts to estimate the bulk modulus of a gas component, Kfgas, from either the isothermal or adibatic perfect gas laws are inadequate for some applications, but results can be obtained in the manner set forth below. In this method, the gas modulus and density are computed in accordance with an isothermal non-ideal equation of state for a gas in pseudo-reduced form as non-ideal equation of state for a gas in pseudo-reduced form as proposed by Benedict, Webb and Rubin; see Journal of Pet. Tech., Vol. 22, 1970, pp. 889–895.

Oil Equations

Bulk modulus and density for oil can be easily calculated and are, of course, necessary parts of the total fluid moduli and density calculations of a given gas/oil mixture. Oil density (rho-oil) can be calculated by $$\rho_{oil} = 141.5/(\gamma_{oil}[API] + 131.5) \tag{58}$$

Oil bulk modulus (Koil) can also be easily obtained:

$$K_{oil} = f_{10}\rho_{oil} \tag{59}$$

In step (5), equations 21 and 23 are used to obtain $\hat{P}_{gas/oil}*$, according the Biot-Gassmann theory, $$\hat{P}_{gas/oil}* = \hat{K}_{gas/oil}* + (4/3)\hat{G}_w* \tag{60}$$

$\hat{P}_{gas/oil}$ is the predicted P-wave modulus with gas/oil present.

In step (6), to convert the moduli to velocities, use the aforementioned gas and oil density values along with a brine density of 1.05 g/cm³ and a medium density of 2.65 g/cm³, and assuming values of Sg and Soil to obtain a bulk density value rho-B of the formation:

$$\rho_B = \phi\rho_{fgo} + (1-\phi)\rho_m \tag{61}$$

where rho-fgo=Sg-rho-g+Soil rho-oil+(1−Sgas−Soil)rho-Br to obtain an equation for velocity with gas and oil present, i.e., to obtain the predicted value of Vp with gas present:

$$\hat{P}_{gas}* = \rho_B \hat{V}_P^2 \tag{62}$$

In step (7), seismic characteristics of interest are calculated as a function of different gas saturations and compared with actual values until a pattern match occurs. The amount of gas saturation is then evident.

DESCRIPTION OF EMBODIMENT

Having now established a firm mathematical and theoretical basis for the process of the present invention, perhaps a description for a system for carrying out the invention is in order. In this regard, reference again should be made to FIG. 4, which is a flow diagram for such a system. From the above descriptions, it is evident that displays ultimately will be provided which indicate both presence and amounts of gas/oil-bearing strata within a zone of interest.

It should be pointed out that while theoretical acoustic characteristics can be provided using the expressions and descriptions set forth above, actual acoustic data must be available from the field; such data are initially collected, say, using one of today's conventional techniques, e.g., involving seismic multiple-area coverage. One of the better field-gathering techniques is a conventional form of recording seismic data using what is called common-depth-point gathers (CDP). From such data, characteristics of events associated with gas/oil-bearing strata can be normalized and then compared with the theoretical data predicted by the method involving the present invention, such values being variable as a function of gas/oil saturation, inter alia.

Note further in returning to FIG. 4 that it can be assumed that a section of data has been analyzed for "bright spots" related to, say, gas-bearing strata alone, such events being known by geographic location and/or time-depth basis and the traces have been dynamically and statically corrected.

The steps of FIG. 4 include calculation of synthetic acoustic values of interest, as a function of gas saturation, and comparing these values with actual field values obtained using conventional field-gathering techniques.

Such comparison will include calculations of the theoretical data values as a function of gas saturation; then the pattern of such values as a function of gas saturation can be analyzed so that an interpreter can compare actual field data therewith and therefore estimate the gas saturation in the zone of interest.

Comparison-Techniques

The comparison of such values can occur within (or without) the particular computing system to be adopted. If internal comparison techniques are used, the nature of the results (to be equated in a comparison sense) must be taken into account:

(i) for velocity comparisons, an array comparison technique can be used within the system to be adopted in which dimensions of the array include: velocity amplitudes (both synthetic and actual) as a function of geometrical location, depth (or equivalent time) values, and gas/oil saturation.

While either the synthetic or actual values can serve as the primary selector values, it is perhaps better to use the latter to compare with the former. In that way, the array addresses associated with individual velocity values can be incremented in sequence (in one or more dimensions) and the results compared. The best match becomes apparent from a reading or listing of all comparisons made, or from a designation of the best match on a GO-NO GO basis. In this regard, some preliminary processing analysis of the seismic record is in order to establish the active seismic velocity deducible from the record as a function of time or depth. A technique well known in the art to reconcile theory and data, uses an iterative technique in which a stacking velocity for a set of traces (corrected) is associated. Hereafter, the set of corrected traces (all associated with a common centerpoint) is stacked and coherency of the data noted. Then the process is repeated with a different stacking velocity; the most coherent of the stacked data allows a "best" stacking velocity determination to be deduced.

(ii) for amplitude comparisons, an array technique similar to that previously described can be used; but conversely an auxiliary comparitor could also be implemented to function with disk data provided from the computing system to be described hereinafter. In the former, dimensions of the array would include: actual and synthetic amplitude values as a function of geometrical centerpoint location, time (or migrated equivalent depth) values and gas/oil saturation values. Incrementing of the array (in one or more dimensions) allows for a determination of "best" match of the data. In the latter, "best" match statistics can be developed after a synthetic amplitude-versus-time trace has been generated. Of course, such a synthetic trace requires amplitude values to be established, say based on the relationship $$Ar = \left[ \frac{V_2 d_2 - V_1 d_1}{V_2 d_2 + V_1 d_1} \right] Ai$$

where Ar is the amplitude from the reflected signal and Ai is the amplitude of the incident signal; $V_1$ is the compressional velocity of the wave in an overlying medium 1; $V_2$ is the compressional velocity $d_2$ is the density of the underlying medium below the contact reflection line; $d_1$ is the density of the overlying medium 1. Also, the above data must be migrated to the time dimension as such information is initially associated with established depth values within the earth. Thereafter the original seismic record (usually in a composite trace basis) is cross correlated with the various synthetic traces (each of the latter being associated with different gas/oil saturation values so that the best match therebetween becomes easily established.

FIG. 5 illustrates particular elements of a computing system for carrying out the steps of FIG. 4, including certain aspects related to the compression of data.

The System

While many computing systems are available to carry out the process of the present invention, to best illustrate operations a microcomputing system 50 of FIG. 5 is didactically best and is presented in detail below.

System 20 of FIG. 5 can be implemented on hardware provided by many different manufacturers, and for this purpose elements provided by MOS Technology, Norristown, Pa. 19401 may be preferred.

Such a system 50, which can be an MCS-6500 system from the above corporation, can include a CPU 51 controlled by a control unit 52 in conjunction with signals from external devices (one or more), not shown. Two memory units 53 and 54 connect to CPU 51 through bus 55. Program memory unit 53 (ROM) stores instructions for directing the activities of the CPU 51, while data memory 54 (RAM) contains data as data words related to logging and other geologic data provided by field acquisition systems. Since the logging and geologic data banks comprise large amounts of big-bit data, an auxiliary memory unit 56 may also be useful in carrying out the method of the present invention. Inputting and accessing such information is usually via peripheral interfaces 57. To rapidly input or access data, the CPU 51 addresses a particular port (say at input port 58, output ports 59). Such ports are addressed to receive or access information as required, such information being fed say via keyboard 60 or outputted or storable on usual external equipment known in the art, e.g., printer 61, floppy disks 62, paper-tape readers, etc.

The number and type of peripheral devices needed to carry out the method of the invention can generally be estimated very accurately. However, it is important to keep in mind that such estimates must be subject to review after a full analysis of system performance is completed. The seismic-interpreter-designer may find it necessary to use a special-purpose interface part or to redesign the I/O structure if the evaluation of total system performance reveals that the system performance reveals that the system cannot operate at the required speed. Use of special-purpose peripheral interface parts will reduce the number of tasks which must be handled by the CPU 51 and consequently can increase the over-all system speed, but this generally involves additional component cost.

Likewise, the use of a fully vectored interrupt can lead to increased performance at increased cost. The goal of any program must be to meet all the system performance at the minimum possible cost.

After the various peripheral devices in the system have been evaluated to determine the number of inputs and outputs required, the total required by all peripherals can be divided by 16 to determine the number of devices required. This is a good first approximation which will be reevaluated as the system development progresses.

Evaluation of the amount of RAM required by the system is a somewhat more difficult problem than estimation of peripheral devices. This is due primarily to the fact that much of the RAM is required by the system software as working storage, such as storage of immediate results in arithmetic operations. Since the machine-implemented program will probably not be written when these estimates are first attempted, the probability of error in this portion of the estimate may be fairly high.

In addition to working storage, the RAM must provide storage for:
1. The Stack (to be described below);
2. Peripheral input data storage;
3. Peripheral output data storage.

Items 2 and 3, above, can be evaluated quite accurately, since a detailed analysis of the peripheral devices has usually been completed when these estimates are first attempted. In general, a block of RAM must be made available for each peripheral device. The amount of RAM required for each is a function of the type of peripheral device being interfaced and just how the device is to be controlled.

The amount of RAM required by the stack is a function of both the interrupt structure and the system software. As a result, an estimate of this requirement must be based on the system programmer's best estimates of his requirements. This should be combined with an estimate of the required working storage and the peripheral data storage requirements to obtain an estimate of the total system RAM.

Amount of ROM required in a system cannot be determined accurately until the system program is completed. However, by partitioning the system program into definable pieces, an estimate can be made of each task and the total can be obtained of the ROM required by each section.

Most programs consist of easily defined sections such as the software for each peripheral device, arithmetic routines, etc. These are the pieces which should be examined separately to estimate the ROM required by each.

For outputting information, system 50 can be included with printer 61, again accessed through a particular interface 57 at an output port 59, whereby the operations in accordance with the present invention are printable. Of more use as an outputting unit, however, would be a disk unit which would temporarily store the accumulated data after the latter had again been accessed through a different interface 57 at another output port 59. In that way, the information on the disk unit can be used in conjunction with an off-line digital plotter capable of generating proper side-by-side displays of the data for use in conjunction with typical seismic data sections for comparisons and interpretation, as explained below. Such plotters are available in the art. One proprietary model that we are familiar with uses a computer-controlled CRT for optically merging onto photographic paper as a display mechanism the data provided by the present invention. Briefly, in such a plotter, the data are converted to CRT deflection signals; the resulting beam is drawn on the face of the CRT and the optically merged record of the events recorded, say via photographic film. After a predetermined number of side-by-side lines have been drawn, the film is processed in a photography laboratory and hard copies returned to the interpreters for their review.

Of course, the CPU 51 of FIG. 5 is the key to the operation in accordance with the present invention. As a general matter, it controls the functions performed by the other components, including addressing all input and output ports. It also fetches instructions from program memory unit 53, decodes their binary content and executes them. It also references data memory unit 54 (and/or other auxiliary memory units) and other interface ports as required in the execution of the instructions. It also recognizes and responds to certain control signals as set forth below.

FIG. 6 illustrates CPU 51 in more detail.

As shown, the CPU 51 includes an array of registers surrounding but operatively tied to an arithmetic logic unit (ALU) 63 through an internal data bus 64, all under control of a control unit generally indicated at 65. As indicated, the control unit includes clock generator 66, timing control unit 67 and instruction decoder 68. Note that the instruction decoder 68 is also operatively timed to the following units for control purposes: an instruction register 69, processor status register 70 and interrupt logic circuit 71, operating as set forth below. While instruction register 69 and program counters 72 have dedicated uses, an array of other registers, such as accumulator 73 and index registers 77 have more general uses.

The accumulator 73 usually stores one of the seismic operands to be manipulated by the ALU 63. E.g., in the summation of two or more numbers, the instruction may direct the ALU 63 to not only add in sequence the contents of the temporary registers containing predetermined values of logging or geologic data in the accumulator, but also store the result in the accumulator itself. Hence the accumulator 73 operates as both a source (operand) and a destination (result) register. Additional registers such as input data latch 74, data bus buffer 75 and address latches and buffers 76 are useful in manipulation of other seismic results and data, since they eliminate the need to shuffle results back and forth between the external memory units of FIG. 5 and accumulator 73.

The internal organization of the CPU 51 can be split into two sections. In general, the instructions obtained from the program memory 54 (FIG. 5) are executed by implementing a series of data transfers in the register section indicated at 80. The control lines which actually cause the data transfers to take place are generated in the control section generally indicated at 81. Instructions enter the CPU 51 on the bus 55 (FIG. 5), are latched into instruction register 69 and are then decoded along with timing signals at instruction decoder 68 to generate the register control signals to the various other elements of the system.

The control unit 65, including timing controller 67, keeps track of the specific cycle being executed. These units are set to "T0" for each instruction fetch cycle and are advanced at the beginning of each "Phase One" clock pulse. Each instruction starts in T0 and goes to T1, T2, T3, etc. for as many cycles as are required to complete execution of the instruction. Each data transfer, etc., which takes place in the register section 80 is caused by decoding the contents of both the instruction register 69 and the timing control unit 65.

Additional control lines which affect the execution of the instructions are derived from the interrupt logic unit 71 and from the process status register 70. The interrupt logic unit 71 controls the CPU interface to the interrupt inputs to assure proper timing, enabling, sequencing, etc., which the CPU 51 recognizes and services.

The processor status register 70 also can contain a set of latches which serve to control certain aspects of the CPU operation, say to indicate the results of CPU arithmetic and logic operations, and to indicate the status of data either generated by the CPU or transferred into the CPU from outside.

Since the real work of the CPU is carried on in the register section 80 of the CPU, perhaps a detailed study is in order. The components of section 80 include:

Data Bus Buffers 75
Input Data Latch (DL) 74
Program Counter (PCL), PCH) 72
Accumulator (A) 73
Arithmetic Logic Unit (ALU) 63
Stack Pointer (S) 82
Index Registers (X, Y) 77
Address Bus Latches/Buffers 76
Process Status Register (P) 70

Again referring to FIG. 5, at 1 mHz the data which come into the CPU from the program memory 54, the data memory 53 or from peripheral devices appears on the bus 55 during the last 100 nanoseconds of Phase Two. No attempt is made to actually operate on the data during this short period. Instead, it is simply transferred into the input data latch 74 (FIG. 6) for use during the next cycle. The data latch 74 serves to trap the data on the bus during each Phase Two pulse. It can then be transferred onto one of the internal buses, say bus 64, and from there into one of the internal registers. For example, data being transferred from memory into the accumulator 73 will be placed on the internal data bus 64 and will then be transferred from the internal data bus 64 into the accumulator 73. If an arithmetic or logic operation is to be performed, say using the data from a memory unit and the contents of the accumulator 73, data in the input data latch 74 will be transferred onto the internal data bus 64 as before. From there, it will be transferred into the ALU 63. At the same time, the contents of the accumulator 73 will be transferred onto a bus in the register section 80 and from there into the second input to the ALU 63. The results of the arithmetic or logic operation will be transferred back to the accumulator 73 on the next cycle by transferring first onto the bus and then into the accumulator 73. All of these data transfers take place during the Phase One clock pulse.

The program counter (PCL, PCH) 72 provides the addresses which step the CPU through sequential instructions to the program. Each time the CPU fetches an instruction from program memory, the contents of PCL 72 are placed on the low-order 8 bits of the address bus and the contents of PCH 72 are placed on the high-order 8 bits. The counter 72 is incremented each time an instruction or data is fetched from program memory.

Accumulator 73 is a general-purpose 8-bit register which stores the results of most arithmetic and logic operations. In addition, the accumulator 73 usually contains one of the two data words used in these operations.

All logic and arithmetic operations take place in the ALU 63. This includes incrementing and decrementing of internal registers (except PCL and PCH 72). However, the ALU 63 cannot store data for more than one cycle. If data are placed on the inputs to the ALU 63 at the beginning of one cycle, the result is always gated into one of the storage registers or to external memory during the next cycle. Each bit of the ALU 63 has two inputs. These inputs can be tied to various internal buses or to a logic zero; the ALU 63 then generates the SUM, AND, OR, etc., function using the data on the two inputs.

Stack pointer (S) 82 and the two index registers (X and Y) 77 each consist of 8 simple latches. These registers store data which are to be used in calculating addresses in data memory.

Address bus buffers 76 consist, in part, of a set of latches and TTL compatible drivers. These latches store the addresses which are used in accessing the peripheral devices (ROM, RAM, and I/O's of FIG. 5.

Table VI illustrates the total CPU instructions which must be used to carry out the method of the present invention.

In brief, the CPU instruction set is divided into three basic groups. The first group has the greatest addressing flexibility and consists of the most general-purpose instructions such as Load, Add, Store, etc. The second group includes the Read, Modify, Write instructions such as Shift, Increment, Decrement and the Register X movement instructions. The third group contains all the remaining instructions, including all stack operations, the register Y, compares for X and Y and instructions which do not fit naturally into Group One or Group Two.

There are eight Group One instructions, eight Group Two instructions, and all of the 39 remaining instructions are Group Three instructions.

The three groups are obtained by organizing the OP CODE pattern to give maximum addressing flexibility (16 addressing combinations) to Group One, to give 8 combinations to Group Two instructions and the Group Three instructions are basically individually decoded.

Group One Instructions

These intructions are: Add With Carry (ADC), (AND), Compare (CMP), Exclusive Or (EOR), Load A (LDA), Or (ORA), Subtract With Carry (SBC), and Store A (STA). Each of these instructions has a potential for 16 addressing modes, although usually in practice only 8 of the available modes are used.

Addressing modes for Group One are: Immediate, Zero Page, Zero Page Indexed by X, Absolute, Absolute Indexed by X, Absolute Indexed by Y, Indexed Indirect, Indirect Indexed. The unused 8 addressing modes are used to allow, possibly, addressing of additional on-chip registers, of on-chip I/O ports, and to allow two-byte word processing.

Group Two Instructions

Group Two instructions are primarily Read, Modify, Write instructions. There are really two subcategories within the Group Two instructions. The components of the first group are shift and rotate instructions and are: Shift Right (LSR), Shift Left (ASL), Rotate Left (RCL), and Rotate Right (ROR).

The second subgroup includes the Increment (INC) and Decrement (DEC) instructions and the two index register X instructions, Load X (LDX) and Store X (STX). These instructions would normally have 8 addressing modes available to them because of the bit pattern. However, to allow for upward expansion, only the following addressing modes have been defined: Zero Page, Zero Page Indexed by X, Absolute, Absolute Indexed by X, and a special Accumulator (or Register) mode. The four shift instructions all have register A operations; the incremented or decremented Load X and Store X instructions also have accumulator modes, although the Increment and Decrement Acculumator has been reserved for other purposes. Load X from A has been assigned its own mnemonic, TAX. Also included in this group are the special functions of Decrement X which is one of the special cases of Store X. Included also in this group in the X decodes are the TXS and TSX instructions.

All group One Instructions have all addressing modes available to each instruction. In the case of Group Two instructions, another addressing mode has been added; that of the accumulator and the other special decodes have also been implemented in this basic group. However, the primary function of Group Two instructions is to perform some memory operation using the appropriate index.

It should be noted for documentation purposes that the X instructions have a special mode of addressing in which register Y is used for all indexing operations; thus, instead of Zero Page Indexed by X, X instructions have Zero Page Indexed by Y, and instead of having Absolute Indexed by X, X instructions have Absolute Indexed by Y.

Group Three Instructions

There are really two major classifications of Group Three instructions; the modify Y register instructions, Load Y (LDY), Store Y (STY), Compare Y (CPY), and Compare X (CPX), instructions actually occupy about half of the OP CODE space for the Group Three instructions. Increment X (INX) and Increment Y (INY) are special subsets of the Compare X and Compare Y instructions and all of the branch instructions are in the Group Three instructions.

Instructions in this group consist of all of the branches: BCC, BCS, BEQ, BMI, BNE, BPI, BPC and BPS. All of the flag operations are also devoted to one addressing mode—they are: CLC, SEC, CLD, SED, CLI, SEI and CLV. All of the push-and-pull instructions and stack operation instructions are Group Three instructions. These include: BRK, JSR, PHA, PHP, PLA and PLP. The JMP and BIT instructions are also included in this group. There is no common addressing mode available to members of this group. Load Y, Store Y, BIT, Compare X and Compare Y have Zero Page and Absolute, and all of the Y and X instructions allow Zero Page Indexed operations and Immediate.

Returning to FIG. 5, the total CPU instruction set of Table VII which controls CPU 51 is stored in the program memory unit 53. The CPU 51 references the contents of the agency unit 53 in order to determine appropriate processing steps.

In operations, the addresses of the instruction set, in order, are numerically adjacent, the lower addresses containing the first instructions to be executed and the higher addresses containing later instructions.

The only time the program violates the sequential rule previously mentioned is when the instruction in one section of memory is a "jump" instruction to another section of memory.

A jump instruction can also contain the address of the instruction which is to follow it. The next instruction may be stored in any location in memory unit 53, FIG. 5, as long as the programmed jump specifies the correct address.

A special kind of program jump occurs when the stored program "calls" a subroutine. In this kind of jump, the CPU 51 is required to "remember" the contents of the program counter at the time that the jump occurs. This enables the CPU 51 to resume execution of the main program which it is finished with the last instruction of the subroutine.

A "subroutine" is a program within a program. Usually it is a general-purpose set of instructions that must be executed repeatedly in the course of a main program.

The CPU 51 has a special way of handling subroutines in order to insure an orderly return to the main program. When the CPU receives a call instruction, it increments the program counter and notes the counter's contents in a reserved memory area of the memory unit known as the stack area, which includes stack pointer 82 and index registers 77 of FIG. 6. The stack area thus saves the address of the instruction to be executed after the subroutine is completed. Then the CPU 51 loads the address specified in the call into the program counter 72. The next instruction fetched will therefore be the first step of the subroutine.

The last instruction in any subroutine is a "return". Such an instruction need specify no address. When the CPU 51 fetches a return instruction, it simply replaces the current contents of the program counter with the address on the top of the stack. This causes the CPU 51 to resume execution of the calling program at the point immediately following the original call instruction.

Subroutines are often "nested", that is, one subroutine will sometimes call a second subroutine. The second may call a third, and so on. This is perfectly acceptable, as long as CPU 51 has enough capacity to store the necessary return addresses, and the logical provision for doing so. In other words, the maximum depth of nesting is determined by the depth of the stack. If the stack has space for storing three return addresses, then three levels of subroutines may be accomplished.

CPU's have different ways of maintaining stack contents. Some have facilities for the storage of return addresses built into the CPU itself. Other CPU's use a reserved area of external memory as the stack area and simply maintain a stack "pointer" register, such as pointer register 82, FIG. 6, which contains the address of the most recent stack entry. The external stack hence allows virtually unlimited subroutine nesting. In addition, if the processor provides instructions that cause the contents of the accumulator 73 and other general-purpose registers to be "pushed" onto the stack or "pulled" off the stack via the address stored in the stack pointer 82, multilevel interrupt processing (as described later) is possible. The status of CPU 51 (i.e., the contents of all the registers) can be saved in the stack when an interrupt is accepted and then restored after the interrupt has been serviced. This ability to save the CPU's status at any given time is possible, even if an interrupt service routine itself is interrupted.

Each operation that the CPU can perform is identified by a unique byte of data known as an "operation code". An 8-bit word used as an operation code can distinguish between 256 alternative actions, more than adequate for most processors.

In general, all instructions begin with T0 and the fetch of the OP CODE and continue through the required number of cycles until the next T0 and the fetch of the next OP CODE. Basic terminology used in conjunction with the Figures and is as defined below, for ease of reference.

OP CODE—The first byte of the instruction containing the operator and mode of address.

OPERAND—The data on which the operation specified in the OP CODE is performed.

BASE ADDRESS—The address is Indexed addressing modes which specifies the location in memory to which indexing is referenced. The high order of byte of the base address (AB08 to AB15) is BAH (Base Address High) and the low order of the base address (AB00 to AB07) is BAL (Base Address Low).

EFFECTIVE ADDRESS—The destination in memory in which the data are to be found. The effective address may be loaded directly as in the case of page Zero and Absolute Addressing or may be calculated as in Indexing operations. The high order byte of the effective address (AB08 to AB15) is ADH and the low order byte of the effective address (AB00 to AB07) is ADL.

INDIRECT ADDRESS—The address found in the operand of instructions utilizing (Indirect), Y which contains the low order byte of the base address. IAH and IAL represent the high and low order bytes.

JUMP ADDRESS—The value to be loaded into Program Counter as a result of a Jump Instruction.

During operation, the CPU 51 fetches an instruction in two distinct operations. First, CPU 51 transmits the address in its program counter 72 of FIG. 6 to the memory. Then the memory returns the addressed byte to CPU 51, viz. to the instruction decoder 68, and uses it to direct activities during the remainder of the execution.

The mechanism by which the CPU translates an operation code into specific processing actions requires some elaboration. The 8 bits stored in the instruction decoder 68 can be decoded and used to selectively activate one of a number of output lines, in this case up to 256 lines. Each line represents a set of activities associated with execution of a particular operation code. The enabled line can be combined with selected timing pulses, to develop electrical signals that can then be used to initiate specific actions. This translation of code into action is also aided by the control circuitry associated therewith, as previously explained.

An 8-bit operation code is often sufficient to specify a particular processing action. There are times, however, when execution of the instruction requires more information than 8 bits can convey, e.g., say when the instruction references a memory location. The basic instruction code identifies the operation to be performed, but cannot specify the object address as well. In a case such as this, a 2- or 3-byte instruction must be used. Successive instruction bytes are stored in sequentially adjacent memory locations, and the CPU performs two or three fetches in succession to obtain the full instruction. The first byte retrieved from memory is placed in the CPU's instruction 66 and subsequent bytes are placed in temporary storage; the CPU then proceeds with the execution phase.

CPU 51 usually uses register-pairs to hold the address of a memory location that is to be accessed for data. If the address register is programmable (i.e., if there are instructions that allow the programmer to alter the contents of the register), the program can "build" an address in the address register prior to executing a memory reference instruction (i.e., and instruction that reads data from memory, writes data to memory or operates on data stored in memory).

ALU 63, as previously mentioned, is that portion of the CPU performing the arithmetical and logical operations on the binary data.

The ALU 63 must contain an adder which is capable of combining the contents of registers of array, the register of the CPU and accumulator 73 in accordance with the logic of binary arithmetic. This provision permits the CPU to perform arithmetical manipulations on the data it obtains from memory and from its other inputs.

Using only the basic adder, routines can subtract, multiply and divide, giving the machine complete arithmetical capabilities. In practice, however, most ALU's provide other built-in functions, including hardware subtraction, boolean logic operations and shift capabilities in conjunction with index registers 77.

As previously indicated, interrupt provisions are included on many central processors as a means of improving the CPU's efficiency. Consider the case of a computer that is processing a large volume of data, portions of which are to be output to a printer. The CPU 51 can output a byte of data within a single machine cycle, but it may take the printer the equivalent of many machine cycles to actually print the character specified by the data byte. The CPU 51 could then remain idle, waiting until the printer can accept the next data byte. If an interrupt capability is implemented to the computer, the CPU can output a data byte, then return to data processing. When the printer is ready to accept the next data byte, it can request an interrupt. When the CPU 51 acknowledges the interrupt, it suspends main program execution and automatically branches to a routine that will output the next data byte. After the byte is output, the CPU 51 continues with main program execution. Note that this is, in principle, quite similar to a subroutine call, except that the jump is initiated externally rather than by the program.

More complex interrupt structures are possible, in which several interrupting devices share the same processor but have different priority levels. Interruptive processing is an important feature that enables maximum utilization of a processor's capacity for high system throughput.

Another important feature that improves the throughput of a CPU is the hold. The hold provision enables direct memory access (DMA) operations.

In ordinary input and output operations, the CPU 51 supervises the entire data transfer. Information to be placed in memory is transferred from the input device to the CPU, and then from the CPU to the designated memory location. In similar fashion, information that goes from memory to output devices goes by way of the CPU.

Some peripheral devices, however, are capable of transferring information to and from memory much faster than the CPU itself can accomplish the transfer. If any appreciable quantity of data must be transferred to or from such a device, then system throughput will be increased by having the device accomplish the transfer directly. The CPU 51 must temporarily suspend its operation during such a transfer, to prevent conflicts that would arise if the CPU and peripheral device attempted to access memory simultaneously. It is for this reason that a hold provision is provided.

TABLE VI
Summary of Processor Instructions by Hexadecimal Sequence

| Hexadecimal | Mnemonic |
|---|---|
| $\phi\phi$ | BRK |
| $\phi$1 | ORA - (Indirect,X) |
| $\phi$5 | ORA - Zero Page |
| $\phi$6 | ASL - Zero Page |
| $\phi$8 | PHP |
| $\phi$9 | ORA - Immediate |
| $\phi$A | ASL - Accumulator |
| $\phi$D | ORA - Absolute |
| $\phi$E | ASL - Absolute |
| 1$\phi$ | BPL |
| 11 | ORA - (Indirect),Y |
| 15 | ORA - Zero Page,X |
| 18 | CLC |
| 19 | ORA - Absolute,Y |
| 1D | ORA - Absolute,X |
| 1E | ASL - Absolute,X |
| 2$\phi$ | JSR |
| 21 | AND - (Indirect,X) |
| 24 | BIT - Zero Page |
| 25 | AND - Zero Page |
| 26 | ROL - Zero Page |
| 28 | PLP |
| 29 | AND - Immediate |
| 2A | ROL - Accumulator |
| 2C | BIT - Absolute |
| 2E | ROL - Absolute |
| 3$\phi$ | BMI |
| 31 | AND - (Indirect),Y |
| 35 | AND - Zero Page,X |
| 36 | ROL - Zero Page,X |
| 38 | SEC |
| 39 | AND - Absolute,Y |
| 3D | AND - Absolute,X |
| 3E | ROL - Absolute,X |
| 4$\phi$ | RTI |
| 41 | EOR - (Indirect,X) |
| 45 | EOR - Zero Page |
| 46 | LSR - Zero Page |
| 48 | PHA |
| 49 | EOR - Immediate |
| 4A | LSR - Accumulator |
| 4C | JMP - Absolute |
| 4D | EOR - Absolute |
| 4E | LSR - Absolute |
| 5$\phi$ | BVC |
| 5$\phi$ | BVC |
| 51 | EOR - (Indirect),Y |
| 55 | EOR - Zero Page,X |
| 56 | LSR - Zero Page,X |
| 58 | CLI |
| 59 | EOR - Absolute,Y |
| 5D | EOR - Absolute,X |
| 5E | LSR - Absolute,X |
| 6$\phi$ | RTS |
| 61 | ADC - (Indirect,X) |
| 65 | ADC - Zero Page |
| 66 | ROR - Zero Page |
| 68 | PLA |
| 69 | ADC - Immediate |
| 6A | ROR - Accumulator |
| 6C | JMP - Indirect |
| 6D | ADC - Absolute |
| 6E | ROR - Absolute |
| 7$\phi$ | BVS |
| 71 | ADC - (Indirect),Y |
| 75 | ADC - Zero Page,X |
| 76 | ROR - Zero Page,X |
| 78 | SEI |
| 79 | ADC - Absolute,Y |
| 7D | ADC - Absolute,X |
| 7E | ROR - Absolute,X |

TABLE VI-continued
Summary of Processor Instructions by Hexadecimal Sequence

| Hexadecimal | Mnemonic |
|---|---|
| 81 | STA - (Indirect,X) |
| 84 | STY - Zero Page |
| 85 | STA - Zero Page |
| 86 | STX - Zero Page |
| 88 | DEY |
| 8A | TXA |
| 8C | STY - Absolute |
| 8D | STA - Absolute |
| 8E | STX - Absolute |
| 9φ | BCC |
| 91 | STA - (Indirect),Y |
| 94 | STY - Zero Page,X |
| 95 | STA - Zero Page,Y |
| 98 | TYA |
| 99 | STA - Absolute,Y |
| 9A | TXS |
| 9D | STA - Absolute,X |
| Aφ | LDY - Immediate |
| A1 | LDA - (Indirect,X) |
| A2 | LDX - Immediate |
| A4 | LDY - Zero Page |
| A5 | LDA - Zero Page |
| A6 | LDX - Zero Page |
| A8 | TAY |
| A9 | LDA - Immediate |
| AA | TAX |
| AC | LDY - Absolute |
| AD | LDA - Absolute |
| AE | LDX - Absolute |
| Bφ | BCS |
| B1 | LDA - (Indirect),Y |
| B4 | LDY - Zero Page,X |
| B5 | LDA - Indirect,X |
| B6 | LDX - Indirect,Y |
| B8 | CLV |
| B9 | LDA - Absolute,Y |
| BA | TSX |
| BC | LDY - Absolute,X |
| BD | LDA - Absolute,X |
| BE | LDX - Absolute,Y |
| Cφ | CPY - Immediate |
| C1 | CMP - (Indirect,X) |
| C4 | CPY - Zero Page |
| C5 | CMP - Zero Page |
| C6 | DEC - Zero Page |
| C8 | INY |
| C9 | CMP - Immediate |
| CA | DEX |
| CC | CPY - Absolute |
| CD | CMP - Absolute |
| CE | DEC - Absolute |
| Dφ | BNE |
| D1 | CMP - (Indirect),Y |
| D5 | CMP - Zero Page,X |
| D6 | DEC - Zero Page,X |
| D8 | CLD |
| D9 | CMP - Absolute,Y |
| DD | CMP - Absolute,X |
| DE | DEC - Absolute,X |
| Eφ | CPX - Immediate |
| E1 | SBC - (Indirect,X) |
| E4 | CPX - Zero Page |
| E5 | SBC - Zero Page |
| E6 | INC - Zero Page |
| E8 | INX |
| E9 | SBC - Immediate |
| EA | NOP |
| EC | CPX - Absolute |
| ED | SBC - Absolute |
| EE | INC - Absolute |
| Fφ | BEQ |
| F1 | SBC - (Indirect),Y |
| F5 | SBC - Zero Page,X |
| F6 | IQC - Zero Page,X |
| F8 | SED |
| F9 | SBC - Absolute,Y |
| FD | SBC - Absolute,X |
| FE | INC - Absolute,X |

MODIFICATION

To repeat, in estimating gas-liquid saturation effects in lithologies having any degree of consolidation, inputting only compressional-wave velocity, density and porosity is all that is required in order to provide estimates of the compression (or bulk) moduli, $K^*$, of fluid-saturated strata; the compression moduli, $K_a$, of strata with empty pores (or with pore-fluid pressures held constant $K_{fc} = K^* - K_a$; and the shear moduli, $G^*$ of the fluid-saturated strata (or $G_a$, of the empty strata).

And for an isotropic and homogeneous medium, the velocity, density and moduli are as related above:

$$\rho_B V_p^2 = P^* = K^* + (4/3)G^* \quad (18)$$

$$\rho_B V_s^2 = G^* \quad (19)$$

where rho-B is the bulk density of the formation.

If both compressional- and shear-wave velocities are known, of course, Equation 18 gives $K^*$ directly. But no shear-wave logs exist for most basins under study; furthermore, if they exist, the results are unreliable in loose (unconsolidated) sands.

For convenience and brevity, a program listing has been formulated to ease the solution of the above equations and is set forth below in the Appendix. In such listing, several lower-case symbols will represent dimensionless ratios of moduli where $a = K_a/K_m$, $b = K^*/K_m$, $g + G^*/G_m = G_a/G_m$, and $f = (K_m/K_f) - 1$.

Gassmann's equations 18 and 20d can be modified:

$$\rho_B V_p^2 = P^* = bK_m + (4/3g)G_m \quad (18)$$

$$(K^* - K_a)/K_m = K_{fc}/K_m = b - a = \quad (20d)$$

$$\frac{(1-a)^2}{f\phi + (1-a)} = \frac{(1-b)^2}{f\phi - (1-b)}$$

Additionally, an acceptable empirical relationship between the a and g dimensionless ratios includes:

$$a - g = f_3(c, a + g) \quad (63)$$

where c is an adjustable parameter, a and g are as defined above, and $f_3$ is a functional operator.

The program is somewhat different in that it computes fluid effects Kf in limestone, sandstone or dolostone formations in which the saturants can be oil (of any gravity), gas (of any gravity), brine, or a combination of all of the above. The resulting output of the program then is the best estimate of seismic velocities and densities as a function of the assumed saturants. Needed input data are depth, pressure gradient, temperature gradient, compressional velocity, Vp (from a sonic log), porosity, $\phi$, bulk density, rho-b, and lithology. Detailed mineralogy is desirable, but not necessary. Note that the user first assumes a gas-oil-brine saturation; an expected compressional velocity Vp, shear velocity Vs, and Poisson's ratio, sigma*, are computed for the formation in the extrapolated region adjacent the well bore. Then data seismic reflectivities can be modeled as a function of gas-oil saturations, for any gravity liquid or gas. Shear wave data are not necessary to use the technique of the present invention. Section A of the listing of the program indicates that the comment statements of the program are quire complete. They describe the meaning of the different symbols used in the program, the method of inputting data to the program and references to the literature relevant to the theory of operation.

Much of the data are built into the program by means of such declarative statements. The inputs are also exhibited in the early part of the program listing.

Briefly, in operation, after reading in the parameter cards and sample cards and possibly mineral cards, the program proceeds to a main compute loop.

Section B illustrates the main part of the program. Note that the compute loop calculates the quantities needed to make the Biot-Gassman fluid corrections to the bulk modulus as a function of gas saturation and oil saturation. Note that the user can indicate lithology, i.e., sandstone, limestone and dolostone lithologies. Furthermore, it does not obtain the gas bulk modulus for methane only, but uses the complete Benedict-Webb-Rubin non-ideal gas law in pseudo-reduced form to calculate both gas modulus and the gas density. Surprisingly, for predicting elastic properties of fluids using field data, the isothermal form of the Benedict-Webb-Rubin equation has been found to be unexpectedly accurate in predicting the gas bulk modulus $Kg^*$. Reason: at the frequencies of interest, heat exchange between the rock and gas is minimal, assuming average pore sizes, and usual values of heat conductivities for the gas. A very important input is the API gas gravity and, in addition, the API oil gravity in cases where the user wishes to consider a total fluid consisting of brine, gas and oil mixtures. It should be pointed out that the three components are in separate phases in the pores spaces of the rock. As the program proceeds, calculations for different gas and oil saturations occur, varying the gas saturation over 18 values from 0 to 100% while also varying within each gas saturation the oil saturation over 6 values from 0 to 100% in steps of 20%. The program requires that the sum of the gas, oil and brine saturations be equal to unity and will stop the calculation and proceed to the next case if the sum of the saturations exceeds unity.

For sandstones and sands, essentially the program does the following. Using its brine-saturated inputs, rho-B, the bulk density and Vp, the compressional wave velocity, in the case of a sandstone subroutine KGKA is called to solve simultaneously Equations 18, 20d and 63. Km is the solid matrix bulk modulus, Gm is the solid matrix shear modulus and $P^*$ is the P-wave modulus.

These are a set of non-linear equations in the quantities a, b, f3 and g defined by equations $a = K_a/K_m$ $b = K^*/K_m$ $g = G^*/G_m$ and $f_0 = K_m/K_f - 1$ Since the matrix moduli Km, Gm will be known, one can then solve for the Biot-Gassmann frame modulus Ka, the brine-filled bulk modulus $K^*$ and the brine-filled shear modulus $G^*$. Kf is the total fluid modulus.

For carbonates, in the case of a limestone or dolostone the equations are not solved by the halving search of KGKA, but rather another subroutine LIDOS is entered. It uses the set of equations which are linear in the P-wave modulus $P^*$, namely the equations indicated above. There ak, bk, ag, bg are pressure-dependent empirical coefficients.

The Biot-Gassmann equation is again used and the system is solved by LIDOS to give $K^*$, $G^*$ and the frame modulus Ka. Ka and $G^*$ are independent of the fluid in the pores so that these values can be used over and over again when needed. $K^*$ is not so independent, but requires for its calculation a repeated application of the fluid correction and the Biot-Gassmann equations. This is done in subroutine BIOT for the various fluid moduli, Kf, computed by subroutine FLMOD2.

Gas Equations

The gas modulus and density are computed before entering the DO compute loop in which gas and oil saturations are varied by a subroutine GASMD2. The subroutine GASMD2 essentially solves the Benedict-Webb-Rubin equation for the reciprocal of the pseudo-reduced volume, namely, if $X = 1/V_{pr}$ as previously explained, which has to be solved for X in a search procedure.

Equation 45 is an isothermal non-ideal equation of state in pseudo-reduced form. The choice of an isothermal process for natural gases in typical rocks at typical temperature and pressure ranges and at seismic frequencies is justified.

In Equation 45, the quantities gamma-r, Bor, Aor, Cor, br, ar, alpha-r are the Benedict-Webb-Rubin coefficients given in the reference of record.

Upon exit from GASMD2, the user is provided with the gas bulk modulus Kgas and the gas density rho-gas. An inner loop is next entered in which the gas and oil saturations are varied as described above. For each particular gas, oil and brine saturation adding up to unity, a subroutine FLMOD2 is entered with the saturations and with the porosity, which calculates the effective fluid bulk modulus, Kf, by means of applications of Wood's equation for the fluid moduli, (Wood's equation states that the total fluid bulk modulus Kf is given by 1/Kf3 = Sgas + Soil/Koil + (1−Sgas−Soil)/Kbrine, where Sgas and Soil are fractional gas and oil saturations) and the new bulk density RHOBC, which reflects the new fluid mixture, is calculated. What varies as this routine is entered are the saturations, the effective fluid moduli and the effective bulk density. The BIOT subroutine is then entered, and using the original and unchanging frame modulus Ka makes the fluid correction yielding the current $K^*$ for the current oil and gas saturations.

The routine also calculates the oil bulk modulus and density, since these are necessary parts of the fluid moduli and density calculations, as previously indicated.

Upon exit from FLMOD2, an effective Poisson's ratio, sigma*, is calculated, and in addition the P-wave velocity and S-wave velocities for this case are obtained from the current $K^*$ and rho-B using $\sigma^* = (3K^* - 2G^*)/(6K^* + 2G^*)$ $P^* = \rho_B V_p^2 = K^* + (4/3)G^*, \rho_B V_s^2 = G^*.$ For each pair of these saturations, the P-wave velocity, the S-wave velocity, the Poisson's ratio, and the bulk density, are printable. Such data constitutes the main output of the program.

Note further in the program that for assumed conditions, the modulus Kf = 25 Kbar (to be within the accuracy needed) is pressure-independent. However, an estimate of Km, Gm, and a relationship between a and g are also needed.

To estimate Km and Gm, all information on rock composition of a given area (basin, formation, well, etc.) must be used, i.e., using samples or logs (nuclear, etc.). But mean values for Km and Gm are fairly accurate for many sands, consolidated or not, viz:

$$Km = 393 \text{ Kbar}; \quad Gm = 361 \text{ Kbar} \tag{64}$$

The standard deviations of the above quantities for several samples measured were 7% and 12% respectively. Extensive calculations with and without physical models, with sandstone data, produced the acceptable empirical relationship between a and g previously indicated, i.e., Equation 63, $$a - g = f_3(c, a+g)$$

where c is an adjustable empirical parameter, a and g are as described above, and $f_3$ is a functional operator which relates to the variables of interest in an empirical fashion. It was surprising found by minimizing the rms error between predicted and measured moduli values and is pressure-independent in the above approximation. The correlation coefficients for estimating K* and G* using Equation 63 are both over 0.95.

Final data base includes suites for all lithologies of interest, with densities and porosities measured and with all compressional-wave and shear-wave velocities measured as functions of pressure. In addition, compositions were determined by an overlapping suite of measurements to give estimates of Km and Gm. Equation 18 supra gives G*, P* and K*; with values of Km and Gm, a and g can then be provided. Equation 63 then gives a c-value for each sample. Such c-values were found not to be significantly correlated with either G, $\phi$, Km/Gm, Gm, or some other pertinent parameters.

Samples containing substantial amounts of carbonates or high-elastic-modulus iron minerals, e.g., had somewhat negative correlations of c with Km. Deleting such samples from the data base reduced the suite of hard sandstones slightly. A slight negative correlation also existed between c and pressure.

By adopting the above equations and the value Kf = 25 Kbar, all the information needed to use Equations 18 and 20d become available. The computation, however, is easy to do only "backwards"; that is, by starting with some value of (a+g) and computing (a−g), a and g. Then Equation 20d gives b, and finally, Equation 18 gives P*. Of course, use of the definitions of the various quantities as indicated above is mandatory.

To use P* and $\phi$ to compute K*, Ka, G*, etc., one approach is to program an iterative solution as set forth below. But also, another approach would be to start with various values of (a+g) and construct plots or of the desired quantities as functions of P* for various values of $\phi$, as also indicated below.

Carbonates

In the case of a limestone or dolostone, Equations 18, 20d, 33 and 34 are not directly solved by the method outlined above; instead, a new set of equations can be used, viz., Equations 20d, 21 and 22, supra; these equations which are functions of the P-wave modulus, P*, are used to solve for bulk and shear moduli (K* and G*) and the frame modulus (Ka) is next solved using the relationship $a = Ka/Km$; $b = K*/Km$; $g = G*/Gm$; and $f = Km/Kf - 1$. For carbonates, it is preferable that Equation 20d be rewritten as follows:

$$a = \frac{(f\phi + 1)b - 1}{f\phi + b - 1} \tag{20f}$$

Note in the above calculations that Ka and G* are independent of the fluid in the pore space, so that the former values can be used over again as needed. The variable K* is not independent, but requires repeated application of the fluid correction and the Biot-Gassmann Equations 20a–20f. This can routinely be achieved for various fluid moduli as specified in detail below.

Note that the present invention not only allows the experimentor to specify that the formation is initially 100% brine saturated, but also to be able to specify that the lithology is sandstone, limestone, or dolostone. Detailed mineralogy permits him also to make a more accurate estimate, but it is not a necessary input variable. If detailed mineralogy is known, the volume percent of each component must be input in a manner shown in the method set forth below.

The program uses the Voigt-Reuss-Hill (VRH) method to calculate the bulk modulus, Km, and the shear modulus, Gm, of the solid part of the rock.

If the detailed mineralogy is not used, the method of the present invention automatically defaults to "average" values of Km and Gm for each lithology.

If a rock is widely different in composition from "average" rocks, detailed mineralogy is necessary in order to do accurate estimates. For example, if a limestone contained quartz beyond about 25%, the Km, Gm default values for limestones could lead one into significant errors in estimation of fluid effects.

Data banks for the process of the invention, of course, must come from a 100%-brine-saturated section of a well. If Km and Gm are known from mineralogical analysis, such values are used. If not, the assumed values of 393 and 361 Kbar, respectively, are available. The solution to Gassmann's equation is very sensitive to errors in Km only when the porosity is low. As the major application of these equations is intended to be in high-porosity "soft" rocks, errors in Km are not apt to be a major drawback.

Note the general expression for Vp for any fluid saturant:

$$V_p = \left[ 1/\rho_b \left\{ \hat{K}_a + \frac{(1 - \hat{K}_a/K_m)^2}{\phi/K_f + (1 - \phi)/K_m - \hat{K}_a/K_m^2} + (4/3)\hat{G}* \right\} \right]^{\frac{1}{2}}$$

where Kf equals the bulk modulus for a brine-gas mixture.

Iterative Method in Detail

The objective is to start with assumed values of Km, Gm, and Kf, and the measured values of P* and $\phi$; and then to use the empirical relationship in Equation 34 and Gassmann's Equation 20d supra to estimate Ka, K*, Kfc and G*. A simple iterative calculation with interval-halving to update the variable (a+g) of Equation 34 is available, and such sequence is as follows:

(1) From the current value of (a+g), calculate (a−g); then solve for a and g, and use Gassmann's equation 20d to get b. Use Equations 33 and 18 and the definitions of the quantities to get trial values of K*, G* and finally P*. Let the trial value of P* be P'; the error in P* is then P'−P*.

(2) If the sign of the error is opposite to that of the preceding error, divide the increment for updating (a+g) by −2. That is, if (P'−P*) has crossed zero, reverse directions and use steps only half as large.

(3) Update (a+g) by adding the current size and sign of the increment, as mentioned above.

(4) If the increment [or (P'−P*)] is satisfactorily small, terminate the iteration. Otherwise, repeat from Step (1).

Suitable starting values are (a+g)=0, increment=+0.4, and negative (P'−P*). The results for (a+g), (a−g) and K* are easily used to calculate the various parameters.

APPENDIX

Having now briefly described the operation of the CPU 51 and of an instruction set for operation of a particular type microprocessor system, e.g. MGS 6500, the program listing for carrying out, in the main, the method of the present invention is of consequence and is set forth below in detail.

The listing is divided into two sections. Section A contains comments as to the purpose and scope of the method. E.g., Steps 40,000–17,021 detail the purpose and limitations of the method; Steps 460,000–950,000 indicate the form and nature of the input data; Steps 970,000–1,130,000 state the form and nature of the output information; Steps 1,140,000–1,190,000 indicate what error messages are to be expected; Steps 1,210,027–1,220,012 indicate the nature and scope of subroutines, etc.

Section B describes the method in detail for calculating various petrophysical parameters of interest. Note that designated instruction numbers describe particular operations as carried by the subsequent instructions. These commands provide in sequence form the operations previously described with reference to FIGS. 5 and 6. Comparison of actual versus synthetic values then occurs on a separate internal (or external) basis as previously described.

SUMMARY

The program has a variety of potential uses, especially in areas where shear wave data are either unavailable or unreliable. It should be of most value in areas where the rocks are "soft", i.e., they are poorly cemented, fractured or have high porosity. Fluid effects in general tend to diminish with increasing effective pressure, so these concepts will be more likely applicable at shallow depths. They will also, in general, be more observable in young rather than old sediments.

Hard, low-porosity and well-cemented rocks of any lithology are poor candidates to attempt these types of calculations.

Among the sands, the more soil-like materials are the most likely, and the well-cemented quartzites the least likely, candidates.

The order among carbonates is (1) chalks; (2) clastics; and (3) reefs.

The user is advised to be cautious in applying the invention to abnormally pressured formations, inasmuch as empirical relationships are established for normal fluid pressures. Additionally, possible fluid pressure dependence may alter the validity of the numerical constants. Furthermore, other uncertainties could be emergent, due to the fact that the invention cannot take into account possible changes in porosity resulting from alteration in the fluid pressure gradient. This inability to take these porosity changes into account could lead to apparently anomalous calculated velocities. Hence, if the user attempts to model an abnormally pressured section by altering the fluid pressure gradient, he should bear in mind these cautions.

Inputting incompatible brine-saturated velocities, porosities and/or densities will lead to a warning message to the user that he has violated an elastic lower-bound condition; however, the calculations will proceed.

Further in summary, the invention has proven to be surprisingly accurate in computing the change in compressional-wave velocity due to a change in pore fluids. Examples of calculations include two poorly consolidated sands from a West Cameron well, offshore Louisiana, and such estimates correlate surprisingly well with laboratory results.

SECTION A

```
15   I C    PURPOSE-THIS PROGRAM TAKES BRINE SATURATED PETROPHYSICAL
16   I C    PARAMETERS FOR A ROCK SAMPLE OR EARTH SECTION AND COMPUTES
17   I C    FOR A RANGE OF G/O SATURATIONS THE P-WAVE VELOCITY,VCP, THE SHE-
18   I C    WAVE VELOCITY VCS, THE POISSON'S RATIO AND THE CALCULATED BULK
19   I C    DENSITY RHOBC AND LISTS THEM IN A TABLE. THE PROGRAM MAY OR MAY
20   I C    NOT HAVE MINERALOGICAL INPUTS X(I),I=1,13.
21   I C    SANDSTONE,LIMESTONE & DOLOSTONE LITHOLOGIES ARE ALLOWED.
22   I C       THIS PROGRAM DIFFERS FROM THE ORIGINAL BALTIMOR IN THAT IT C
23   I C    HANDLE THE THREE LITHOLOGIES AS WELL AS A VARIETY OF OIL AND GA
24   I C    SATURATIONS (SOIL+SGAS <1.0). THE BENEDICT-WEBB-RUBIN EQN. IS U
25   I C    TO OBTAIN KGAS (GAS MODULUS) AND RHOGAS (GAS BULK DENSITY.)
26   I C    KGAS IS COMPUTED FROM THE ISOTHERMAL FORM OF THE B-W-R FUN.
31   I C    SPECIAL EMPIRICAL RELATIONS ARE USED TO OBTAIN KOIL(OIL BULK MO
32   I C    AND RHOOIL (OIL BULK DENSITY).
33   I C
34   I C    THIS PROGRAM TAKES AS INPUT:
35   I C    1. 3 HEADING CARDS PER SUITE OF PROBLEMS,ALPHAMERIC COLS.1..80.
36   I C       FORMAT(20A4).
37   I C    2. A PARAMETER CARD (8F7.0,3I3) :
38   I C       TGRAD=DEG.F TEMP GRADIENT.
39   I C       FGRAD=FLUID PRESSURE GRADIENT.
40   I C       CO=THOMPSON BROWN EQN. COFF.
41   I C       KBRINE=BRINE BULK MODULUS.
42   I C       RHOBRN=BRINE BULK DENSITY(GM/CM**3).
```

```
 43    ; C       TOL=T-B EQN HALVING SEARCH TOLERANCE.
 44    ; C       TO=SURFACE TEMP.DEG.F. DEFAULT=74 DEG. F.
 45    ; C       TST=TOLERANCE OF COMPUTED VS. OBSERVED BULK DENSITY VARIATIO
 46    ; C        IN %.              APPLIES WHEN MINERALS ARE KNOWN (MIN.>0
 47    ; C       NBUG=SPECIAL (RESEARCHY) DEBUG PARAMETER WHEN>0., DEFAULT=0.
 48    ; C       NSG=NO. OF GAS SATURATION ,SG,VALUES. (CURRENTLY LIMITED TO
 49    ; C       18 VALUES(SEE ARRAYS BELOW). DEFAULT=18.
 50    ; C       NSO=NO. OF OIL SATURATION VALUES,CURRENTLY=6=DEFAULT.
 51    ; C       TO OBTAIN ZERO OIL SATURATION, SET NSO=1, OILSAT=0.0
 52    ; C    3. A SECOND PARAMETER CARD (5F10.0,2F8.0):
 53    ; C       GASGRV=API GAS GRAVITY, DEFAULT=0.554 (METHANE)F10.0
 54    ; C       OILGRV=API OIL GRAVITY,
 55    ; C       OVGRAD=OVERBURDEN PRESSURE GRADIENT.
 56    ; C       OILSAT, A PREDETERMINED FIXED OIL SATURATION(%) WHICH HOLDS
 57    ; C       THE OIL SATURATION FIXED IF OILSAT>0. THE DEFAULT=0 ,IN WHIC
 58    ; C       CASE OIL SATURATION CAN VARY FROM SO(1)...SO(NSO), WHERE NSO
 59    ; C       WHEN OILSAT >0, NSO=1 AUTOMATICALLY.
 65    ; C       TO OBTAIN ALL DEFAULTS,SET QUANTITY EQUAL TO BLANK, < OR = 0.
 66    ; C    4. INPUT CARDS (SAMPLE CARDS),NOBJ IN NUMBER COUNTED AUTOMATICA
 67    ; C       THESE CONTAIN:
 68    ; C       A.OBSERVED P-WAVE VELOCITY IN FT.SEC(OR SONIC LOG MICRSEC./FT.
 69    ; C         NOTE; IF SONIC =0.0, VELOCITY, IF SONIC. NE.0.0 CONVERTS
 70    ; C         SONIC LOG TO FT./SEC., VP=1.0E6/VP, ORIGINALLY VP=DELTAT,
 71    ; C         WHERE DELTAT IS IN MICROSEC./FT.      COLS.1..10.
 72    ; C       B.BULK DENSITY IN GM/CM**3              COLS.11..20.
 73    ; C       C.POROSITY IN %                         COLS.21..30.
 74    ; C       D.DEPTH IN FT.                          COLS.31..40.
 75    ; C       E.TEMPERATURE(DEG.F) COMPUTED IF .LE.0  COLS.41..50.
 76    ; C       F. MIN=0(NO MINERALOGY), IF>0,MINERALOGY ,X(I), KNOWN.
 77    ; C         DEFAULT=0. COLS.51..53.
 78    ; C       G. LTH=1 (SANDSTONE), =2(LIMESTONE), =3(DOLOSTONE) COLS. 54..5
 79    ; C       H.SONIC. IF=0,P-WAVE VELOCITY. IF .NE.0,MICROSEC/FT IN COLS.
 80    ; C         1...10, WHICH IS CONVERTED TO FT./SEC.(INDICATES SONIC LOG).
 81    ; C         DEFAULT=0.0.                          COLS.57..66.
 82    ; C       I.SAMP(J),COL(J)=A8,A2 SAMPLE ID COLS. 71...80.
 83    ; C       J. TERMINATED BY END FLAG CARD(COLS.1..66 BLANK OR ZERO.)
 84    ; C
 85    ; C       FORMAT IS (5F10.0,2I3,F10.0,4X,A8,A2)
 86    ; C
 87    ; C       POSSIBLE MINERALS CARD:
 88    ; C       WHEN MIN =0 NO MINERALS ASSUMED AND KM,GM DEFAULTS TAKEN,
 89    ; C       ALSO RHOBC=MEASURED BULK DENSITY AND RHOM(J) IS COMPUTED TO BE
 90    ; C       COMPATIBLE WITH THIS.
 91    ; C       WHEN MIN>0, A MINERAL CARD ,FORMAT(13F5.0) FOLLOWS THE GENERAL
 92    ; C       PHYSICAL PARAMETER CARD A---G WITH SAME ID IN COLS. 71..80,
 93    ; C       (SAMP,COL)AND WITH MINERALS X(1)...X(13) IN % IN 5 COL. FIELDS
 94    ; C       THESE ARE:
 95    ; C       1.  QUARTZ=X(1)
 96    ; C       2.  CALCITE=X(2)
 97    ; C       3.  DOLOMITE=X(3)
 98    ; C       4   CLAYS=X(4)
 99    ; C       5.  SILICA=X(5)
100    ; C       6.  FELDSPARS=X(6)
101    ; C       7.  ANHYDRITE=X(7)
102    ; C       8.  SIDERITE=X(8)
103    ; C       9.  BARITE=X(9)
104    ; C       10. PYRITE=X(10)
105    ; C       11. RUTILE=X(11)
106    ; C       12. HALITE=X(12)
107    ; C       13. MICA=X(13), ALL IN PERCENT AND NORMALIZED.
108    ; C       IF NOT NORMALIZED, PROGRAM WILL DO SO.
109    ; C       (THIS CARD MUST FOLLOW THE EACH SAMPLE CARD IF MIN>0)
110    ; C       A BLANK OR 0 X(I) CARD WILL DEFAULT TO MIN=0.
111    ; C       THE ELASIC PARAMETERS K(I),G(I) THE SHEAR & BULK MODULI FOR
112    ; C       EACH OF THE 13 MINERALS AND THE BULK DENSITY,RHO(I), ARE GIVEN
113    ; C       AS FIXED DATA IN THE PROGRAM, FROM WHICH VRH AVERAGES AND AN
114    ; C       AVERAGE FOR RHOM(J) CAN BE BE COMPUTED WHEN MIN>0.
115    ; C
116    ; C       OUTPUT PRINTOUT:
117    ; C       1. HEADING CARD INFORMATION.
118    ; C       2.PARAMETER CARD INFORMATION FOR TWO PARAMETER CARDS.
119    ; C       3.NO. OF OBSERVATIONS(SAMPLES)
120    ; C       4.PROBLEM NO. AND SAMPLE ID.
121    ; C       5. BRINE SATURATED INPUTS, THEN KM,GM,POROSITY AND SONIC.
122    ; C       6.TABLE (L-R)SG,CALCVP,CALCVS,POISSON'S RATIO AND CALC. BULK DE
123    ; C         AS A FUNCTION OF 18 SG=GAS SATURATIONS.
124    ; C
125    ; C       ELASTIC MODULI ARE IN KB., VELOCITIES IN FT./SEC. DENSITIES IN
```

```
126    ; C       GM./CM**3  POROSITIES ,SATURATIONS IN %  IN PRINTOUT.
127    ; C
128    ; C       THE ABOVE IS FOR DEFAULT NBUG=0. IF NBUG=1, WE GET ADDITIONALLY
129    ; C       ABOVE THE TABLE(7) VALUES OF A=KA/KM,B=K*/KM,G=G*/GM,K*,G* AND
130    ; C       AND VALUES OF RHOGAS,KGAS AND THE LOCAL TEMERATURE DEG. F,
131    ; C       PLUS NUMEROUS OTHER DIAGNOSTIC QUANTITIES SUCH AS KOIL,RHOOIL,E
132    ; C
133    ; C       ERROR MESSAGES INDICATING EITHER ZERO POROSITY(UNTENABLE) OR
134    ; C       K*<HASHIN SHTRIKMAN LOWER BOUND=KLOW ARE ALSO POSSIBLE.
135    ; C       WHEN MINERALS ARE KNOWN(MIN.GT.0) THE BULK DENSITY, RHOBC IS
136    ; C       CALCULATED. IF ABS(BULKD-RHOBC)/BULKD(%)>TST(%) AN ERROR IS
137    ; C       INDICATED. ONLY ZERO POROSITY TERMINATES THE PROBLEM AND GOES O
138    ; C       TO THE NEXT. ALL OTHER ERRORS ARE PASSIVE MESSAGES.
139    ; C
140    ; C       SUBROUTINES: NAME2,KGKA,FLMOD3,GASMD3,BIOT,CALQ,INTERP,LIDOS.
141    ; C       FUNCTION SUBPROGRAMS: FCNBWR,FCNCV,FCNPTV.
142    ; C
143    ; C       REFERENCES:
144    ; C       THOMPSON,D.D. & BROWN,R.J.S.-TECH MEMO                 (KGKA
145    ; C       THOMPSON,D.D. MEMO TO J.K.MAHER,         (RHOOIL)
146    ; C       RUNGE,R.J AND THOMPSON,D.D.-TECH MEMO                    (LID
147    ; C       RUNGE,R.J. MEMO TO W.W.KERR,
148    ; C       THOMPSON,D.D. & RUNGE,R.J.-COFRC TECH MEMO.
149    ; C       BROWN,R.J.S. & KORRINGA,J.-COFRC MEMO.
150    ; C       THOMAS,K. HANKINSON,W. & PHILLIPS,A.-JOUR.PET.TECH.,V 22(1970)
151    ; C       PGS. 689-895.   B-W-R EQN. & THEORY (GASMD3)
152    ; C       SAGE,B.H.-"THERMODYNAMICS OF MULTI-COMPONENT SYSTEMS", RHEINHOL
153    ; C       N.Y. (1965). DISCUSSES BENEDICT-WEBB-RUBIN EQN. OF STATE (GASM
154    ; C
```

SECTION B

```
165    ; C    *
166    ;        IMPLICIT REAL(K)
167    ;        DIMENSION VP(200),BULKD(200),DEPTH(200),POR(200),X(13),WD(65),
168    ;       *FTEMP(200),KM(200),GM(200),RHOM(200),COL(200),MINR(200),LITH(20
169    ;        REAL*8 SAMP(200),SMP
170    ;        DIMENSION SG(18)                                              01590000
171    ;        SG(1)=0.0                                                     01590100
172             LDA      #1
173             ASL      A
174             ASL      A
175             CLC
176             ADC      #(SG11101-4) MOD .M
177             STA      .T000005
178             LDA      #0
179             ADC      #(SG11101-4)/256
180             STA      .T000005+1
181    .MFLTASG SET      1
182             JSR      .FLTASGN
183             .BYTE 0
184             .WORD .C000003
185             .WORD -.T000005
186    ;        SG(2)=1.0                                                     01590200
187             LDA      #2
188             ASL      A
189             ASL      A
190             CLC
191             ADC      #(SG11101-4) MOD .M
192             STA      .T000005
193             LDA      #0
194             ADC      #(SG11101-4)/256
195             STA      .T000005+1
196    .MFLTASG SET      1
197             JSR      .FLTASGN
198             .BYTE 0
199             .WORD .C000007
200             .WORD -.T000005
201    ;        SG(3)=2.0                                                     01590300
202             LDA      #3
203             ASL      A
204             ASL      A
205             CLC
206             ADC      #(SG11101-4) MOD .M
207             STA      .T000005
208             LDA      #0
209             ADC      #(SG11101-4)/256
210             STA      .T000005+1
```

```
211        .MFLTASG SET   1
212                 JSR   .FLTASGN
213                 .BYTE 0
214                 .WORD .C000009
215                 .WORD -.T000005
216     ;           SG(4)=3.0                                01590400
217                 LDA   #4
218                 ASL   A
219                 ASL   A
220                 CLC
221                 ADC   #(SG111101-4) MOD .M
222                 STA   .T000005
223                 LDA   #0
224                 ADC   #(SG111101-4)/256
225                 STA   .T000005+1
226        .MFLTASG SET   1
227                 JSR   .FLTASGN
228                 .BYTE 0
229                 .WORD .C000011
230                 .WORD -.T000005
231     ;           SG(5)=4.0                                01590500
232                 LDA   #5
233                 ASL   A
234                 ASL   A
235                 CLC
236                 ADC   #(SG111101-4) MOD .M
237                 STA   .T000005
238                 LDA   #0
239                 ADC   #(SG111101-4)/256
240                 STA   .T000005+1
241        .MFLTASG SET   1
242                 JSR   .FLTASGN
243                 .BYTE 0
244                 .WORD .C000013
245                 .WORD -.T000005
246     ;           SG(6)=5.0                                01590600
247                 LDA   #6
248                 ASL   A
249                 ASL   A
250                 CLC
251                 ADC   #(SG111101-4) MOD .M
252                 STA   .T000005
253                 LDA   #0
254                 ADC   #(SG111101-4)/256
255                 STA   .T000005+1
256        .MFLTASG SET   1
257                 JSR   .FLTASGN
258                 .BYTE 0
259                 .WORD .C000015
260                 .WORD -.T000005
261     ;           SG(7)=10.0                               01590700
262                 LDA   #7
263                 ASL   A
264                 ASL   A
265                 CLC
266                 ADC   #(SG111101-4) MOD .M
267                 STA   .T000005
268                 LDA   #0
269                 ADC   #(SG111101-4)/256
270                 STA   .T000005+1
271        .MFLTASG SET   1
272                 JSR   .FLTASGN
273                 .BYTE 0
274                 .WORD .C000017
275                 .WORD -.T000005
276     ;           SG(8)=15.0                               01590800
277                 LDA   #8
278                 ASL   A
279                 ASL   A
280                 CLC
281                 ADC   #(SG111101-4) MOD .M
282                 STA   .T000005
283                 LDA   #0
284                 ADC   #(SG111101-4)/256
285                 STA   .T000005+1
286        .MFLTASG SET   1
287                 JSR   .FLTASGN
288                 .BYTE 0
289                 .WORD .C000019
```

```
290            .WORD -.T000005
291      ;     SG(9)=20.0                                01590900
292            LDA    #9
293            ASL    A
294            ASL    A
295            CLC
296            ADC    #(SG111101-4) MOD .M
297            STA    .T000005
298            LDA    #0
299            ADC    #(SG111101-4)/256
300            STA    .T000005+1
301     .MFLTASG SET  1
302            JSR    .FLTASGN
303            .BYTE  0
304            .WORD  .C000021
305            .WORD  -.T000005
306      ;     SG(10)=25.0                               01591000
307            LDA    #10
308            ASL    A
309            ASL    A
310            CLC
311            ADC    #(SG111101-4) MOD .M
312            STA    .T000005
313            LDA    #0
314            ADC    #(SG111101-4)/256
315            STA    .T000005+1
316     .MFLTASG SET  1
317            JSR    .FLTASGN
318            .BYTE  0
319            .WORD  .C000023
320            .WORD  -.T000005
321      ;     SG(11)=30.0                               01591100
322            LDA    #11
323            ASL    A
324            ASL    A
325            CLC
326            ADC    #(SG111101-4) MOD .M
327            STA    .T000005
328            LDA    #0
329            ADC    #(SG111101-4)/256
330            STA    .T000005+1
331     .MFLTASG SET  1
332            JSR    .FLTASGN
333            .BYTE  0
334            .WORD  .C000025
335            .WORD  -.T000005
336      ;     SG(12)=40.0                               01591200
337            LDA    #12
338            ASL    A
339            ASL    A
340            CLC
341            ADC    #(SG111101-4) MOD .M
342            STA    .T000005
343            LDA    #0
344            ADC    #(SG111101-4)/256
345            STA    .T000005+1
346     .MFLTASG SET  1
347            JSR    .FLTASGN
348            .BYTE  0
349            .WORD  .C000027
350            .WORD  -.T000005
351      ;     SG(13)=50.0                               01591300
352            LDA    #13
353            ASL    A
354            ASL    A
355            CLC
356            ADC    #(SG111101-4) MOD .M
357            STA    .T000005
358            LDA    #0
359            ADC    #(SG111101-4)/256
360            STA    .T000005+1
361     .MFLTASG SET  1
362            JSR    .FLTASGN
363            .BYTE  0
364            .WORD  .C000029
365            .WORD  -.T000005
366      ;     SG(14)=60.0                               01591400
367            LDA    #14
```

```
368             ASL     A
369             ASL     A
370             CLC
371             ADC     #(SG111101-4) MOD .M
372             STA     .T000005
373             LDA     #0
374             ADC     #(SG111101-4)/256
375             STA     .T000005+1
376     .MFLTASG SET    1
377             JSR     .FLTASGN
378             .BYTE   0
379             .WORD   .C000031
380             .WORD   -.T000005
381     ;       SG(15)=70.0                                                     01591500
382             LDA     #15
383             ASL     A
384             ASL     A
385             CLC
386             ADC     #(SG111101-4) MOD .M
387             STA     .T000005
388             LDA     #0
389             ADC     #(SG111101-4)/256
390             STA     .T000005+1
391     .MFLTASG SET    1
392             JSR     .FLTASGN
393             .BYTE   0
394             .WORD   .C000033
395             .WORD   -.T000005
396     ;       SG(16)=60.0                                                     01591600
397             LDA     #16
398             ASL     A
399             ASL     A
400             CLC
401             ADC     #(SG111101-4) MOD .M
402             STA     .T000005
403             LDA     #0
404             ADC     #(SG111101-4)/256
405             STA     .T000005+1
406     .MFLTASG SET    1
407             JSR     .FLTASGN
408             .BYTE   0
409             .WORD   .C000035
410             .WORD   -.T000005
411     ;       SG(17)=90.0                                                     01591700
412             LDA     #17
413             ASL     A
414             ASL     A
415             CLC
416             ADC     #(SG111101-4) MOD .M
417             STA     .T000005
418             LDA     #0
419             ADC     #(SG111101-4)/256
420             STA     .T000005+1
421     .MFLTASG SET    1
422             JSR     .FLTASGN
423             .BYTE   0
424             .WORD   .C000037
425             .WORD   -.T000005
426     ;       SG(18)=100.0                                                    01591800
427             LDA     #18
428             ASL     A
429             ASL     A
430             CLC
431             ADC     #(SG111101-4) MOD .M
432             STA     .T000005
433             LDA     #0
434             ADC     #(SG111101-4)/256
435             STA     .T000005+1
436     .MFLTASG SET    1
437             JSR     .FLTASGN
438             .BYTE   0
439             .WORD   .C000039
440             .WORD   -.T000005
441     ;       REAL*4 SO(6)/0.0,20.0,40.0,60.0,80.0,100.0/
442     ; C     QUARTZ,CALCITE,DOLOMITE,CLAY,SILICA,FELDSPARS,ANHYDRITE,SIDERIT
443     ; C     ,BARITE,PYRITE,RUTILE,HALITE,MICA.           13 MINERALS
444     ;
445     ;
```

```
446    ;
447    ;
448    ;
449    ;
450    ;           NIN=5
451                LDA     #0
452                STA     NIN||101
453                LDA     #5
454                STA     NIN||101+1
455    ;           NOUT=6                                                        01710027
456    ; C         READ THREE 80 COLUMN HEADING CARDS                            01720000
457                LDA     #0
458                STA     NOUT||101
459                LDA     #6
460                STA     NOUT||101+1
461    ;         1 CALL NAME2(WD,3,0,NIN,NOUT)                                   01730029
462    .L000040 EQU    *
463                LDA     #NOUT||101 MOD .M
464                STA     NAME2.05
465                LDA     #NOUT||101/256
466                STA     NAME2.05+1
467                LDA     #NIN||101 MOD .M
468                STA     NAME2.04
469                LDA     #NIN||101/256
470                STA     NAME2.04+1
471                LDA     #.C000041 MOD .M
472                STA     NAME2.03
473                LDA     #.C000041/256
474                STA     NAME2.03+1
475                LDA     #.C000008 MOD .M
476                STA     NAME2.02
477                LDA     #.C000008/256
478                STA     NAME2.02+1
479                LDA     #*D||101 MOD .M
480                STA     NAME2.01
481                LDA     #*D||101/256
482                STA     NAME2.01+1
483                JSR     NAME2
484    ; C         READ GENERAL PARAMETER CARD.
485    ; C         READ(NIN,3)TGRAD,FGRAD,CO,KBRINE,RHOBRN,TOL,TO,TST,NBUG,NSG,NSO
486    ; C       3 FORMAT(8F7.0,3I3 )
487    ; C         READ IN API GAS & OIL GRAVITIES AND OVERBURDEN GRADIENT (KPSI/K
490    ; C
491    ; C         READ(NIN,4)GASGRV,OILGRV,OVGRAD,OILSAT,GASMIX,KMDEF,GMDEF
492    ; C       4 FORMAT(5F10.0,2F6.0)
493    ; C
494    ; C         WRITE(NOUT,5)
495    ; C       5 FORMAT(/45X,'* * * * * BALTMOR * * * * * '//)
496    ;
497                LDA     #0
498                CMP     NSG||101+1
499                LDA     #0
500                SBC     NSG||101
501                BMI     .L000042
502                LDA     #0
503                STA     NSG||101
504                LDA     #18
505                STA     NSG||101+1
506    .L000042 EQU    *
507    ;                                                                         01870003
508                LDA     #18
509                CMP     NSG||101+1
510                LDA     #0
511                SBC     NSG||101
512                BMI     .L000045
513                JMP     .L000044
514    .L000045 EQU    *
515                LDA     #0
516                STA     NSG||101
517                LDA     #18
518                STA     NSG||101+1
519    .L000044 EQU    *
520    ;                                                                         01880012
521                LDA     #0
522                CMP     NSO||101+1
523                LDA     #0
524                SBC     NSO||101
525                BMI     .L000046
```

```
526            LDA     #0
527            STA     NSO11101
528            LDA     #6
529            STA     NSO11101+1
530  .L000046 EQU     *
531  ;                                                      01890005
532            LDA     #6
533            CMP     NSO11101+1
534            LDA     #0
535            SBC     NSO11101
536            BMI     .L000049
537            JMP     .L000048
538  .L000049 EQU     *
539            LDA     #0
540            STA     NSO11101
541            LDA     #6
542            STA     NSO11101+1
543  .L000048 EQU     *
544  ;                                                      01900012
545  .MFFLE   SET     1
546            JSR     .FFLE
547            .BYTE   0
548            .WORD   OILSAT01,.C000050
549            ASL     A
550            BCS     *+5
551            JMP     .L000052
552  .MFLTASG SET     1
553            JSR     .FLTASGN
554            .BYTE   0
555            .WORD   .C000053
556            .WORD   OILSAT01
557  .L000052 EQU     *
558  ;                                                      01910012
559  .MFFGT   SET     1
560            JSR     .FFGT
561            .BYTE   0
562            .WORD   OILSAT01,.C000054
563            ASL     A
564            BCS     *+5
565            JMP     .L000055
566            LDA     #0
567            STA     NSO11101
568            LDA     #1
569            STA     NSO11101+1
570  .L000055 EQU     *
571  ;        IF(OVGRAD.LE.0.0)OVGRAD=1.0                    01920003
572  .MFFLE   SET     1
573            JSR     .FFLE
574            .BYTE   0
575            .WORD   OVGRAD01,.C000056
576            ASL     A
577            BCS     *+5
578            JMP     .L000057
579  .MFLTASG SET     1
580            JSR     .FLTASGN
581            .BYTE   0
582            .WORD   .C000058
583            .WORD   OVGRAD01
584  .L000057 EQU     *
585  ;        SONIC=0.0                                      01930000
586  .MFLTASG SET     1
587            JSR     .FLTASGN
588            .BYTE   0
589            .WORD   .C000059
590            .WORD   SONIC101
591  ;                                                      01940000
592  .MFFLE   SET     1
593            JSR     .FFLE
594            .BYTE   0
595            .WORD   TST11101,.C000060
596            ASL     A
597            BCS     *+5
598            JMP     .L000061
599  .MFLTASG SET     1
600            JSR     .FLTASGN
601            .BYTE   0
602            .WORD   .C000062
603            .WORD   TST11101
```

```
604     .L000061 EQU    *
605     ;         IF(TGRAD.LE.0.0) TGRAD=15.0                              01950.000
606     .MFFLE   SET    1
607              JSR    .FFLE
608              .BYTE  0
609              .WORD  TGRAD101,.C000063
610              ASL    A
611              BCS    *+5
612              JMP    .L000064
613     .MFLTASG SET    1
614              JSR    .FLTASGN
615              .BYTE  0
616              .WORD  .C000065
617              .WORD  TGRAD101
618     .L000064 EQU    *
619     ;                                                                   01960000
620     .MFFLE   SET    1
621              JSR    .FFLE
622              .BYTE  0
623              .WORD  FGRAD101,.C000066
624              ASL    A
625              BCS    *+5
626              JMP    .L000067
627     .MFLTASG SET    1
628              JSR    .FLTASGN
629              .BYTE  0
630              .WORD  .C000068
631              .WORD  FGRAD101
632     .L000067 EQU    *
633     ;                                                                   01970000
634     .MFFLE   SET    1
635              JSR    .FFLE
636              .BYTE  0
637              .WORD  CO111101,.C000069
638              ASL    A
639              BCS    *+5
640              JMP    .L000070
641     .MFLTASG SET    1
642              JSR    .FLTASGN
643              .BYTE  0
644              .WORD  .C000071
645              .WORD  CO111101
646     .L000070 EQU    *
647     ;                                                                   01980002
648     .MFFLE   SET    1
649              JSR    .FFLE
652              ASL    A
653              BCS    *+5
654              JMP    .L000073
655     .MFLTASG SET    1
656              JSR    .FLTASGN
657              .BYTE  0
658              .WORD  .C000074
659              .WORD  KBRINE01
660     .L000073 EQU    *
661     ;                                                                   01990005
662     .MFFLE   SET    1
663              JSR    .FFLE
664              .BYTE  0
665              .WORD  RHOBRN01,.C000075
666              ASL    A
667              BCS    *+5
668              JMP    .L000076
669     .MFLTASG SET    1
670              JSR    .FLTASGN
671              .BYTE  0
672              .WORD  .C000077
673              .WORD  RHOBRN01
674     .L000076 EQU    *
675     ;                                                                   02000000
676     .MFFLE   SET    1
677              JSR    .FFLE
678              .BYTE  0
679              .WORD  TOL111101,.C000078
680              ASL    A
681              BCS    *+5
682              JMP    .L000079
683     .MFLTASG SET    1
```

```
684             JSR     .FLTASGN
685             .BYTE   0
686             .WORD   ..C000080
687             .WORD   TOL11101
688     .L000079 EQU    *
689     ;                                                                   02010005
690     .MFFSUB SET     1
691             JSR     .FFSUB
692             .BYTE   0
693             .WORD   OVGPAD01,FGRAD101
694             .WORD   DGRAD101
695     ;       IF(NBUG.LE.0)NBUG=0                                         02020000
696.            LDA     #0
697             CMP     NBUG1101+1
698             LDA     #0
699             SBC     NBUG1101
700             BMI     .L000082
701             LDA     #0
702             STA     NBUG1101
703             LDA     #0
704             STA     NBUG1101+1
705     .L000082 EQU    *
706     ;                                                                   02030000
707     .MFFLE  SET     1
708             JSR     .FFLE
709             .BYTE   0
710             .WORD   TO111101,..C000084
711             ASL     A
712             BCS     *+5
713             JMP     .L000085
714     .MFLTASG SET    1
715             JSR     .FLTASGN
716             .BYTE   0
717             .WORD   .C000086
718             .WORD   TO111101
719     .L000085 EQU    *
720     ;                                                                   02040009
721     .MFFLE  SET     1
722             JSR     .FFLE
723             .BYTE   0
724             .WORD   GASGRV01,..C000087
725             ASL     A
726             BCS     *+5
727             JMP     .L000088
728     ; C     METHANE GASGRV DEFAULT=0.554                                02050032
729     .MFLTASG SET    1
730             JSR     .FLTASGN
731             .BYTE   0
732             .WORD   .C000089
733             .WORD   GASGRV01
734     .L000088 EQU    *
735     ;                                                                   02060009
736     .MFFLE  SET     1
737             JSR     .FFLE
738             .BYTE   0
739             .WORD   OILGRV01,..C000090
740             ASL     A
741             BCS     *+5
742             JMP     .L000091
778     ;       NP=6                                                        J0030
779     ; C     WRITE(NOUT,10)TGRAD,FGRAD,KBRINE,RHOBRN,TOL,NBUG,TO,CO       10026
780     ; C     10 FORMAT(/5X,' PARAMETERS:  '/5X,' TGRAD(DEG.F/KILOFT)=',F 10.3,  20000
781     ; C     * FGRAD(KPSI/KILOFT-FLUID GRADIENT)=',F10.4,'   KBRINE(KB)=',F10   10032
782     ; C     */6X,'LIQUID DENSITY=',F10.5,' TOL= ',F10.6,                 10032
783     ; C     *' NBUG(DEBUG FLAG)=',I5,' TO(DEG.F)=',F7.2,' CO=',F7.4 //)  J0032
784     ; C     WRITE(NOUT,11)NSG,NSO,GASGRV,OILGRV,OVGRAD,OILSAT            60041
785     ; C     11 FORMAT(/5X,' ADDITIONAL PARAMETERS: '/5X,' NSG=',I3,' NSO=',I3  70012
786     ; C     *' GASGRAVITY=',F10.3,'  OILGRAVITY=',F10.3,'   OVGRAD(PSI/FT)='   30032
787.    ; C     *,F10.3,'   OILSAT=',F8.4,'                                   90041
788             LDA     #0
789             STA     NP111101
790             LDA     #6
791             STA     NP111101+1
792     ;       NOBS=0                                                      02200000
793     ; C     * * *                                                       02210003
794     ; C     READ INPUT CARDS                                            02220000
795     ; C     * * **                                                      02230003
796             LDA     #0
```

```
797.            STA     NOBS|101
798             LDA     #0
799             STA     NOBS|101+1
800     ;       DO 50 J=1,200                                                   02240000
801             LDA     #0
802             STA     J|111101
803             LDA     #1
804             STA     J|111101+1
805     ; C     READ(NIN,20)V,BLK,POROS,DEP,T,MIN,LTH,SONIC,SMP,CL               02250027
806             JMP     .L000102
807     .L000099 EQU    *
808             LDA     J|111101+1
809             CLC
810             ADC     #1
811             STA     J|111101+1
812             LDA     J|111101
813             ADC     #0
814             STA     J|111101
815             LDA     #200
816             CMP     J|111101+1
817             LDA     #0
818             SBC     J|111101
819             BMI     .L000100
820     .L000102 EQU    *
821     ;       IF(V .EQ.0.0 .OR.BLK.EQ.0.0)GO TO 75                             02260000
822     .MFFEQ  SET     1
823             JSR     .FFEQ
824             .BYTE   0
825             .WORD   BLK|1101,.C000106
826             STA     .T000005
827     .MFFEQ  SET     1
828             JSR     .FFEQ
829             .BYTE   0
830             .WORD   V|111101,.C000105
831             ORA     .T000005
832             ASL     A
833             BCS     *+5
834             JMP     .L000107
835             JMP     .L000108
836     .L000107 EQU    *
837     ; C     END FLAG CARD                                                    02270000
838     ;       SONIK=SONIC                                                      02280000
839     .MFLTASG SET    1
840             JSR     .FLTASGN
841             .BYTE   0
842             .WORD   SONIC|01
843             .WORD   SONIK|01
844     ;       IF(SONIK.NE.0.0)V=1.0E6/V                                        02290000
845     .MFFNE  SET     1
846             JSR     .FFNE
847             .BYTE   0
848             .WORD   SONIK|01,.C000109
849             ASL     A
850             BCS     *+5
851             JMP     .L000110
852     ; C     CONVERT DELTA T (SONIC LOG MICSEC/FT) TO FT.SEC.                 02300000
853     ; C     20 FORMAT(5F10.0,2I3,F10.0,4X,A8,A2)                             02310003
854     .MFFDIV SET     1
855             JSR     .FFDIV
856             .BYTE   0
857             .WORD   .C000111,V|111101
858             .WORD   V|111101
859     .L000110 EQU    *
860     ;                                                                        02320000
861             LDA     J|111101+1
862             ASL     A
863             ASL     A
864             CLC
865             ADC     #(VP|111101-4) MOD .M
866             STA     .T000005
867             LDA     #0
868             ADC     #(VP|111101-4)/256
869             STA     .T000005+1
870     .MFLTASG SET    1
871             JSR     .FLTASGN
872             .BYTE   0
873             .WORD   V|111101
874             .WORD   -.T000005
```

```
875    ;       BULKD(J)=BLK                                    02330000
876            LDA    J||||101+1
877            ASL    A
878            ASL    A
879            CLC
880            ADC    #(BULKD|01-4) MOD .M
881            STA    .T000005
882            LDA    #0
883            ADC    #(BULKD|01-4)/256
884            STA    .T000005+1
885    .MFLTASG SET   1
886            JSR    .FLTASGN
887            .BYTE  0
888            .WORD  BLK||101
889            .WORD  -.T000005
890    ;       POR(J)=POROS/100.                               02340000
891            LDA    J||||101+1
892            ASL    A
893            ASL    A
894            CLC
895            ADC    #(POR|||01-4) MOD .M
896            STA    .T000051
897            LDA    #0
898            ADC    #(POR|||01-4)/256
899            STA    .T000051+1
900    .MFFDIV SET    1
901            JSR    .FFDIV
902            .BYTE  0
903            .WORD  POROS|01,.C000112
904            .WORD  -.T000051
905    ;       FTEMP(J)=T                                      02350000
906            LDA    J||||101+1
907            ASL    A
908            ASL    A
909            CLC
910            ADC    #(FTEMP|01-4) MOD .M
911            STA    .T000005
912            LDA    #0
913            ADC    #(FTEMP|01-4)/256
914            STA    .T000005+1
915    .MFLTASG SET   1
916            JSR    .FLTASGN
917            .BYTE  0
918            .WORD  T||||101
919            .WORD  -.T000005
920    ;       MINR(J)=MIN                                     02360000
921            LDA    J||||101+1
922            ASL    A
923            STA    .T000004
924            LDA    MIN||101
925            LDX    .T000004
926            STA    MINR||01-2,X
927            LDA    MIN||101+1
928            STA    MINR||01-1,X
929    ;                                                       02370003
930            LDA    #0
931            CMP    LTH||101+1
932            LDA    #0
933            SBC    LTH||101
934            BMI    .L000113
935            LDA    #0
936            STA    LTH||101
937            LDA    #1
938            STA    LTH||101+1
939    .L000113 EQU   *
940    ;                                                       02380003
941            LDA    #3
942            CMP    LTH||101+1
943            LDA    #0
944            SBC    LTH||101
945            BMI    .L000116
946            JMP    .L000115
947    .L000116 EQU   *
948            LDA    #0
949            STA    LTH||101
950            LDA    #3
951            STA    LTH||101+1
952    .L000115 EQU   *
953    ;       LITH(J)=LTH                                     02390003
```

```
954             LDA     J111101+1
955             ASL     A
956             STA     .T000004
957             LDA     LTH11101
958             LDX     .T000004
959             STA     LITH1101-2,X
960             LDA     LTH11101+1
961             STA     LITH1101-1,X
962     ;
963     .MFFEQ  SET     1                                       02400050
964             JSR     .FFEQ
965             .BYTE   0
966             .WORD   KMDEF101,.C000117
967             STA     .T000005
968             LDA     LTH11101+1
969             CMP     #1
970             BNE     .L000118
971             LDA     LTH11101
972             CMP     #0
973             BNE     .L000118
974     .L000119 LDA    #80H
975             BNE     *+4
976     .L000118 LDA    #0
977             AND     .T000005
978             ASL     A
979             BCS     *+5
980             JMP     .L000120
981     .MFLTASG SET    1
982             JSR     .FLTASGN
983             .BYTE   0
984             .WORD   .C000121
985             .WORD   KMDEF101
986     .L000120 EQU    *
987     ;                                                       02410050
988     .MFFEQ  SET     1
989             JSR     .FFEQ
990             .BYTE   0
991             .WORD   GMDEF101,.C000122
992             STA     .T000005
993             LDA     LTH11101+1
994             CMP     #1
995             BNE     .L000123
996             LDA     LTH11101
997             CMP     #0
998             BNE     .L000123
999     .L000124 LDA    #80H
1000            BNE     *+4
1001    .L000123 LDA    #0
1002            AND     .T000005
1003            ASL     A
1004            BCS     *+5
1005            JMP     .L000125
1006    .MFLTASG SET    1
1007            JSR     .FLTASGN
1008            .BYTE   0
1009            .WORD   .C000126
1010            .WORD   GMDEF101
1011    .L000125 EQU    *
1012    ;                                                       02420050
1013    .MFFEQ  SET     1
1014            JSR     .FFEQ
1015            .BYTE   0
1016            .WORD   KMDEF101,.C000127
1017            STA     .T000005
1018            LDA     LTH11101+1
1019            CMP     #2
1020            BNE     .L000128
1021            LDA     LTH11101
1022            CMP     #0
1023            BNE     .L000128
1024    .L000129 LDA    #80H
1025            BNE     *+4
1026    .L000128 LDA    #0
1027            AND     .T000005
1028            ASL     A
1029            BCS     *+5
1030            JMP     .L000130
1031    .MFLTASG SET    1
```

```
1032            JSR     .FLTASGN
1033            .BYTE   0
1034            .WORD   .C000131
1035            .WORD   KMDEF101
1036   .L000130 EQU     *
1037   ;
1038   .MFFEQ   SET     1
1039            JSR     .FFEQ
1040            .BYTE   0
1041            .WORD   GMDEF101,.C000132
1042            STA     .T000005
1043            LDA     LTHI1101+1
1044            CMP     #2
1045            BNE     .L000133
1046            LDA     LTHI1101
1047            CMP     #0
1048            BNE     .L000133
1049   .L000134 LDA     #80H
1050            BNE     *+4
1051   .L000133 LDA     #0
1052            AND     .T000005
1053            ASL     A
1054            BCS     *+5
1055            JMP     .L000135
1056   .MFLTASG SET     1
1057            JSR     .FLTASGN
1058            .BYTE   0
1059            .WORD   .C000136
1060            .WORD   GMDEF101
1061   .L000135 EQU     *
1062   ;
1063   .MFFEQ   SET     1
1064            JSR     .FFEQ
1065            .BYTE   0
1066            .WORD   KMDEF101,.C000137
1067            STA     .T000005
1068            LDA     LTHI1101+1
1069            CMP     #3
1070            BNE     .L000138
1071            LDA     LTHI1101
1072            CMP     #0
1073            BNE     .L000138
1074   .L000139 LDA     #80H
1075            BNE     *+4
1076   .L000138 LDA     #0
1077            AND     .T000005
1078            ASL     A
1079            BCS     *+5
1080            JMP     .L000140
1081   .MFLTASG SET     1
1082            JSR     .FLTASGN
1083            .BYTE   0
1084            .WORD   .C000141
1085            .WORD   KMDEF101
1086   .L000140 EQU     *
1087   ;
1088   .MFFEQ   SET     1
1089            JSR     .FFEQ
1090            .BYTE   0
1091            .WORD   GMDEF101,.C000142
1092            STA     .T000005
1093            LDA     LTHI1101+1
1094            CMP     #3
1095            BNE     .L000143
1096            LDA     LTHI1101
1097            CMP     #0
1098            BNE     .L000143
1099   .L000144 LDA     #80H
1100            BNE     *+4
1101   .L000143 LDA     #0
1102            AND     .T000005
1103            ASL     A
1104            BCS     *+5
1105            JMP     .L000145
1106   .MFLTASG SET     1
1107            JSR     .FLTASGN
1108            .BYTE   0
1109            .WORD   .C000146
```

```
1110                .WORD  GNDEF|101
1111   .L000145 EQU    *
1112   ;         SAMP(J)=SMP                                      02460000
1113             LDA    J|||||101+1
1114             ASL    A
1115             ASL    A
1116             ASL    A
1117             CLC
1118             ADC    #(SAMP||101-8) MOD .H
1119             STA    .T000005
1120             LDA    #0
1121             ADC    #(SAMP||101-8)/256
1122             STA    .T000005+1
1123   .MFLTASG SET    1
1124             JSR    .FLTASGN
1125             .BYTE  0
1126             .WORD  SMP||101
1127             .WORD  -.T000005
1128   ;         COL(J)=CL                                        02470000
1129             LDA    J|||||101+1
1130             ASL    A
1131             ASL    A
1132             CLC
1133             ADC    #(COL||101-4) MOD .H
1134             STA    .T000005
1135             LDA    #0
1136             ADC    #(COL||101-4)/256
1137             STA    .T000005+1
1138   .MFLTASG SET    1
1139             JSR    .FLTASGN
1140             .BYTE  0
1141             .WORD  CL||101
1142             .WORD  -.T000005
1143   ;         IF(DEP.GT.30.0)DEP=DEP/1000.0                    02480000
1144   .MFFGT   SET    1
1145             JSR    .FFGT
1146             .BYTE  0
1147             .WORD  DEP||101,.C000147
1148             ASL    A
1149             BCS    *+5
1150             JMP    .L000148
1151   .MFFDIV  SET    1
1152             JSR    .FFDIV
1153             .BYTE  0
1154             .WORD  DEP||101,.C000149
1155             .WORD  DEP||101
1156   .L000148 EQU    *
1157   ;         DEPTH(J)=DEP                                     02490000
1158             LDA    J|||||101+1
1159             ASL    A
1160             ASL    A
1161             CLC
1162             ADC    #(DEPTH|01-4) MOD .H
1163             STA    .T000005
1164             LDA    #0
1165             ADC    #(DEPTH|01-4)/256
1166             STA    .T000005+1
1167   .MFLTASG SET    1
1168             JSR    .FLTASGN
1169             .BYTE  0
1170             .WORD  DEP||101
1171             .WORD  -.T000005
1172   ;         IF(MIN.LE.0)GO TO 35                             02500000
1173             LDA    #0
1174             CMP    MIN||101+1
1175             LDA    #0
1176             SBC    MIN||101
1177             BMI    .L000150
1178             JMP    .L000152
1179   .L000150 EQU    *
1180   ; C       READ MINERALS CARD SINCE MIN >0.                 02510000
1181   ; C         READ(NIN,22)(X(L),L=1,13)                      02520027
1182   ; C       22 FORMAT(13F5.0)                                02530000
1183   ;         SUM=0.0                                          02540000
1184   .MFLTASG SET    1
1185             JSR    .FLTASGN
1186             .BYTE  0
1187             .WORD  .C000153
```

```
1188                .WORD   SUM11101
1189        ;       DO 25 L=1,13                                        02550000
1190                LDA     #0
1191                STA     L11111101
1192                LDA     #1
1193                STA     L11111101+1
1194                JMP     .L000156
1195    .L000154 EQU   *
1196                LDA     L11111101+1
1197                CLC
1198                ADC     #1
1199                STA     L11111101+1
1200                LDA     L11111101
1201                ADC     #0
1202                STA     L11111101
1203                LDA     #13
1204                CMP     L11111101+1
1205                LDA     #0
1206                SBC     L11111101
1207                BMI     .L000155
1208    .L000156 EQU   *
1209        ;       X(L)=X(L)/100.0                                     02560000
1210                LDA     L11111101+1
1211                ASL     A
1212                ASL     A
1213                CLC
1214                ADC     #(X11111101-4) MOD .M
1215                STA     .T000005
1216                LDA     #0
1217                ADC     #(X11111101-4)/256
1218                STA     .T000005+1
1219                LDA     L11111101+1
1220                ASL     A
1221                ASL     A
1222                CLC
1223                ADC     #(X11111101-4) MOD .M
1224                STA     .T000051
1225                LDA     #0
1226                ADC     #(X11111101-4)/256
1227                STA     .T000051+1
1228    .MFFDIV     SET     1
1229                JSR     .FFDIV
1230                .BYTE   0
1231                .WORD   -.T000005,.C000159
1232                .WORD   -.T000051
1233        ;       SUM=SUM+X(L)                                        02570000
1234                LDA     L11111101+1
1235                ASL     A
1236                ASL     A
1237                CLC
1238                ADC     #(X11111101-4) MOD .M
1239                STA     .T000004
1240                LDA     #0
1241                ADC     #(X11111101-4)/256
1242                STA     .T000004+1
1243    .MFFADD     SET     1
1244                JSR     .FFADD
1245                .BYTE   0
1246                .WORD   SUM11101,-.T000004
1247                .WORD   SUM11101
1248        ;    25 CONTINUE                                            02580000
1249    .L000158 EQU   *
1250                JMP     .L000154
1251    .L000155 EQU   *
1252        ;       IF(SUM.LE.0.0)MIN=0                                 02590000
1253    .MFFLE      SET     1
1254                JSR     .FFLE
1255                .BYTE   0
1256                .WORD   SUM11101,.C000160
1257                ASL     A
1258                BCS     *+5
1259                JMP     .L000161
1260                LDA     #0
1261                STA     MIN11101
1262                LDA     #0
1263                STA     MIN11101+1
1264    .L000161 EQU   *
1265        ;       IF(MIN.LE.0)GO TO 35                                02600000
```

```
1266            LDA     #0
1267            CMP     MIN11101+1
1268            LDA     #0
1269            SBC     MIN11101
1270            BMI     .L000162
1271            JMP     .L000152
1272  .L000162 EQU     *
1273  ;        DO 26 L=1,13                                            02610000
1274            LDA     #0
1275            STA     L11111101
1276            LDA     #1
1277            STA     L11111101+1
1278            JMP     .L000166
1279  .L000164 EQU     *
1280            LDA     L11111101+1
1281            CLC
1282            ADC     #1
1283            STA     L11111101+1
1284            LDA     L11111101
1285            ADC     #0
1286            STA     L11111101
1287            LDA     #13
1288            CMP     L11111101+1
1289            LDA     #0
1290            SBC     L11111101
1291            BMI     .L000165
1292  .L000166 EQU     *
1293  ;     26 X(L)= X(L)/SUM                                          02620000
1294  .L000168 EQU     *
1295            LDA     L11111101+1
1296            ASL     A
1297            ASL     A
1298            CLC
1299            ADC     #(X11111101-4) MOD .M
1300            STA     .T000005
1301            LDA     #0
1302            ADC     #(X11111101-4)/256
1303            STA     .T000005+1
1304            LDA     L11111101+1
1305            ASL     A
1306            ASL     A
1307            CLC
1308            ADC     #(X11111101-4) MOD .M
1309            STA     .T000051
1310            LDA     #0
1311            ADC     #(X11111101-4)/256
1312            STA     .T000051+1
1313  .MFFDIV  SET     1
1314            JSR     .FFDIV
1315            .BYTE   0
1316            .WORD   -.T000005,SUM11101
1317            .WORD   -.T000051
1318            JMP     .L000164
1319  .L000165 EQU     *
1320  ;        RHOM(J)=0.0                                              02630000
1321            LDA     J11111101+1
1322            ASL     A
1323            ASL     A
1324            CLC
1325            ADC     #(RHOM11101-4) MOD .M
1326            STA     .T000005
1327            LDA     #0
1328            ADC     #(RHOM11101-4)/256
1329            STA     .T000005+1
1330  .MFLTASG SET     1
1331            JSR     .FLTASGN
1332            .BYTE   0
1333            .WORD   .C000169
1334            .WORD   -.T000005
1335  ;        DO 29 L=1,13                                             02640000
1336            LDA     #0
1337            STA     L11111101
1338            LDA     #1
1339            STA     L11111101+1
1340            JMP     .L000172
1341  .L000170 EQU     *
1342            LDA     L11111101+1
1343            CLC
1344            ADC     #1
```

```
1345            STA     L111101+1
1346            LDA     L111101
1347            ADC     #0
1348            STA     L111101
1349            LDA     #13
1350            CMP     L111101+1
1351            LDA     #0
1352            SBC     L111101
1353            BMI     .L000171
1354    .L000172 EQU    *
1355    ;    29 RHOM(J)=RHOM(J)+ X(L)*RHO(L)                              02650000
1356    .L000174 EQU    *
1357            LDA     L111101+1
1358            ASL     A
1359            ASL     A
1360            CLC
1361            ADC     #(RHO11101-4) MOD .M
1362            STA     .T000004
1363            LDA     #0
1364            ADC     #(RHO11101-4)/256
1365            STA     .T000004+1
1366            LDA     L111101+1
1367            ASL     A
1368            ASL     A
1369            CLC
1370            ADC     #(X111101-4) MOD .M
1371            STA     .T000005
1372            LDA     #0
1373            ADC     #(X111101-4)/256
1374            STA     .T000005+1
1375    .MFFMUL SET     1
1376            JSR     .FFMUL
1377            .BYTE   0
1378            .WORD   -.T000005,-.T000004
1379            .WORD   .T000081
1380            LDA     J111101+1
1381            ASL     A
1382            ASL     A
1383            CLC
1384            ADC     #(RHOM1101-4) MOD .M
1385            STA     .T000005
1386            LDA     #0
1387            ADC     #(RHOM1101-4)/256
1388            STA     .T000005+1
1389            LDA     J111101+1
1390            ASL     A
1391            ASL     A
1392            CLC
1393            ADC     #(RHOM1101-4) MOD .M
1394            STA.    .T000051
1395            LDA     #0
1396            ADC     #(RHOM1101-4)/256
1397            STA     .T000051+1
1398    .MFFADD SET     1
1399            JSR     .FFADD
1400            .BYTE   0
1401            .WORD   -.T000005,.T000081
1402            .WORD   -.T000051
1403            JMP     .L000170
1404    .L000171 EQU    *
1405    ;       KV=0.0                                                    02660000
1406    .MFLTASG SET    1
1407            JSR     .FLTASGN
1408            .BYTE   0
1409            .WORD   .C000176
1410            .WORD   KV111101
1411    ;       KR=0.0                                                    02670000
1412    .MFLTASG SET    1
1413            JSR     .FLTASGN
1414            .BYTE   0
1415            .WORD   .C000177
1416            .WORD   KR111101
1417    ;       GV=0.0                                                    02680000
1418    .MFLTASG SET    1
1419            JSR     .FLTASGN
1420            .BYTE   0
1421            .WORD   .C000178
1422            .WORD   GV111101
1423    ;       GR=0.0                                                    02690000
```

```
1424        .MFLTASG  SET    1
1425                  JSR    .FLTASGN
1426                  .BYTE  0
1427                  .WORD  .C000179
1428                  .WORD  GR111101                                02700000
1429        ;         DO 30 L=1,13
1430                  LDA    #0
1431                  STA    L1111101
1432                  LDA    #1
1433                  STA    L1111101+1
1434                  JMP    .L000182
1435        .L000180  EQU    *
1436                  LDA    L1111101+1
1437                  CLC
1438                  ADC    #1
1439                  STA    L1111101+1
1440                  LDA    L1111101
1441                  ADC    #0
1442                  STA    L1111101
1443                  LDA    #13
1444                  CMP    L1111101+1
1445                  LDA    #0
1446                  SBC    L1111101
1447                  BMI    .L000181
1448        .L000182  EQU    *
1449        ;                                                        02710000
1450                  LDA    L1111101+1
1451                  ASL    A
1452                  ASL    A
1453                  CLC
1454                  ADC    #(K1111101-4) MOD .M
1455                  STA    .T000004
1456                  LDA    #0
1457                  ADC    #(K1111101-4)/256
1458                  STA    .T000004+1
1459                  LDA    L1111101+1
1460                  ASL    A
1461                  ASL    A
1462                  CLC
1463                  ADC    #(X1111101-4) MOD .M
1464                  STA    .T000005
1465                  LDA    #0
1466                  ADC    #(X1111101-4)/256
1467                  STA    .T000005+1
1468        .MFFMUL   SET    1
1469                  JSR    .FFMUL
1470                  .BYTE  0
1471                  .WORD  -.T000005,-.T000004
1472                  .WORD  .T000081
1473        .MFFADD   SET    1
1474                  JSR    .FFADD
1475                  .BYTE  0
1476                  .WORD  KV111101,.T000081
1477                  .WORD  KV111101
1478        ;                                                        02720000
1479                  LDA    L1111101+1
1480                  ASL    A
1481                  ASL    A
1482                  CLC
1483                  ADC    #(K1111101-4) MOD .M
1484                  STA    .T000004
1485                  LDA    #0
1486                  ADC    #(K1111101-4)/256
1487                  STA    .T000004+1
1488                  LDA    L1111101+1
1489                  ASL    A
1490                  ASL    A
1491                  CLC
1492                  ADC    #(X1111101-4) MOD .M
1493                  STA    .T000005
1494                  LDA    #0
1495                  ADC    #(X1111101-4)/256
1496                  STA    .T000005+1
1497        .MFFDIV   SET    1
1498                  JSR    .FFDIV
1499                  .BYTE  0
1500                  .WORD  -.T000005,-.T000004
1501                  .WORD  .T000081
```

```
1502        .MFFADD  SET    1
1503                 JSR    .FFADD
1504                 .BYTE  0
1505                 .WORD  KR111101,.T000081
1506                 .WORD  KR111101
1507        ;
1508                 LDA    L111101+1
1509                 ASL    A
1510                 ASL    A
1511                 CLC
1512                 ADC    #(G111101-4) MOD .M
1513                 STA    .T000004
1514                 LDA    #0
1515                 ADC    #(G111101-4)/256
1516                 STA    .T000004+1
1517                 LDA    L111101+1
1518                 ASL    A
1519                 ASL    A
1520                 CLC
1521                 ADC    #(X111101-4) MOD .M
1522                 STA    .T000005
1523                 LDA    #0
1524                 ADC    #(X111101-4)/256
1525                 STA    .T000005+1
1526        .MFFMUL  SET    1
1527                 JSR    .FFMUL
1528                 .BYTE  0
1529                 .WORD  -.T000005,-.T000004
1530                 .WORD  .T000081
1531        .MFFADD  SET    1
1532                 JSR    .FFADD
1533                 .BYTE  0
1534                 .WORD  GV111101,.T000081
1535                 .WORD  GV111101
1536        ;
1537                 LDA    L111101+1
1538                 ASL    A
1539                 ASL    A
1540                 CLC
1541                 ADC    #(G111101-4) MOD .M
1542                 STA    .T000004
1543                 LDA    #0
1544                 ADC    #(G111101-4)/256
1545                 STA    .T000004+1
1546                 LDA    L111101+1
1547                 ASL    A
1548                 ASL    A
1549                 CLC
1550                 ADC    #(X111101-4) MOD .M
1551                 STA    .T000005
1552                 LDA    #0
1553                 ADC    #(X111101-4)/256
1554                 STA    .T000005+1
1555        .MFFDIV  SET    1
1556                 JSR    .FFDIV
1557                 .BYTE  0
1559                 .WORD  .T000081
1560        .MFFADD  SET    1
1561                 JSR    .FFADD
1562                 .BYTE  0
1563                 .WORD  GP111101,.T000081
1564                 .WORD  GP111101
1565        ;    30 CONTINUE
1566        .L000184 EQU   *
1567                 JMP    .L000180
1568        .L000181 EQU   *
1569        ;
1570        .MFFDIV  SET    1
1571                 JSR    .FFDIV
1572                 .BYTE  0
1573                 .WORD  .C000185,GR111101
1574                 .WORD  GR111101
1575        ;
1576        ;
1577        .MFFDIV  SET    1
1578                 JSR    .FFDIV
1579                 .BYTE  0
```

```
1580                .WORD    .C000186,KR111101
1581                .WORD    KR111101
1582      ;         KM(J)=(KV+KR)/2.0                              02790000
1583      .MFFADD   SET      1
1584                JSR      .FFADD
1585                .BYTE    0
1586                .WORD    KV111101,KR111101
1587                .WORD    .T000081
1588                LDA      J111101+1
1589                ASL      A
1590                ASL      A
1591                CLC
1592                ADC      #(KM111101-4) MOD .M
1593                STA      .T000051
1594                LDA      #0
1595                ADC      #(KM111101-4)/256
1596                STA      .T000051+1
1597      .MFFDIV   SET      1
1598                JSR      .FFDIV
1599                .BYTE    0
1600                .WORD    .T000081,.C000187
1601                .WORD    -.T000051
1602      ;                                                        02800000
1603      .MFFADD   SET      1
1604                JSR      .FFADD
1605                .BYTE    0
1606                .WORD    GV111101,GR111101
1607                .WORD    .T000081
1608                LDA      J111101+1
1609                ASL      A
1610                ASL      A
1611                CLC
1612                ADC      #(GM111101-4) MOD .M
1613                STA      .T000051
1614                LDA      #0
1615                ADC      #(GM111101-4)/256
1616                STA      .T000051+1
1617      .MFFDIV   SET      1
1618                JSR      .FFDIV
1619                .BYTE    0
1620                .WORD    .T000081,.C000188
1621                .WORD    -.T000051
1622      ;         GO TO 40                                       02810000
1623                JMP      .L000189
1624      ; C       DEFAULTS:                                      02820000
1625      ;      35 KM(J)=KMDEF                                    02830000
1626      .L000152  EQU      *
1627                LDA      J111101+1
1628                ASL      A
1629                ASL      A
1630                CLC
1631                ADC      #(KM111101-4) MOD .M
1632                STA      .T000005
1633                LDA      #0
1634                ADC      #(KM111101-4)/256
1635                STA      .T000005+1
1636      .MFLTASG  SET      1

1639                .WORD    KMDEF101
1640                .WORD    -.T000005
1641      ;         GM(J)=GMDEF                                    02840000
1642                LDA      J111101+1
1643                ASL      A
1644                ASL      A
1645                CLC
1646                ADC      #(GM111101-4) MOD .M
1647                STA      .T000005
1648                LDA      #0
1649                ADC      #(GM111101-4)/256
1650                STA      .T000005+1
1651      .MFLTASG  SET      1
1652                JSR      .FLTASGN
1653                .BYTE    0
1654                .WORD    GMDEF101
1655                .WORD    -.T000005
1656      ;      40 NOBS=J                                         02850000
1657      .L000189  EQU      *
```

```
1658              LDA      J11111101
1659              STA      NOBS1101
1660              LDA      J11111101+1
1661              STA      NOBS1101+1
1662      ;   50 CONTINUE                                                  02860000
1663    .L000104 EQU       *
1664              JMP      .L000099
1665    .L000100 EQU       *
1666    ; C   75 WRITE(NOUT,80)NOBS                                        02870026
1667    ; C   80 FORMAT(/5X,'  NO. OF OBSERVATIONS=',I6 //)                02880000
1668    ; C       *   *   *                                                02890000
1669    ; C       MAIN COMPUTE LOOP ;                                      02900000
1670    ; C*   *   *                                                       02910003
1671    ;         DO 200 J=1,NOBS                                          02920000
1672              LDA      #0
1673              STA      J11111101
1674              LDA      #1
1675              STA      J11111101+1
1676    ; C       WRITE(NOUT,110)J,SAMP(J),COL(J)                          02930026
1677    ; C  110 FORMAT(/5X,'       PROBLEM NO. J=',I5,9X,'SAMPLE  NO.=',A8,A2 02940000
1678              JMP      .L000192
1679    .L000190 EQU       *
1680              LDA      J11111101+1
1681              CLC
1682              ADC      #1
1683              STA      J11111101+1
1684              LDA      J11111101
1685              ADC      #0
1686              STA      J11111101
1687              LDA      NOBS1101+1
1688              CMP      J11111101+1
1689              LDA      NOBS1101
1690              SBC      J11111101
1691              BMI      .L000191
1692    .L000192 EQU       *
1693    ;         MIN=MINR(J)                                              02950000
1694              LDA      J11111101+1
1695              ASL      A
1696              TAX
1697              LDA      MINR1101-2,X
1698              STA      MIN1101
1699              LDA      MINR1101-1,X
1700              STA      MIN1101+1
1701    ;         LTH=LITH(J)                                              02960003
1702    ; C       IF(LTH.EQ.1)WRITE(NOUT,351)LTH                           02970026
1703    ; C       IF(LTH.EQ.2)WRITE(NOUT,352)LTH                           02980026
1704    ; C       IF(LTH.EQ.3)WRITE(NOUT,353)LTH                           02990026
1705    ; C  351 FORMAT(/5X,' SANDSTONE, LTH=',I2 /)                       03000013
1706    ; C  352 FORMAT(/5X,' LIMESTONE, LTH=',I2 /)                       03010013
1707    ; C  353 FORMAT(/5X,' DOLOSTONE, LTH=',I2 /)                       03020013
1708              LDA      J11111101+1
1709              ASL      A
1710.             TAX
1711              LDA      LITH1101-2,X
1712              STA      LTH1101
1713              LDA      LITH1101-1,X
1714              STA      LTH1101+1
1715    ;         PCT=POR(J)*100.
1716    ; C       WRITE(NOUT,113)VP(J),BULKD(J),DEPTH(J),KM(J),GM(J),MIN,PCT,SONI
1717    ; C  113 FORMAT(/5X,'BRINE SATURATED INPUTS:'/5X,'   VP=',F10.1,' BULK DE
1718    ; C      *TY=',F10.5,'  DEPTH(KFT)=',F10.2,'  KM=',F6.1,'  GM=',F6.1,
1719    ; C      *'  MIN=',I3,/5X,'POROSITY(X)=',F6.2,'  SONIC=',F5.1 //)
1720    ; CC      IF(MIN.GT.0)WRITE(NOUT,307)(X(JL),JL=1,13),SAMP(J),COL(J)
1721    ; C  307 FORMAT(/5X,' MINERAL CARD X(I),I=1,13 '/5X,13F7.2,10X,A8,A2 //)
1722    ; C       POROSITY=0 ERROR.
1723    ; C       IF(PCT.LE.0)WRITE(NOUT,301)
1724    ; C  301 FORMAT(/5X,' POROSITY=0, PROBLEM UNTENABLE' //)
1725              LDA      J11111101+1
1726              ASL      A
1727              ASL      A
1728              CLC
1729              ADC      #(POR1101-4) MOD .M
1730              STA      .T000005
1731              LDA      #0
1732              ADC      #(POP1101-4)/256
1733              STA      .T000005+1
1734    .MFFMUL   SET      1
1735              JSR      .FFMUL
```

```
1736                .BYTE  0
1737                .WORD  -.T000005,.C000195
1738                .WORD  PCTI1101
1739        ;       IF(PCT.LE.0.0)GO TO 200                         03130000
1740   .MFFLE       SET    1
1741                JSR    .FFLE
1742                .BYTE  0
1743                .WORD  PCTI1101,.C000196
1744                ASL    A
1745                BCS    *+5
1746                JMP    .L000197
1747                JMP    .L000194
1748   .L000197 EQU *
1749        ;       IF(MIN.LE.0)GO TO 112                           03140000
1750                LDA    #0
1751                CMP    MINI1101+1
1752                LDA    #0
1753                SBC    MINI1101
1754                BMI    .L000198
1755                JMP    .L000200
1756   .L000198 EQU *
1757        ;                                                       03150005
1758                LDA    JI1111101+1
1759                ASL    A
1760                ASL    A
1761                CLC
1762                ADC    #(PORI1101-4) MOD .M
1763                STA    .T000004
1764                LDA    #0
1765                ADC    #(PORI1101-4)/256
1766                STA    .T000004+1
1767   .MFFSUB      SET    1
1768                JSR    .FFSUB
1769                .BYTE  0
1770                .WORD  .C000201,-.T000004
1771                .WORD  .T000175
1772                LDA    JI1111101+1
1773                ASL    A
1774                ASL    A
1775                CLC
1776                ADC    #(RHOMI1101-4) MOD .M
1777                STA    .T000004
1778                LDA    #0
1779                ADC    #(RHOMI1101-4)/256
1780                STA    .T000004+1
1781   .MFFMUL      SET    1
1782                JSR    .FFMUL
1783                .BYTE  0
1784                .WORD  .T000175,-.T000004
1785                .WORD  .T000202
1786                LDA    JI1111101+1
1787                ASL    A
1788                ASL    A
1789                CLC
1790                ADC    #(PORI1101-4) MOD .M
1791                STA    .T000005
1792                LDA    #0
1793                ADC    #(PORI1101-4)/256
1794                STA    .T000005+1
1795   .MFFMUL      SET    1
1796                JSR    .FFMUL
1797                .BYTE  0
1798                .WORD  -.T000005,RHOBRNO1
1799                .WORD  .T000081
1800   .MFFADD      SET    1
1801                JSR    .FFADD
1802                .BYTE  0
1803                .WORD  .T000081,.T000202
1804                .WORD  RHOBC101
1805        ;       U=BULKD(J)-RHOBC                                03160000
1806                LDA    JI1111101+1
1807                ASL    A
1808                ASL    A
1809                CLC
1810                ADC    #(BULKD101-4) MOD .M
1811                STA    .T000005
1812                LDA    #0
1813                ADC    #(BULKD101-4)/256
```

```
1814                STA    .T000005+1
1815    .MFFSUB     SET    1
1816                JSR    .FFSUB
1817                .BYTE  0
1818                .WORD  -.T000005,RHOBC101
1819                .WORD  U1111101
1820    ;           U=ABS(U)                                                  03170000
1821                LDA    #U1111101 MOD .M
1822                STA    ABS.0001
1823                LDA    #U1111101/256
1824                STA    ABS.0001+1
1825                LDA    #.T000081 MOD .M
1826                STA    ABS.0000
1827                LDA    #.T000081/256
1828                STA    ABS.0000+1
1829                JSR    ABS
1830    .MFLTASG    SET    1
1831                JSR    .FLTASGN
1832                .BYTE  0
1833                .WORD  .T000081
1834                .WORD  U1111101
1835    ;           U=(U/BULKD(J))*100.                                        '80000
1836    ; C         IF(U.GT.TST)WRITE(NOUT,115)TST                              90026
1837    ; C      115 FORMAT(/5X,' COMPUTED AND OBSERVED BRINE BULK MODULI DIFFER BY  00000
1838    ; C         *MORE THAN TST % =',F10.2 //)                              .10000
1839                LDA    J1111101+1
1840                ASL    A
1841                ASL    A
1842                CLC
1843                ADC    #(BULKD101-4) MOD .M
1844                STA    .T000004
1845                LDA    #0
1846                ADC    #(BULKD101-4)/256
1847                STA    .T000004+1
1848    .MFFDIV     SET    1
1849                JSR    .FFDIV
1850                .BYTE  0
1851                .WORD  U1111101,-.T000004
1852                .WORD  .T000081
1853    .MFFMUL     SET    1
1854                JSR    .FFMUL
1855                .BYTE  0
1856                .WORD  .T000081,.C000203
1857                .WORD  U1111101
1858    ;           GO TO 117                                                  03220000
1859                JMP    .L000204
1860    ;        112 RHOBC=BULKD(J)                                            03230000
1861    .L000200    EQU    *
1862                LDA    J1111101+1
1863                ASL    A
1864                ASL    A
1865                CLC
1866                ADC    #(BULKD101-4) MOD .M
1867                STA    .T000004
1868                LDA    #0
1869                ADC    #(BULKD101-4)/256
1870                STA    .T000004+1
1871    .MFLTASG    SET    1
1872                JSR    .FLTASGN
1873                .BYTE  0
1874                .WORD  -.T000004
1875                .WORD  RHOBC101
1876    ;                                                                      03240005
1877                LDA    J1111101+1
1878                ASL    A
1879                ASL    A
1880                CLC
1881                ADC    #(POR11101-4) MOD .M
1882                STA    .T000005
1883                LDA    #0
1884                ADC    #(POR11101-4)/256
1885                STA    .T000005+1
1886    .MFFMUL     SET    1
1887                JSR    .FFMUL
1888                .BYTE  0
1889                .WORD  -.T000005,RHOBRN01
1890                .WORD  .T000081
```

```
1891             LDA     JIIIII01+1
1892             ASL     A
1893             ASL     A
1894             CLC
1895             ADC     #(PORIII01-4) MOD .M
1896             STA     .T000004
1897             LDA     #0
1898             ADC     #(PORIII01-4)/256
1899             STA     .T000004+1
1900  .MFFSUB    SET     1
1901             JSR     .FFSUB
1902             .BYTE   0
1903             .WORD   .C000205,-.T000004
1904             .WORD   .T000202
1905  .MFFSUB    SET     1
1906             JSR     .FFSUB
1907             .BYTE   0
1908             .WORD   RHOBCI01,.T000081.
1909             .WORD   .T000175
1910             LDA     JIIIII01+1
1911             ASL     A
1912             ASL     A
1913             CLC
1914             ADC     #(RHOMII01-4) MOD .M
1915             STA     .T000051
1916             LDA     #0
1917             ADC     #(RHOMII01-4)/256
1918             STA     .T000051+1
1919  .MFFDIV    SET     1
1920             JSR     .FFDIV
1921             .BYTE   0
1922             .WORD   .T000175,.T000202
1923             .WORD   -.T000051
1924  ;
1925  .L000204 EQU     *                                          03250000
1926             LDA     JIIIII01+1
1927             ASL     A
1928             ASL     A
1929             CLC
1930             ADC     #(VPIIII01-4) MOD .M
1931             STA     .T000005
1932             LDA     #0
1933             ADC     #(VPIIII01-4)/256
1934             STA     .T000005+1
1935  .MFFDIV    SET     1
1936             JSR     .FFDIV
1937             .BYTE   0
1938             .WORD   -.T000005,.C000206
1939             .WORD   .T000081
1940  .MFFMUL    SET     1
1941             JSR     .FFMUL
1942             .BYTE   0
1943             .WORD   .T000081,.C000207
1944             .WORD   .T000175
1945  .MFFMUL    SET     1
1946             JSR     .FFMUL
1947             .BYTE   0
1948             .WORD   .T000175,.C000208
1949             .WORD   RHOBCI01
1950  ;         Z=DEPTH(J)                                        03260006
1951             LDA     JIIIII01+1
1952             ASL     A
1953             ASL     A
1954             CLC
1955             ADC     #(DEPTHI01-4) MOD .M
1956             STA     .T000004
1957             LDA     #0
1958             ADC     #(DEPTHI01-4)/256
1959             STA     .T000004+1
1960  .MFLTASG   SET     1
1961             JSR     .FLTASGN
1962             .BYTE   0
1963             .WORD   -.T000004
1964             .WORD   ZIIIII01
1965  ;         PFLUID=FGRAD*Z                                    03270010
1966  .MFFMUL    SET     1
1967             JSR     .FFMUL
1968             .BYTE   0
```

```
1969                .WORD   FGRAD101,Z111101
1970                .WORD   PFLUID01
1971     ;          IF(FTEMP(J).GT.0.0)TEMP=FTEMP(J)                    03280010
1972                LDA     J111101+1
1973                ASL     A
1974                ASL     A
1975                CLC
1976                ADC     #(FTEMP101-4) MOD .M
1977                STA     .T000051
1978                LDA     #0
1979                ADC     #(FTEMP101-4)/256
1980                STA     .T000051+1
1981     .MFFGT     SET     1
1982                JSR     .FFGT
1983                .BYTE   0
1984                .WORD   -.T000051,.C000209
1985                ASL     A
1986                BCS     *+5
1987                JMP     .L000210
1988                LDA     J111101+1
1989                ASL     A
1990                ASL     A
1991                CLC
1992                ADC     #(FTEMP101-4) MOD .M
1993                STA     .T000004
1994                LDA     #0
1995                ADC     #(FTEMP101-4)/256
1996                STA     .T000004+1
1997     .MFLTASG   SET     1
1998                JSR     .FLTASGN
1999                .BYTE   0
2000                .WORD   -.T000004
2001                .WORD   TEMP101
2002     .L000210   EQU     *
2003     ;          IF(FTEMP(J).LE.0.0)TEMP=TO1+TGRAD*Z                  03290010
2004                LDA     J111101+1
2005                ASL     A
2006                ASL     A
2007                CLC
2008                ADC     #(FTEMP101-4) MOD .M
2009                STA     .T000051
2010                LDA     #0
2011                ADC     #(FTEMP101-4)/256
2012                STA     .T000051+1
2013     .MFFLE     SET     1
2014                JSR     .FFLE
2015                .BYTE   0
2016                .WORD   -.T000051,.C000211
2017                ASL     A
2018                BCS     *+5
2019                JMP     .L000212
2020     .MFFMUL    SET     1
2021                JSR     .FFMUL
2022                .BYTE   0
2023                .WORD   TGRAD101,Z111101
2024                .WORD   .T000081
2025     .MFFADD    SET     1
2026                JSR     .FFADD
2027                .BYTE   0
2028                .WORD   TO111101,.T000081
2029                .WORD   TEMP101
2030     .L000212   EQU     *
2031     ;          KKM=KM(J)                                            03300000
2032                LDA     J111101+1
2033                ASL     A
2034                ASL     A
2035                CLC
2036                ADC     #(KM111101-4) MOD .M
2037                STA     .T000004
2038                LDA     #0
2039                ADC     #(KM111101-4)/256
2040                STA     .T000004+1
2041     .MFLTASG   SET     1
2042                JSR     .FLTASGN
2043                .BYTE   0
2044                .WORD   -.T000004
2045                .WORD   KKM111101
2046     ;          GGM=GM(J)                                            03310000
```

```
2047            LDA     JIIIII01+1
2048            ASL     A
2049            ASL     A
2050            CLC
2051            ADC     #(GMIIII01-4) MOD .M
2052            STA     .T000004
2053            LDA     #0
2054            ADC     #(GMIIII01-4)/256
2055            STA     .T000004+1
2056    .MFLTASG SET    1
2057            JSR     .FLTASGN
2058            .BYTE   0
2059            .WORD   -.T000004
2060            .WORD   GGMIIII01
2061    ;       PHI=POR(J)                                                      03320000
2062            LDA     JIIIII01+1
2063            ASL     A
2064            ASL     A
2065            CLC
2066            ADC     #(PORIIII01-4) MOD .M
2067            STA     .T000004
2068            LDA     #0
2069            ADC     #(PORIIII01-4)/256
2070            STA     .T000004+1
2071    .MFLTASG SET    1
2072            JSR     .FLTASGN
2073            .BYTE   0
2074            .WORD   -.T000004
2075            .WORD   PHIIII01
2076    ;                                                                       03330058
2077    .MFFSUB  SET    1
2078            JSR     .FFSUB
2079            .BYTE   0
2080            .WORD   .C000213,PHIIII01
2081            .WORD   .T000175
2082    .MFFDIV  SET    1
2083            JSR     .FFDIV
2084            .BYTE   0
2085            .WORD   .T000175,KKMIIII01
2086            .WORD   .T000202
2087    .MFFDIV  SET    1
2088            JSR     .FFDIV
2089            .BYTE   0
2090            .WORD   PHIIII01,KUPINE01
2091            .WORD   .T000081
2092    .MFFADD  SET    1
2093            JSR     .FFADD
2094            .BYTE   0
2095            .WORD   .T000081,.T000202
2096            .WORD   KLOWIII01
2097    ;       KLOW=1.0/KLOW
2100    ; C     CALL KGKA AND CALQ TO COMPUTE KA/KM,K*/KM,G*/GM (SANDSTONE)      03370004
2101    .MFFDIV  SET    1
2102            JSR     .FFDIV
2103            .BYTE   0
2104            .WORD   .C000214,KLOWIII01
2105            .WORD   KLOWIII01
2106    ;       IF(LTH.EQ.2 .OR. LTH.EQ.3) GO TO 509                             03380004
2107            LDA     LTHIIII01+1
2108            CMP     #3
2109            BNE     .L000215
2110            LDA     LTHIIII01
2112            BNE     .L000215
2113    .L000216 LDA    #80H
2114            BNE     *+4
2115    .L000215 LDA    #0
2116            STA     .T000005
2117            LDA     LTHIIII01+1
2118            CMP     #2
2119            BNE     .L000217
2120            LDA     LTHIIII01
2121            CMP     #0
2122            BNE     .L000217
2123    .L000218 LDA    #80H
2124            BNE     *+4
2125    .L000217 LDA    #0
2126            ORA     .T000005
```

```
2127            ASL     A
2128            BCS     *+5
2129            JMP     .L000219
2130            JMP     .L000220
2131   .L000219 EQU     *
2132   ;        CALL    KGKA(PSTP,KKM,GGM,KBRINE,CO,PHI,AA,BB,GG,TOL)                  03390034
2133            LDA     #TOL11101 MOD .M
2134            STA     KGKA.010
2135            LDA     #TOL11101/256
2136            STA     KGKA.010+1
2137            LDA     #GG11101 MOD .M
2138            STA     KGKA.009
2139            LDA     #GG11101/256
2140            STA     KGKA.009+1
2141            LDA     #BB11101 MOD .M
2142            STA     KGKA.008
2143            LDA     #BB11101/256
2144            STA     KGKA.008+1
2145            LDA     #AA11101 MOD .M
2146            STA     KGKA.007
2147            LDA     #AA11101/256
2148            STA     KGKA.007+1
2149            LDA     #PHI11101 MOD .M
2150            STA     KGKA.006
2151            LDA     #PHI11101/256
2152            STA     KGKA.006+1
2153            LDA     #CO11101 MOD .M
2154            STA     KGKA.005
2155            LDA     #CO11101/256
2156            STA     KGKA.005+1
2157            LDA     #KBRINE01 MOD .M
2158            STA     KGKA.004
2159            LDA     #KBRINE01/256
2160            STA     KGKA.004+1
2161            LDA     #GGM1101 MOD .M
2162            STA     KGKA.003
2163            LDA     #GGM1101/256
2164            STA     KGKA.003+1
2165            LDA     #KKM1101 MOD .M
2166            STA     KGKA.002
2167            LDA     #KKM1101/256
2168            STA     KGKA.002+1
2169            LDA     #PSTR1101 MOD .M
2170            STA     KGKA.001
2171            LDA     #PSTR1101/256
2172            STA     KGKA.001+1
2173            JSR     KGKA
2174   ;        GO TO 510                                                              63400004
2175            JMP     .L000221
2176   ;    509 CALL LIDOS(NP,DGRAD,LTH,Z,PSTR,KKM,GGM,KBRINE,PHI,AA,BB,GG)            03410031
2177   .L000220 EQU     *
2178            LDA     #GG11101 MOD .M
2179            STA     LIDOS.12
2180            LDA     #GG11101/256
2181            STA     LIDOS.12+1
2182            LDA     #BB11101 MOD .M
2183            STA     LIDOS.11
2184            LDA     #BB11101/256
2185            STA     LIDOS.11+1
2186            LDA     #AA11101 MOD .M
2187            STA     LIDOS.10
2188            LDA     #AA11101/256
2189            STA     LIDOS.10+1
2190            LDA     #PHI11101 MOD .M
2191            STA     LIDOS.09
2192            LDA     #PHI11101/256
2193            STA     LIDOS.09+1
2194            LDA     #KBRINE01 MOD .M
2195            STA     LIDOS.08
2196            LDA     #KBRINE01/256
2197            STA     LIDOS.08+1
2198            LDA     #GGM1101 MOD .M
2199            STA     LIDOS.07
2200            LDA     #GGM1101/256
2201            STA     LIDOS.07+1
2202            LDA     #KKM1101 MOD .M
2203            STA     LIDOS.06
2204            LDA     #KKM1101/256
```

```
2205            STA     LIDOS.06+1
2206            LDA     #PSTR||101 MOD .M
2207            STA     LIDOS.05
2208            LDA     #PSTR||101/256
2209            STA     LIDOS.05+1
2210            LDA     #ZI||||01 MOD .M
2211            STA     LIDOS.04
2212            LDA     #ZI||||01/256
2213            STA     LIDOS.04+1
2214            LDA     #LTH|||01 MOD .M
2215            STA     LIDOS.03
2216            LDA     #LTH|||01/256
2217            STA     LIDOS.03+1
2218            LDA     #DGRAD|01 MOD .M
2219            STA     LIDOS.02
2220            LDA     #DGRAD|01/256
2221            STA     LIDOS.02+1
2222            LDA     #NP|||101 MOD .M
2223            STA     LIDOS.01
2224            LDA     #NP|||101/256
2225            STA     LIDOS.01+1
2226            JSR     LIDOS
2227    !
2228    .L000221 EQU     *
2232    .MFFMUL  SET     1
2233            JSR     .FFMUL
2234            .BYTE   0
2235            .WORD   AA|||101,KKM|||01
2236            .WORD   KA|||101
2237    !                                                                03460000
2238    .MFFMUL  SET     1
2239            JSR     .FFMUL
2240            .BYTE   0
2241            .WORD   BB|||101,KKM|||01
2242            .WORD   KSTAR|01
2243    !                                                                03470000
2244    ! C      K* BELOW LOWER H-S BOUND ERROR.                          03480058
2245    ! C          IF(KLOW.GE.KSTAR)WRITE(NOUT,507)KLOW,KSTAR            03490058
2246    ! C      507 FORMAT(/5X,' LOWER BOUND,KLOW=',F7.2,3X,'= OR > K*=',F7.2,3X, 03500061
2247    ! C      *'PROBLEM QUESTIONABLE' //)                               03510058
2248    ! C          IF(NBUG.GT.0)WRITE(NOUT,513)                          03520026
2249    ! C      513 FORMAT(/5X,'    SOME BRINE SATURATED OUTPUTS:' /)     03530026
2250    ! C          IF(NBUG.GT.0)WRITE(NOUT,511)AA,BB,GG,KSTAR,GSTAR,PSTR 03540026
2251    ! C      511 FORMAT(/5X,' A=KA/KM,B=K*/KM,G=G*/GM,K*,G*,P*=',6F14.5 //) 03550000
2252    .MFFMUL  SET     1
2253            JSR     .FFMUL
2254            .BYTE   0
2255            .WORD   GG|||101,GGM|||01
2256            .WORD   GSTAR|01
2257    !                                                                03560000
2258    .MFFDIV  SET     1
2259            JSR     .FFDIV
2260            .BYTE   0
2261            .WORD   KSTAR|01,GSTAR|01
2262            .WORD   R|||||01
2263    !                                                                03570000
2264    .MFFDIV  SET     1
2265            JSR     .FFDIV
2266            .BYTE   0
2267            .WORD   .C000222,.C000223
2268            .WORD   .T000081
2269    .MFFADD  SET     1
2270            JSR     .FFADD
2271            .BYTE   0
2272            .WORD   R|||||01,.T000081
2273            .WORD   FAC|||01
2274    !                                                                03580000
2275            LDA     JI|FI|01+1
2276            ASL     A
2277            ASL     A
2278            CLC
2279            ADC     #(VP|||01-4) MOD .M
2280            STA     .T000051
2281            LDA     #0
2282            ADC     #(VP|||01-4)/256
2283            STA     .T000051+1
2284    .MFFDIV  SET     1
2285            JSR     .FFDIV
```

```
2286              .BYTE 0
2287              .WORD .C000224,FAC11101
2288              .WORD -.T000051
2289        ;                                                          03590000
2290              LDA    #VS11101 MOD .M
2291              STA    SQRT.001
2292              LDA    #VS11101/256
2293              STA    SQRT.001+1
2294              LDA    #.T000081 MOD .M
2295              STA    SQRT.000
2296              LDA    #.T000081/256
2297              STA    SQRT.000+1
2298              JSR    SQRT
2299   .MFLTASG SET   1
2300              JSR    .FLTASGN
2301              .BYTE  0
2302              .WORD  .T000081
2303              .WORD  VCS11101
2304        ;                                                          03600000
2305   .MFFMUL  SET   1
2306              JSR    .FFMUL
2307              .BYTE  0
2308              .WORD  .C000225,R111101
2309              .WORD  .T000081
2310   .MFFMUL  SET   1
2311              JSR    .FFMUL
2312              .BYTE  0
2313              .WORD  .C000227,R111101
2314              .WORD  .T000202
2315   .MFFADD  SET   1
2316              JSR    .FFADD
2317              .BYTE  0
2318              .WORD  .T000202,.C000228
2319              .WORD  .T000229
2320   .MFFSUB  SET   1
2321              JSR    .FFSUB
2322              .BYTE  0
2323              .WORD  .T000081,.C000226
2324              .WORD  .T000175
2325   .MFFDIV  SET   1
2326              JSR    .FFDIV
2327              .BYTE  0
2328              .WORD  .T000175,.T000229
2329              .WORD  SIGSTR01
2330        ;     RHOGRN=RHOM(J)                                       03610000
2331              LDA    J111101+1
2332              ASL    A
2333              ASL    A
2334              CLC
2335              ADC    #(RHOM1101-4) MOD .M
2336              STA    .T000004
2337              LDA    #0
2338              ADC    #(RHOM1101-4)/256
2339              STA    .T000004+1
2340   .MFLTASG SET   1
2341              JSR    .FLTASGN
2342              .BYTE  0
2343              .WORD  -.T000004
2344              .WORD  RHOGRN01
2345        ;     VCP=VP(J)                                             03620000
2346              LDA    J111101+1
2347              ASL    A
2348              ASL    A
2349              CLC
2350              ADC    #(VP11101-4) MOD .M
2351              STA    .T000004
2352              LDA    #0
2353              ADC    #(VP11101-4)/256
2354              STA    .T000004+1
2355   .MFLTASG SET   1
2356              JSR    .FLTASGN
2357              .BYTE  0
2358              .WORD  -.T000004
2359              .WORD  VCP11101
2360        ;     SGAS=0.0                                              03630012
2361   .MFLTASG SET   1
2362              JSR    .FLTASGN
2363              .BYTE  0
```

```
2364                .WORD  .C000230
2365                .WORD  SGAS1101
2366       ;        SOIL=0.0                                                        03640012
2367       ; C      COMPUTE RHOGAS AND KGAS.(PRINT IF NBUG>0).                       03650014
2368       .MFLTASG SET   1
2369                JSR   .FLTASGN
2370                .BYTE 0
2371                .WORD .C000231
2372                .WORD SOIL1101
2373       ;        CALL GASMD2(PFLUID,TEMP,RHOGAS,KGAS,GASGRV,TOL,NBUG,NOUT,
2378                LDA   #NOUT1101 MOD .M
2379                STA   GASMD2.8
2380                LDA   #NOUT1101/256
2381                STA   GASMD2.8+1
2382                LDA   #NBUG1101 MOD .M
2383                STA   GASMD2.7
2384                LDA   #NBUG1101/256
2385                STA   GASMD2.7+1
2386                LDA   #TOL11101 MOD .M
2387                STA   GASMD2.6
2388                LDA   #TOL11101/256
2389                STA   GASMD2.6+1
2390                LDA   #GASGRV01 MOD .M
2391                STA   GASMD2.5
2392                LDA   #GASGRV01/256
2393                STA   GASMD2.5+1
2394                LDA   #KGAS1101 MOD .M
2395                STA   GASMD2.4
2396                LDA   #KGAS1101/256
2397                STA   GASMD2.4+1
2398                LDA   #RHOGAS01 MOD .M
2399                STA   GASMD2.3
2400                LDA   #RHOGAS01/256
2401                STA   GASMD2.3+1
2402                LDA   #TEMP1101 MOD .M
2403                STA   GASMD2.2
2404                LDA   #TEMP1101/256
2405                STA   GASMD2.2+1
2406                LDA   #PFLUID01 MOD .M
2407                STA   GASMD2.1
2408                LDA   #PFLUID01/256
2409                STA   GASMD2.1+1
2410                JSR   GASMD2                                                      10041
2426       ; C      IF(NBUG.GT.0)WRITE(NOUT,253)                                     20026
2427       ; C  253 FORMAT(/5X,'    COMPUTED GAS AND OIL PARAMETERS: '/)              30026
2428       ; C      IF(NBUG.GT.0)WRITE(NOUT,251)KGAS,RHOGAS,TEMP,KOIL,RHOOIL          40026
2429       ; C  251 FORMAT(/5X,'      KGAS=',F10.5,'    RHOGAS=',F10.5,'   TEMPERATURE 50000
2430       ; C      *',F10.5,'  KOIL=',F10.5,'  RHOOIL=',F10.5 //)                    50012
2431       ; C      WRITE(NOUT,120)                                                   70026
2432       ; C  120 FORMAT(/5X,' SG=GAS SAT.(%)',' SO=OIL SAT.',8X,' VP(COMPUTED)',   780021
2433       ; C      *' VS(COMPUTED)',3X,' POISSON RATIO ',3X,' CALC. BULK DENSITY' /  790007
2434       ; C      WRITE(NOUT,125)SGAS,SOIL,VCP,VCS,SIGSTR,RHOBC                     800026
2435       ; CC 125 FORMAT(1X,2F15.2,F20.1,F20.1,F17.5,3X,F20.5     //)                810012
2436       .MFFMUL  SET   1
2437                JSR   .FFMUL
2438                .BYTE 0
2439                .WORD .C000234,RHOOIL01
2440                .WORD .T000081
2441       .MFFSUB  SET   1
2442                JSR   .FFSUB
2443                .BYTE 0
2444                .WORD .T000081,.C000235
2445                .WORD KOIL1101
2446       ;        DO 179 L=1,NSG                                                   03820012
2447                LDA   #0
2448                STA   L111101
2449                LDA   #1
2450                STA   L111101+1
2451                JMP   .L000238
2452       .L000236 EQU   *
2453                LDA   L111101+1
2454                CLC
2455                ADC   #1
2456                STA   L111101+1
2457                LDA   L111101
2458                ADC   #0
2459                STA   L111101
2460                LDA   NSG11101+1
```

```
2461             CMP    L11111101+1
2462             LDA    NSG11101
2463             SBC    L1111101
2464             BMI    .L000237
2465  .L000238 EQU    *
2466  !        SGAS=SG(L)/100.0                                      03830006
2467             LDA    L11111101+1
2468             ASL    A
2469             ASL    A
2470             CLC
2471             ADC    #(SG111101-4) MOD .M
2472             STA    .T000005
2473             LDA    #0
2474             ADC    #(SG111101-4)/256
2475             STA    .T000005+1
2476  .MFFDIV SET    1
2477             JSR    .FFDIV
2478             .BYTE  0
2479             .WORD  -.T000005,.C000241
2480             .WORD  SGAS1101
2481  !        DO 175 LO=1,NSO                                       03840010
2482             LDA    #0
2483             STA    LO111101
2484             LDA    #1
2485             STA    LO111101+1
2486             JMP    .L000244
2487  .L000242 EQU    *
2488             LDA    LO111101+1
2489             CLC
2490             ADC    #1
2491             STA    LO111101+1
2492             LDA    LO111101
2493             ADC    #0
2494             STA    LO111101
2495             LDA    NSO111101+1
2496             CMP    LO111101+1
2497             LDA    NSO11101
2498             SBC    LO111101
2499             BMI    .L000243
2500  .L000244 EQU    *
2501  !        SOIL=SO(LO)/100.0                                     03850006
2502             LDA    LO111101+1
2503             ASL    A
2504             ASL    A
2505             CLC
2506             ADC    #(SO111101-4) MOD .M
2507             STA    .T000005
2508             LDA    #0
2509             ADC    #(SO111101-4)/256
2510             STA    .T000005+1
2511  .MFFDIV SET    1
2512             JSR    .FFDIV
2513             .BYTE  0
2514             .WORD  -.T000005,.C000247
2515             .WORD  SOIL1101
2516  !        IF(OILSAT.GT.0.0)SOIL=OILSAT/100.0                    03860012
2517  .MFFGT  SET    1
2518             JSR    .FFGT
2519             .BYTE  0
2520             .WORD  OILSAT01,.C000248
2521             ASL    A
2522             BCS    *+5
2523             JMP    .L000249
2524  .MFFDIV SET    1
2525             JSR    .FFDIV
2526             .BYTE  0
2527             .WORD  OILSAT01,.C000250
2528             .WORD  SOIL1101
2529  .L000249 EQU    *
2530  !        SHC=SGAS+SOIL                                         03870006
2531  .MFFADD SET    1
2532             JSR    .FFADD
2533             .BYTE  0
2534             .WORD  SGAS1101,SOIL1101
2535             .WORD  SHC11101
2536  !        IF(SHC.GT.1.0) GO TO 175                              03880007
2537  .MFFGT  SET    1
2538             JSR    .FFGT
```

```
2539              .BYTE  0
2540              .WORD  SHC11101,.C000251
2541              ASL    A
2542              BCS    *+5
2543              JMP    .L000252
2544              JMP    .L000246
2545  .L000252 EQU  *
2546    ; C      BEGIN SATURATION CALC. WITH SUBROUTINE FLMOD3(FLUID MODULI)
2547    ; C      COMPUTE (FOR EACH SHC) KF=FLUID BULK MOD. & RHOBC=TOTAL BULK DE
2548    ; C
2549    ;        CALL FLMOD2(SGAS,PHI,RHOGRN,RHOBRN,KBRINE,RHOGAS,KGAS,KF,RHOBC,
2550    ;       *SOIL,KOIL,RHOOIL)
2551              LDA    #RHOOIL01 MOD .M
2552              STA    FLMOD2.2
2553              LDA    #RHOOIL01/256
2554              STA    FLMOD2.2+1
2555              LDA    #KOIL1101 MOD .M
2556              STA    FLMOD2.1
2557              LDA    #KOIL1101/256
2558              STA    FLMOD2.1+1
2559              LDA    #SOIL1101 MOD .M
2560              STA    FLMOD2.0
2561              LDA    #SOIL1101/256
2562              STA    FLMOD2.0+1
2563              LDA    #RHOBC101 MOD .M
2564              STA    FLMOD2.9
2565              LDA    #RHOBC101/256
2566              STA    FLMOD2.9+1
2567              LDA    #KF11101 MOD .M
2568              STA    FLMOD2.8
2569              LDA    #KF11101/256
2570              STA    FLMOD3.8+1
2571              LDA    #KGAS1101 MOD .M
2572              STA    FLMOD2.7
2573              LDA    #KGAS1101/256
2574              STA    FLMOD2.7+1
2575              LDA    #RHOGAS01 MOD .M
2576              STA    FLMOD2.6
2577              LDA    #RHOGAS01/256
2578              STA    FLMOD2.6+1
2579              LDA    #KBRINE01 MOD .M
2580              STA    FLMOD2.5
2581              LDA    #KBRINE01/256
2582              STA    FLMOD2.5+1
2583              LDA    #RHOBRN01 MOD .M
2584              STA    FLMOD2.4
2585              LDA    #RHOBRN01/256
2586              STA    FLMOD2.4+1
2587              LDA    #RHOGRN01 MOD .M
2588              STA    FLMOD2.3
2589              LDA    #RHOGRN01/256
2590              STA    FLMOD2.3+1
2591              LDA    #PHI11101 MOD .M
2592              STA    FLMOD2.2
2593              LDA    #PHI11101/256
2594              STA    FLMOD2.2+1
2595              LDA    #SGAS1101 MOD .M
2596              STA    FLMOD2.1
2597              LDA    #SGAS1101/256
2598              STA    FLMOD2.1+1
2599              JSR    FLMOD2
2600    ; C                                                                        03940000
2601    ; C      BIOT IS A SIMPLE BIOT-GASSMAN EQN ROUTINE WHICH COMPUTES K*.       03950006
2602    ;        CALL BIOT(AA,KKM,KF,PHI,KSTAR)                                     03960006
2603              LDA    #KSTAR101 MOD .M
2604              STA    BIOT.005
2605              LDA    #KSTAR101/256
2606              STA    BIOT.005+1
2607              LDA    #PHI11101 MOD .M
2608              STA    BIOT.004
2609              LDA    #PHI11101/256
2610              STA    BIOT.004+1
2611              LDA    #KF11101 MOD .M
2612              STA    BIOT.003
2613              LDA    #KF11101/256
2614              STA    BIOT.003+1
2615              LDA    #KKM1101 MOD .M
2616              STA    BIOT.002
```

```
2617            LDA     #KKM111101/256
2618            STA     BIOT.002+1
2619            LDA     #AA111101 MOD .M
2620            STA     BIOT.001
2621            LDA     #AA111101/256
2622            STA     BIOT.001+1
2623            JSR     BIOT                                         03970000
2624    ;       R=KSTAR/GSTAR
2625    .MFFDIV SET     1
2626            JSR     .FFDIV
2627            .BYTE   0
2628            .WORD   KSTAR101,GSTAR101
2629            .WORD   R1111101
2630    ;                                                            03980000
2631    .MFFMUL SET     1
2632            JSR     .FFMUL
2633            .BYTE   0
2634            .WORD   .C000253,R1111101
2635            .WORD   .T000081
2636    .MFFMUL SET     1
2637            JSR     .FFMUL
2638            .BYTE   0
2639            .WORD   .C000255,R1111101
2640            .WORD   .T000202
2641    .MFFADD SET     1
2642            JSR     .FFADD
2643            .BYTE   0
2644            .WORD   .T000202,.C000256
2645            .WORD   .T000229
2646    .MFFSUB SET     1
2647            JSR     .FFSUB
2648            .BYTE   0
2649            .WORD   .T000081,.C000254
2650            .WORD   .T000175
2651    .MFFDIV SET     1
2652            JSR     .FFDIV
2653            .BYTE   0
2654            .WORD   .T000175,.T000229
2655            .WORD   SIGSTR01
2656    ;                                                            03990000
2657    .MFFDIV SET     1
2658            JSR     .FFDIV
2659            .BYTE   0
2660            .WORD   .C000257,.C000258
2661            .WORD   .T000081
2662    .MFFADD SET     1
2663            JSR     .FFADD
2664            .BYTE   0
2665            .WORD   R1111101,.T000081
2666            .WORD   FAC11101
2667    ;                                                            04000000
2668    .MFFMUL SET     1
2669            JSR     .FFMUL
2670            .BYTE   0
2671            .WORD   .C000259,GSTAR101
2672            .WORD   .T000081
2673    .MFFDIV SET     1
2674            JSR     .FFDIV
2675            .BYTE   0
2676            .WORD   .T000081,.C000260
2677            .WORD   .T000175
2678    .MFFADD SET     1
2679            JSR     .FFADD
2680            .BYTE   0
2681            .WORD   KSTAR101,.T000175
2682            .WORD   PHAT1101
2683    ;
2684    ; C     COMPUTED P-WAVE AND SHEAR WAVE VELOCITIES,VCP,VCS FOR GIVEN SG.
2685    .MFFMUL SET     1
2686            JSR     .FFMUL
2687            .BYTE   0
2688            .WORD   .C000261,RHOBC101
2689            .WORD   .T000081
2690    .MFFDIV SET     1
2691            JSR     .FFDIV
2692            .BYTE   0
2693            .WORD   PHAT1101,.T000081
2694            .WORD   YY111101
                                                                     04030000
```

```
2695                !
2696                    LDA     #YY111101 MOD .M
2697                    STA     SQRT.001
2698                    LDA     #YY111101/256
2699                    STA     SQRT.001+1
2700                    LDA     #.T000081 MOD .M
2701                    STA     SQRT.000
2702                    LDA     #.T000081/256
2703                    STA     SQRT.000+1
2704                    JSR     SQRT
2705    .MFFMUL     SET     1
2706                    JSR     .FFMUL
2707                    .BYTE   0
2708                    .WORD   .T000081,.C000262
2709                    .WORD   VCP11101
2710                !                                                                    04040000
2711    .MFFMUL     SET     1
2712                    JSR     .FFMUL
2713                    .BYTE   0
2714                    .WORD   .C000263,RHOBC101
2715                    .WORD   .T000081
2716    .MFFDIV     SET     1
2717                    JSR     .FFDIV
2718                    .BYTE   0
2719                    .WORD   GSTAR101,.T000081
2720                    .WORD   VCS11101
2721                !                                                                    04050000
2722                    LDA     #VCS11101 MOD .M
2723                    STA     SQRT.001
2724                    LDA     #VCS11101/256
2725                    STA     SQRT.001+1
2726                    LDA     #.T000081 MOD .M
2727                    STA     SQRT.000
2728                    LDA     #.T000081/256
2729                    STA     SQRT.000+1
2730                    JSR     SQRT
2731    .MFFMUL     SET     1
2732                    JSR     .FFMUL
2733                    .BYTE   0
2734                    .WORD   .T000081,.C000264
2735                    .WORD   VCS11101
2736    !       SGPCT=SGAS*100.                                                          04060006
2737    .MFFMUL     SET     1
2738                    JSR     .FFMUL
2739                    .BYTE   0
2740                    .WORD   SGAS1101,.C000265
2741                    .WORD   SGPCT101
2742    !       SOPCT=SOIL*100.                                                          04070006
2743    .MFFMUL     SET     1
2744                    JSR     .FFMUL
2745                    .BYTE   0
2746                    .WORD   SOIL1101,.C000266
2747                    .WORD   SOPCT101
2748    !       IF(SGAS.EQ.0.0  .AND. SOIL.EQ.0.0)GO TO 175                              04080007
2749    .MFFEQ      SET     1
2750                    JSR     .FFEQ
2751                    .BYTE   0
2752                    .WORD   SOIL1101,.C000268
2753                    STA     .T000005
2754    .MFFEQ      SET     1
2755                    JSR     .FFEQ
2756                    .BYTE   0
2757                    .WORD   SGAS1101,.C000267
2758                    AND     .T000005
2759                    ASL     A
2760                    BCS     *+5
2761                    JMP     .L000269
2762                    JMP     .L000246
2763    .L000269 EQU    *
2764    ! C         WRITE(NOUT,125)SGPCT,SOPCT,VCP,VCS,SIGSTR,RHOBC                      04090026
2765    !    175 CONTINUE                                                                04100000
2766    .L000246 EQU    *
2767                    JMP     .L000242
2768    .L000243 EQU    *
2769    ! C        IF(NSO.GT.1)WRITE(NOUT,90)                                            04110026
2770    ! C     90 FORMAT(/2X,'***'/)                                                    04120043
2771    !    179 CONTINUE                                                                04130012
2772    .L000240 EQU    *
```

```
2773              JMP     .L000236
2774    .L000237 EQU     *
2775    ; C 176  WRITE (6,131)                                              04140006
2776    ; C 131  FORMAT(' ● ● ● ● ● ● ● ● ● ● ● ● ● ● ● ● ● ● ● ● ● ●' //)   04150049
2777    ;    200 CONTINUE                                                   04160000
2778    .L000194 EQU     *
2779             JMP     .L000190
2780    .L000191 EQU     *
2781    ;        GO TO 1                                                    04170000
2782             JMP     .L000040
2783    ;        END                                                        04180000
2784    .R000001 RTS
2785    ;        SUBROUTINE KGKA(PSTAR,KM,GM,KF,CO,POR,A,B,G,TOL)            04190000
2786    KGKA     EQU     *
2787    PSTAR102 EQU     KGKA.001
2788    KM111102 EQU     KGKA.002
2789    GM111102 EQU     KGKA.003
2790    KF111102 EQU     KGKA.004
2791    CO111102 EQU     KGKA.005
2792    POR11102 EQU     KGKA.006
2793    A111102  EQU     KGKA.007
2794    B111102  EQU     KGKA.008
2795    G111102  EQU     KGKA.009
2796    TOL11102 EQU     KGKA.010
2797    ; C      R.J.RUNGE               COFRC.                             04200000
2798    ; C      CALCULATES A,B,G SUCH THAT ABS(Q)< TOL, I.E Q=0 USING       04210000
2799    ; C      HALVING SEARCH (THOMPSON,D.D. & BROWN,R.J.S.                04220000
2800    ; C      COFRC                                                      04230034
2801    ; C      SANDSTONE CASE ONLY, LTM=1.                                04240026
2802    ; C      *                                                          04250000
2803    ;        IMPLICIT REAL (K)                                          04260000
2804    ;        ALPHAU=(3.0*PSTAR)/(4.0*GM)                                04270000
2805    .MFFMUL  SET     1
2806             JSR     .FFMUL
2807             .BYTE   0
2808             .WORD   .C000273,-GM111102
2809             .WORD   .T000274
2810    .MFFMUL  SET     1
2811             JSR     .FFMUL
2812             .BYTE   0
2813             .WORD   .C000271,-PSTAR102
2814             .WORD   .T000272
2815    .MFFDIV  SET     1
2816             JSR     .FFDIV
2817             .BYTE   0
2818             .WORD   .T000272,.T000274
2819             .WORD   ALPHA002
2820    ;                                                                   04280000
2821    .MFFMUL  SET     1
2822             JSR     .FFMUL
2823             .BYTE   0
2824             .WORD   .C000280,-GM111102
2825             .WORD   .T000274
2826    .MFFMUL  SET     1
2827             JSR     .FFMUL
2828             .BYTE   0
2829             .WORD   .C000279,-KM111102
2830             .WORD   .T000272
2831    .MFFDIV  SET     1
2832             JSR     .FFDIV
2833             .BYTE   0
2834             .WORD   .T000272,.T000274
2835             .WORD   BETAU102
2836    ;                                                                   04290000
2837    ; C      BEGIN HALVING SEARCH FOR A                                 04300000
2838    .MFFDIV  SET     1
2839             JSR     .FFDIV
2840             .BYTE   0
2841             .WORD   -KM111102,-KF111102
2842             .WORD   .T000272
2843    .MFFSUB  SET     1
2844             JSR     .FFSUB
2845             .BYTE   0
2846             .WORD   .T000272,.C000281
2847             .WORD   F0111102
2848    ;                                                                   04310000
2849    .MFLTASG SET     1
2850             JSR     .FLTASGN
```

```
2851            .BYTE  0
2852            .WORD  .C000282
2853            .WORD  ALOW1102
2854    ;       AHIGH=1.0                                               04320000
2855    .MFLTASG SET   1
2856            JSR    .FLTASGN
2857            .BYTE  0
2858            .WORD  .C000283
2859            .WORD  AHIGH102
2860    ;                                                               04330000
2861    .MFLTASG SET   1
2862            JSR    .FLTASGN
2863            .BYTE  0
2864            .WORD  .C000284
2865            .WORD  -A1111102
2866    ;       CALL CALCQ(QLOW,ALOW,B,G,CO,FO,POR,ALPHAO,BETAO)        04340000
2867            LDA    #BETAO102 MOD .M
2868            STA    CALCQ.09
2869            LDA    #BETAO102/256
2870            STA    CALCQ.09+1
2871            LDA    #ALPHAO02 MOD .M
2872            STA    CALCQ.08
2873            LDA    #ALPHAO02/256
2874            STA    CALCQ.08+1
2875            LDA    POR11102
2876            STA    CALCQ.07
2877            LDA    POR11102+1
2878            STA    CALCQ.07+1
2879            LDA    #FO111102 MOD .M
2880            STA    CALCQ.06
2881            LDA    #FO111102/256
2882            STA    CALCQ.06+1
2883            LDA    CO111102
2884            STA    CALCQ.05
2885            LDA    CO111102+1
2886            STA    CALCQ.05+1
2887            LDA    G1111102
2888            STA    CALCQ.04
2889            LDA    G1111102+1
2890            STA    CALCQ.04+1
2891            LDA    B1111102
2892            STA    CALCQ.03
2893            LDA    B1111102+1
2894            STA    CALCQ.03+1
2895            LDA    #ALOW1102 MOD .M
2896            STA    CALCQ.02
2897            LDA    #ALOW1102/256
2898            STA    CALCQ.02+1
2899            LDA    #QLOW1102 MOD .M
2900            STA    CALCQ.01
2901            LDA    #QLOW1102/256
2902            STA    CALCQ.01+1
2903            JSR    CALCQ
2904    ;       CALL CALCQ(QHIGH,AHIGH,B,G,CO,FO,POR,ALPHAO,BETAO)      04350000
2905            LDA    #BETAO102 MOD .M
2906            STA    CALCQ.09
2907            LDA    #BETAO102/256
2908            STA    CALCQ.09+1
2909            LDA    #ALPHAO02 MOD .M
2910            STA    CALCQ.08
2911            LDA    #ALPHAO02/256
2912            STA    CALCQ.08+1
2913            LDA    POR11102
2914            STA    CALCQ.07
2915            LDA    POR11102+1
2916            STA    CALCQ.07+1
2917            LDA    #FO111102 MOD .M
2918            STA    CALCQ.06
2919            LDA    #FO111102/256
2920            STA    CALCQ.06+1
2921            LDA    CO111102
2922            STA    CALCQ.05
2923            LDA    CO111102+1
2924            STA    CALCQ.05+1
2925            LDA    G1111102
2926            STA    CALCQ.04
2927            LDA    G1111102+1
2928            STA    CALCQ.04+1
2929            LDA    B1111102
```

```
2930            STA     CALCQ.03
2931            LDA     B111102+1
2932            STA     CALCQ.03+1
2933            LDA     #AHIGH102 MOD .M
2934            STA     CALCQ.02
2935            LDA     #AHIGH102/256
2936            STA     CALCQ.02+1
2937            LDA     #QHIGH102 MOD .M
2938            STA     CALCQ.01
2939            LDA     #QHIGH102/256
2940            STA     CALCQ.01+1
2941            JSR     CALCQ
2942    ;       IF(QLOW.LT.0.0 .AND. QHIGH.GT.0.0)GO TO 10                  04360000
2943    .MFFGT  SET     1
2944            JSR     .FFGT
2945            .BYTE   0
2946            .WORD   QHIGH102,.C000286
2947            STA     .T000274
2948    .MFFLT  SET     1
2949            JSR     .FFLT
2950            .BYTE   0
2951            .WORD   QLOW1102,.C000285
2952            AND     .T000274
2953            ASL     A
2954            BCS     *+5
2955            JMP     .L000287
2956            JMP     .L000288
2957    .L000287 EQU    *
2958    ;       IF(QHIGH.LT.0.0 .AND. QLOW.GT.0.0)GO TO 15                  04370000
2959    .MFFGT  SET     1
2960            JSR     .FFGT
2961            .BYTE   0
2962            .WORD   QLOW1102,.C000290
2963            STA     .T000274
2964    .MFFLT  SET     1
2965            JSR     .FFLT
2966            .BYTE   0
2967            .WORD   QHIGH102,.C000289
2968            AND     .T000274
2969            ASL     A
2970            BCS     *+5
2971            JMP     .L000291
2972            JMP     .L000292
2973    .L000291 EQU    *
2974    ;                                                                    04380000
2975    .MFUNMIN SET    1
2976            JSR     .FUNMIN
2977            .BYTE   0
2978            .WORD   .C000293
2979            .WORD   -A111102
2980    ;       GO TO 20                                                    04390000
2981            JMP     .L000294
2982    ;    10 CALL CALCQ(Q,A,B,G,CO,FO,POR,ALPHAO,BETAO)                  04400000
2983    .L000288 EQU    *
2984            LDA     #BETAO102 MOD .M
2985            STA     CALCQ.09
2986            LDA     #BETAO102/256
2987            STA     CALCQ.09+1
2988            LDA     #ALPHAO02 MOD .M
2989            STA     CALCQ.08
2990            LDA     #ALPHAO02/256
2991            STA     CALCQ.08+1
2992            LDA     POR11102
2993            STA     CALCQ.07
2994            LDA     POR11102+1
2995            STA     CALCQ.07+1
2996            LDA     #FO111102 MOD .M
2997            STA     CALCQ.06
2998            LDA     #FO111102/256
2999            STA     CALCQ.06+1
3000            LDA     CO111102
3001            STA     CALCQ.05
3002            LDA     CO111102+1
3003            STA     CALCQ.05+1
3004            LDA     G111102
3005            STA     CALCQ.04
3006            LDA     G111102+1
3007            STA     CALCQ.04+1
3008            LDA     B111102
3009            STA     CALCQ.03
```

```
3010            LDA     BIIIII02+1
3011            STA     CALCQ.03+1
3012            LDA     AIIIII02
3013            STA     CALCQ.02
3014            LDA     AIIIII02+1
3015            STA     CALCQ.02+1
3016            LDA     #01111102 MOD .M
3017            STA     CALCQ.01
3018            LDA     #01111102/256
3019            STA     CALCQ.01+1
3020            JSR     CALCQ
3021    ;       V=ABS(Q)                                            04410000
3022            LDA     #01111102 MOD .M
3023            STA     ABS.0001
3024            LDA     #01111102/256
3025            STA     ABS.0001+1
3026            LDA     #.T000272 MOD .M
3027            STA     ABS.0000
3028            LDA     #.T000272/256
3029            STA     ABS.0000+1
3030            JSR     ABS
3031    .MFLTASG SET    1
3032            JSR     .FLTASGN
3033            .BYTE   0
3034            .WORD   .T000272
3035            .WORD   VIIIII02
3036    ;       IF(V.LE.TOL)GO TO 20                                04420000
3037    .MFFLE  SET     1
3038            JSR     .FFLE
3039            .BYTE   0
3040            .WORD   VIIIII02,-TOLIII02
3041            ASL     A
3042            BCS     *+5
3043            JMP     .L000295
3044            JMP     .L000294
3045    .L000295 EQU    *
3046    ;                                                           04430000
3047    .MFFGT  SET     1
3048            JSR     .FFGT
3049            .BYTE   0
3050            .WORD   UIIIII02,.C000296
3051            ASL     A
3052            BCS     *+5
3053            JMP     .L000297
3054    .MFLTASG SET    1
3055            JSR     .FLTASGN
3056            .BYTE   0
3057            .WORD   -AIIIII02
3058            .WORD   AHIGHI02
3059    .L000297 EQU    *
3060    ;                                                           04440000
3061    .MFFLT  SET     1
3062            JSR     .FFLT
3063            .BYTE   0
3064            .WORD   UIIIII02,.C000298
3065            ASL     A
3066            BCS     *+5
3067            JMP     .L000299
3068    .MFLTASG SET    1
3069            JSR     .FLTASGN
3070            .BYTE   0
3071            .WORD   -AIIIII02
3072            .WORD   ALOWI102
3073    .L000299 EQU    *
3074    ;                                                           04450000
3075    .MFFADD SET     1
3076            JSR     .FFADD
3077            .BYTE   0
3078            .WORD   AHIGHI02,ALOWII02
3079            .WORD   .T000272
3080    .MFFDIV SET     1
3081            JSR     .FFDIV
3082            .BYTE   0
3083            .WORD   .T000272,.C000300
3084            .WORD   -AIIIII02
3085    ;                                                           04460000
3086    .MFFSUB SET     1
3087            JSR     .FFSUB
3088            .BYTE   0
```

```
3089              .WORD  AHIGH102,ALOW1102
3090              .WORD  R1111102
3091       ;                                                              04470000
3092              LDA    #R1111102 MOD .M
3093              STA    ABS.0001
3094              LDA    #R1111102/256
3095              STA    ABS.0001+1
3096              LDA    #.T000272 MOD .M
3097              STA    ABS.0000
3098              LDA    #.T000272/256
3099              STA    ABS.0000+1
3100              JSR    ABS
3101       .MFLTASG SET  1
3102              JSR    .FLTASGN
3103              .BYTE  0
3104              .WORD  .T000272
3105              .WORD  R1111102
3106       ;                                                              04480000
3107       .MFFDIV SET   1
3108              JSR    .FFDIV
3109              .BYTE  0
3110              .WORD  R1111102,-A1111102
3111              .WORD  R1111102
3112       ;   IF(R.LT.0.001)GO TO 20                                      04490000
3113       .MFFLT SET    1
3114              JSR    .FFLT
3115              .BYTE  0
3116              .WORD  R1111102,.C000301
3117              ASL    A
3118              BCS    *+5
3119              JMP    .L000302
3120              JMP    .L000294
3121       .L000302 EQU *
3122       ;      GO TO 10
3123              JMP    .L000288                                         04500000
3124       ;   15 CALL CALCQ(Q,A,B,G,CO,FO,POR,ALPHA0,BETA0)               04510000
3125       .L000292 EQU *
3126              LDA    #BETA0102 MOD .M
3127              STA    CALCQ.09
3128              LDA    #BETA0102/256
3129              STA    CALCQ.09+1
3130              LDA    #ALPHA0002 MOD .M
3131              STA    CALCQ.08
3132              LDA    #ALPHA0002/256
3133              STA    CALCQ.08+1
3134              LDA    POR11102
3135              STA    CALCQ.07
3136              LDA    POR11102+1
3137              STA    CALCQ.07+1
3138              LDA    #FO111102 MOD .M
3139              STA    CALCQ.06
3140              LDA    #FO111102/256
3141              STA    CALCQ.06+1
3142              LDA    CO111102
3143              STA    CALCQ.05
3144              LDA    CO111102+1
3145              STA    CALCQ.05+1
3146              LDA    G1111102
3147              STA    CALCQ.04
3148              LDA    G1111102+1
3149              STA    CALCQ.04+1
3150              LDA    B1111102
3151              STA    CALCQ.03
3152              LDA    B1111102+1
3153              STA    CALCQ.03+1
3154              LDA    A1111102
3155              STA    CALCQ.02
3156              LDA    A1111102+1
3157              STA    CALCQ.02+1
3158              LDA    #Q1111102 MOD .M
3159              STA    CALCQ.01
3160              LDA    #Q1111102/256
3161              STA    CALCQ.01+1
3162              JSR    CALCQ
3163       ;   V=ABS(Q)                                                    04520000
3164              LDA    #Q1111102 MOD .M
3165              STA    ABS.0001
3166              LDA    #Q1111102/256
3167              STA    ABS.0001+1
3168              LDA    #.T000272 MOD .M
3169              STA    ABS.0000
```

```
3170            LDA     #.T000272/256
3171            STA     ABS,0000+1
3172            JSR     ABS
3173    .MFLTASG SET    1
3174            JSR     .FLTASGN
3175            .BYTE   0
3176            .WORD   .T000272
3177            .WORD   VIIII102
3178    ;       IF(V.LE.TOL)GO TO 20                                04530000
3179    .MFFLE  SET     1
3180            JSR     .FFLE
3181            .BYTE   0
3182            .WORD   VIIII102,-TOLIII02
3183            ASL     A
3184            BCS     *+5
3185            JMP     .L000303
3186            JMP     .L000294
3187    .L000303 EQU    *
3188    ;                                                           04540000
3189    .MFFGT  SET     1
3190            JSR     .FFGT
3191            .BYTE   0
3192            .WORD   QIIII102,.C000304
3193            ASL     A
3194            BCS     *+5
3195            JMP     .L000305
3196    .MFLTASG SET    1
3197            JSR     .FLTASGN
3198            .BYTE   0
3199            .WORD   -AIIII102
3200            .WORD   ALOWII02
3201    .L000305 EQU    *
3202    ;                                                           04550000
3203    .MFFLT  SET     1
3204            JSR     .FFLT
3205            .BYTE   0
3206            .WORD   QIIII102,.C000306
3207            ASL     A
3208            BCS     *+5
3209            JMP     .L000307
3210    .MFLTASG SET    1
3211            JSR     .FLTASGN
3212            .BYTE   0
3213            .WORD   -AIIII102
3214            .WORD   AHIGH102
3215    .L000307 EQU    *
3216    ;                                                           04560000
3217    .MFFADD SET     1
3218            JSR     .FFADD
3219            .BYTE   0
3220            .WORD   AHIGH102,ALOWII02
3221            .WORD   .T000272
3222    .MFFDIV SET     1
3223            JSR     .FFDIV
3224            .BYTE   0
3225            .WORD   .T000272,.C000308
3226            .WORD   -AIIII102
3227    ;                                                           04570000
3228    .MFFSUB SET     1
3229            JSR     .FFSUB
3230            .BYTE   0
3231            .WORD   AHIGH102,ALOWII02
3232            .WORD   RIIII102
3233    ;
3234            LDA     #RIIII102 MOD .M                            04580000
3235            STA     ABS,0001
3236            LDA     #RIIII102/256
3237            STA     ABS,0001+1
3238            LDA     #.T000272 MOD .M
3239            STA     ABS,0000
3240            LDA     #.T000272/256
3241            STA     ABS,0000+1
3242            JSR     ABS
3243    .MFLTASG SET    1
3244            JSR     .FLTASGN
3245            .BYTE   0
3246            .WORD   .T000272
3247            .WORD   RIIII102
3248    ;
3249    .MFFDIV SET     1                                           04590000
```

```
3250            JSR     .FFDIV
3251            .BYTE   0
3252            .WORD   R111I102,-A111I102
3253            .WORD   R111I102
3254    ;       IF(R.LE.0.001)GO TO 20                                04600000
3255    .MFFLE  SET     1
3256            JSR     .FFLE
3257            .BYTE   0
3258            .WORD   R111I102,.C000309
3259            ASL     A
3260            BCS     *+5
3261            JMP     .L000310
3262            JMP     .L000294
3263    .L000310 EQU    *
3264    ;       GO TO 15                                              04610000
3265            JMP     .L000292
3266    ; C     END HALVING SEARCH                                    04620000
3267    ;    20 RETURN                                                04630000
3268    .L000294 EQU    *
3269            JMP     .R000270
3270    ; C     *                                                     04640000
3271    ;       END                                                   04650000
3272    .R000270 RTS
3273    ;       SUBROUTINE CALCQ(Q,A,B,G,CO,FO,POR,ALPHAO,BETAO)      04660000
3274    CALCQ   EQU     *
3275    Q111I103 EQU    CALCQ.01
3276    A111I103 EQU    CALCQ.02
3277    B111I103 EQU    CALCQ.03
3278    G111I103 EQU    CALCQ.04
3279    CO111I103 EQU   CALCQ.05
3280    FO111I103 EQU   CALCQ.06
3281    POR111I103 EQU  CALCQ.07
3282    ALPHAO003 EQU   CALCQ.08
3283    BETAO103 EQU    CALCQ.09
3284    ; C     R.J.RUNGE               COFRC
3285    ; C                     CALCULATES   Q(A)=LEFT SIDE OF Q=0 IN
3286    ; C     SUBROUTINE KGKA FOR A GIVEN A (HALVING SEARCH), ALSO, B,G, CALC
3287    ; C     SANDSTONE CASE ONLY, LTH=1.
3288    ; C     *
3289    ; C     BIOT GASSMAN EQUATION
3290    ;
3291    .MFFMUL SET     1                                             04730000
3292            JSR     .FFMUL
3293            .BYTE   0
3294            .WORD   -FO111I103,-POR111I103
3295            .WORD   .T000315
3296    .MFFADD SET     1
3297            JSR     .FFADD
3298            .BYTE   0
3299            .WORD   .T000315,.C000316
3300            .WORD   .T000320
3301    ;
3302    .MFFSUB SET     1                                             04740000
3303            JSR     .FFSUB
3304            .BYTE   0
3305            .WORD   .T000320,-A111I103
3306            .WORD   .T000315
3307    .MFFDIV SET     1
3308            JSR     .FFDIV
3309            .BYTE   0
3310            .WORD   .C000314,.T000315
3311            .WORD   .T000320
3312    .MFFSUB SET     1
3313            JSR     .FFSUB
3314            .BYTE   0
3315            .WORD   .C000312,-A111I103
3316            .WORD   .T000313
3317    .MFFADD SET     1
3318            JSR     .FFADD
3319            .BYTE   0
3320            .WORD   .T000313,.T000320
3321            .WORD   -A111I103
3322    ;
3323    .MFFMUL SET     1                                             04750000
3324            JSR     .FFMUL
3325            .BYTE   0
3326            .WORD   -BETAO103,-B111I103
3327            .WORD   .T000313
3328    .MFFSUB SET     1
3329            JSR     .FFSUB
```

```
3330              .BYTE 0
3331              .WORD -ALPHA003,.T000313
3332              .WORD -G1111103
3333     ;                                                                04760000
3334     .MFFSUB  SET   1
3335              JSR   .FFSUB
3336              .BYTE 0
3337              .WORD -A1111103,-G1111103
3338              .WORD X1111103
3339     ;                                                                04770000
3340     ;                                                                04780000
3341     .MFFADD  SET   1
3342              JSR   .FFADD
3343              .BYTE 0
3344              .WORD -A1111103,-G1111103
3345              .WORD Y1111103
3346     ;                                                                04790000
3347     .MFFSUB  SET   1
3348              JSR   .FFSUB
3349              .BYTE 0
3350              .WORD Y1111103,.C000322
3351              .WORD .T000313
3352     .MFFSUB  SET   1
3353              JSR   .FFSUB
3354              .BYTE 0
3355              .WORD .T000313,.C000323
3356              .WORD .T000315
3357     .MFFMUL  SET   1
3358              JSR   .FFMUL
3359              .BYTE 0
3360              .WORD .C000321,.T000315
3361              .WORD .T000313
3362     .MFFSUB  SET   1
3363              JSR   .FFSUB
3364              .BYTE 0
3365              .WORD -C0111103,.T000313
3366              .WORD X1111103
3367     ;        RETURN
3368              JMP   .R000311
3369     ; C      *
3370     ;        END
3371     .R000311 RTS
3372     ;        SUBROUTINE FLMOD3(SG,PHI,RHOGRN,RHOBRN,KBRINE,RHOGAS,KGAS,KF,RO
3373     FLMOD3   EQU   *
3374     SG111104  EQU  FLMOD2.1
3375     PHI11104  EQU  FLMOD2.2
3376     RHOGRN04  EQU  FLMOD2.3
3377     RHOBRN04  EQU  FLMOD2.4
3378     KBRINE04  EQU  FLMOD2.5
3379     RHOGAS04  EQU  FLMOD2.6
3380     KGAS1104  EQU  FLMOD2.7
3381     KF111104  EQU  FLMOD2.8
3382     ;        *,SO,KOIL,RHOOIL)                                        04840044
3383     RHOB1104  EQU  FLMOD2.9
3384     SO111104  EQU  FLMOD2.10
3385     KOIL1104  EQU  FLMOD2.11
3386     RHOOIL04  EQU  FLMOD2.12
3387     ; C      R.J. RUNGE              COFRC.
3388     ; C      COMPUTES KF=FLUID MIX BULK MODULUS AND
3389     ; C      RHOB=BULK DENSITY.
3390     ; C
3391     ; C      SG=FRACTIONAL GAS SATURATION, PHI=FRACTIONAL POROSITY OF ROCK
3392     ; C      DENSITIES IN GM/CM**3,BULK MODULI IN KILOBARS
3393     ; C      RHOGRN=GRAIN DENSITY(E.G. 2.68),RHOBRN=LIQUID(BRINE OR OIL) DEN
3394     ; C      (RHOBRN=1.05 GULF COAST), KBRINE=LIQUID(BRINE)MODULUS=25.0 FOR
3395     ; C      A-BRINE, KOIL=OIL BULK MODULUS(KB,) RHOOIL=OIL BULK DENSITY
3396     ; C
3397     ; C
3398     ;        IMPLICIT REAL (K)
3399     ;        SH=SG+SO
3400     .MFFADD  SET   1
3401              JSR   .FFADD
3402              .BYTE 0
3403              .WORD -SG111104,-SO111104
3404              .WORD SH111104
3405     ;        IF(SG.EQ.1.0)KLIQ=0.0                                    04980018
3406     .MFFEQ   SET   1
3407              JSR   .FFEQ
3408              .BYTE 0
3409              .WORD -SG111104,.C000328
```

```
3410              ASL      A
3411              BCS      *+5
3412              JMP      .L000329
3413    .MFLTASG  SET      1
3414              JSR      .FLTASGN
3415              .BYTE    0
3416              .WORD    .C000330
3417              .WORD    KLIQ1104
3418    .L000329  EQU      *
3419    ;         IF(SG.EQ.1.0)GO TO 5                                04990018
3420    .MFFEQ    SET      1
3421              JSR      .FFEQ
3422              .BYTE    0
3423              .WORD    -SG111104,.C000331
3424              ASL      A
3425              BCS      *+5
3426              JMP      .L000332
3427              JMP      .L000333
3428    .L000332  EQU      *
3429    ;                                                            05000009
3430    .MFFSUB   SET      1
3431              JSR      .FFSUB
3432              .BYTE    0
3433              .WORD    .C000334,SH111104
3434              .WORD    .T000325
3435    .MFFDIV   SET      1
3436              JSR      .FFDIV
3437              .BYTE    0
3438              .WORD    .T000325,-KBRINE04
3439              .WORD    KLIQ1104
3440    ;                                                            05010008
3441    .MFFDIV   SET      1
3442              JSR      .FFDIV
3443              .BYTE    0
3444              .WORD    -SO111104,-KOIL1104
3445              .WORD    .T000325
3446    .MFFADD   SET      1
3447              JSR      .FFADD
3448              .BYTE    0
3449              .WORD    KLIQ1104,.T000325
3450              .WORD    KLIQ1104
3451    ;                                                            05020008
3452    .MFFDIV   SET      1
3453              JSR      .FFDIV
3454              .BYTE    0
3455              .WORD    .C000337,KLIQ1104
3456              .WORD    KLIQ1104
3457    ;                                                            05030008
3458    .MFFEQ    SET      1
3459              JSR      .FFEQ
3460              .BYTE    0
3461              .WORD    -SG111104,.C000338
3462              ASL      A
3463              BCS      *+5
3464              JMP      .L000339
3465    .MFLTASG  SET      1
3466              JSR      .FLTASGN
3467              .BYTE    0
3468              .WORD    KLIQ1104
3469              .WORD    -KF111104
3470    .L000339  EQU      *
3471    ;         IF(SG.EQ.0.0)GO TO 10                               05040000
3472    .MFFEQ    SET      1
3473              JSR      .FFEQ
3474              .BYTE    0
3475              .WORD    -SG111104,.C000340
3476              ASL      A
3477              BCS      *+5
3478              JMP      .L000341
3479              JMP      .L000342
3480    .L000341  EQU      *
3481    ;                                                            05050000
3482    ;                                                            05060018
3483    .L000333  EQU      *
3484    .MFFSUB   SET      1
3485              JSR      .FFSUB
3486              .BYTE    0
3487              .WORD    .C000343,SH111104
3488              .WORD    .T000336
```

```
3489        .MFFDIV   SET     1
3490                  JSR     .FFDIV
3491                  .BYTE   0
3492                  .WORD   .T000336,-KBRINE04
3493                  .WORD   .T000344
3494        .MFFDIV   SET     1
3495                  JSR     .FFDIV
3496                  .BYTE   0
3497                  .WORD   -SG111104,-KGAS1104
3498                  .WORD   .T000325
3499        .MFFDIV   SET     1
3500                  JSR     .FFDIV
3501                  .BYTE   0
3502                  .WORD   -SO111104,-KOIL1104
3503                  .WORD   .T000345
3504        .MFFADD   SET     1
3505                  JSR     .FFADD
3506                  .BYTE   0
3507                  .WORD   .T000325,.T000344
3508                  .WORD   .T000336
3509        .MFFADD   SET     1
3510                  JSR     .FFADD
3511                  .BYTE   0
3512                  .WORD   .T000336,.T000345
3513                  .WORD   U111104
3514        ;
3515        .MFFDIV   SET     1
3516                  JSR     .FFDIV
3517                  .BYTE   0
3518                  .WORD   .C000346,U111104
3519                  .WORD   -KF111104
3520        ;
3521        .L000342  EQU     *
3522        .MFFSUB   SET     1
3523                  JSR     .FFSUB
3524                  .BYTE   0
3525                  .WORD   .C000347,-PH111104
3526                  .WORD   .T000325
3527        .MFFMUL   SET     1
3528                  JSR     .FFMUL
3529                  .BYTE   0
3530                  .WORD   -SO111104,-KHOOIL04
3531                  .WORD   .T000345
3532        .MFFMUL   SET     1
3533                  JSR     .FFMUL
3534                  .BYTE   0
3535                  .WORD   -SG111104,-RHOGAS04
3536                  .WORD   .T000344
3537        .MFFSUB   SET     1
3538                  JSR     .FFSUB
3539                  .BYTE   0
3540                  .WORD   .C000349,SH111104
3541                  .WORD   .T000350
3542        .MFFMUL   SET     1
3543                  JSR     .FFMUL
3544                  .BYTE   0
3545                  .WORD   .T000350,-RHOBRN04
3546                  .WORD   .T000351
3547        .MFFADD   SET     1
3548                  JSR     .FFADD
3549                  .BYTE   0
3550                  .WORD   .T000344,.T000345
3551                  .WORD   .T000348
3552        .MFFADD   SET     1
3553                  JSR     .FFADD
3554                  .BYTE   0
3555                  .WORD   .T000348,.T000351
3556                  .WORD   .T000344
3557        .MFFMUL   SET     1
3558                  JSR     .FFMUL
3559                  .BYTE   0
3560                  .WORD   -PH111104,.T000344
3561                  .WORD   .T000345
3562        .MFFMUL   SET     1
3563                  JSR     .FFMUL
3564                  .BYTE   0
3565                  .WORD   .T000325,-RHOGRN04
3566                  .WORD   .T000336
3567        .MFFADD   SET     1
3568                  JSR     .FFADD
```

05070000

```
3573              JMP     .R000324                                          05100000
3574      ;       END
3575     .R000324 RTS                                                       05110010
3576      ;       SUBROUTINE BIOT(AA,KM,KF,PHI,KSTAR)
3577     BIOT     EQU     *
3578     AA111105 EQU     BIOT.001
3579     KM111105 EQU     BIOT.002
3580     KF111105 EQU     BIOT.003
3581     PHI11105 EQU     BIOT.004
3582     KSTAR105 EQU     BIOT.005
3583      ; C    R.J. RUNGE   COFRC                                          05120000
3584      ; C    CALCULATES KSTAR FROM BIOT GASSMAN EQN. GIVEN AA=KA/KM,KM,   05130000
3585      ; C    KF=TOTAL FLUID MODULUS(INCL.GAS+LIQUID),FRACT. POROSITY=PHI. 05140000
3586      ; C                                                                05150000
3587      ; C    *                                                           05160000
3588      ;      IMPLICIT REAL(K)                                            05170000
3589      ;                                                                  05180000
3590     .MFFDIV  SET     1
3591              JSR     .FFDIV
3592              .BYTE   0
3593              .WORD   -KM111105,-KF111105
3594              .WORD   .T000353
3595     .MFFSUB  SET     1
3596              JSR     .FFSUB
3597              .BYTE   0
3598              .WORD   .T000353,.C000354
3599              .WORD   F0111105
3600      ;                                                                  05190000
3601     .MFFMUL  SET     1
3602              JSR     .FFMUL
3603              .BYTE   0
3604              .WORD   F0111105,-PHI11105
3605              .WORD   .T000358
3606     .MFFSUB  SET     1
3607              JSR     .FFSUB
3608              .BYTE   0
3609              .WORD   .T000358,-AA111105
3610              .WORD   .T000361
3611     .MFFADD  SET     1
3612              JSR     .FFADD
3613              .BYTE   0
3614              .WORD   .T000361,.C000362
3615              .WORD   .T000358
3616     .MFFDIV  SET     1
3617              JSR     .FFDIV
3618              .BYTE   0
3619              .WORD   .C000360,.T000358
3620              .WORD   .T000361
3621     .MFFSUB  SET     1
3622              JSR     .FFSUB
3623              .BYTE   0
3624              .WORD   .C000359,-AA111105
3625              .WORD   .T000353
3626     .MFFADD  SET     1
3627              JSR     .FFADD
3628              .BYTE   0
3629              .WORD   .T000353,.T000361
3630              .WORD   -AA111105
3631      ;                                                                  05200000
3632     .MFFMUL  SET     1
3633              JSR     .FFMUL
3634              .BYTE   0
3635              .WORD   BB111105,-KM111105
3636              .WORD   -KSTAR105
3637      ;      RETURN                                                      05210000
3638              JMP     .R000352
3639      ; C    *                                                           05220000
3640      ;      END                                                         05230000
3641     .R000352 RTS
3642      ;      SUBROUTINE NAME2(TITLE,NLINE,NC,NIN,NOUT)                   05240029
3643     NAME2    EQU     *
3644     TITLE106 EQU     NAME2.01
3645     NLINE106 EQU     NAME2.02
3646     NC111106 EQU     NAME2.03
3647     NIN111106 EQU    NAME2.04
3648     NOUT1106 EQU     NAME2.05
3649      ; C    *                                                           05250000
```

```
3650    ; C     R.J. RUNGE      COFRC           (MODIFICATION OF 'NAME')     05260028
3651    ; C     FBIDIC STORED IN TITLE (M) M=20*NLINE                        05270000
3652    ; C     READS IN 80 COL. HEADINGS (20A4) NLINE CARDS IN NUMBER.      05280028
3653    ; C     SEE BELOW IF NC < 0.                                         05290028
3654    ;       DIMENSION TITLE(1)                                           05300000
3655    ;       M=20*NLINE                                                   05310000
3656    ; C     NIN=INPUT UNIT, USUALLY=5.                                   05320028
3657    ; C     NOUT=OUTPUT UNIT,USUALLY=6.                                  05330029
3658    ; C     READ(NIN,3,END=15)(TITLE(J),J=1,M)                           05340027
3659    ; C   3 FORMAT(20A4)                                                 05350000
3660    .MIMUL  SET    1
3661            JSR    .IMUL
3662            .BYTE  6
3663            .WORD  .C000364,-NLINE106
3664            .WORD  M111106
3665    ;       IF(NC.LT.0)GO TO 75                                          05360000
3666            LDY    #1
3667            LDA    (NC111106),Y
3668            CMP    #0
3669            LDA    (NC111106)
3670            SBC    #0
3671            BMI    .L000369
3672            JMP    .L000366
3673    .L000369 EQU   *
3674            JMP    .L000370
3675    .L000368 EQU   *
3676    ; C     WRITE (NOUT,1)                                               05370029
3677    ; C   1 FORMAT(1H1 ///)                                              05380000
3678    ; C     WRITE (NOUT,2)                                               05390029
3679    ; C   2 FORMAT('           CHEVRON OIL FIELD RESEARCH CO.  LA HABRA, 05400000
3680    ; C     * CALIFORNIA    90631       ' /////)                         05410000
3681    ; C  75 WRITE (NOUT,4)(TITLE(J),J=1,M)                               05420029
3682    ; C   4 FORMAT(1H 20A4)                                              05430000
3683    ; C     WRITE (NOUT,9)                                               05440029
3684    ; C   9 FORMAT(///' * * '//)                                         05450000
3685    ;    10 RETURN                                                       05460000
3686    .L000371 EQU  *
3687            JMP    .R000363
3688    ; C  15 WRITE(NOUT,16)                                               05470026
3689    ; C  16 FORMAT(///' * * * END OF PROBLEMS * * * ' ////)              05480000
3690    ;       STOP                                                         05490000
3691    .MSTOP  SET    1
3692            JSR    .STOP
3693            .DBYTE 0
3694    ;       END                                                          05500000
3695    .R000363 RTS
3696    ;       SUBROUTINE LIDOS(NP,DGRAD,LITH,Z,PSTAR,KM,GM,KF,PHI,A,B,G )   05510031
3697    LIDOS   EQU    *
3698    NP111107   EQU  LIDOS.01
3699    DGRAD107   EQU  LIDOS.02
3700    LITH1107   EQU  LIDOS.03
3701    Z111107    EQU  LIDOS.04
3702    PSTAR107   EQU  LIDOS.05
3703    KM111107   EQU  LIDOS.06
3704    GM111107   EQU  LIDOS.07
3705    KF111107   EQU  LIDOS.08
3706    PHI11107   EQU  LIDOS.09
3707    A111107    EQU  LIDOS.10
3708    B111107    EQU  LIDOS.11
3709    G111107    EQU  LIDOS.12
3710    ; C                                                                  05520001
3711    ; C     R.J.RUNGE           COFRC.                                   05530028
3712    ; C     COMPUTES A,B,G FOR LIMESTONE AND DOLOSTONE LITHOLOGIES.      05540001
3713    ; C     SEE RUNGE,R.J &THOMPSON,D.D TECH MEMO TM74000629             05550001
3714    ; C     NP=NO. OF PRESSURES=6                                        05560001
3715    ; C     DGRAD=DIFFERENTIAL PRESSURE GRADIENT (KPSI/KFT)              05570001
3716    ; C     LITH=2 (LIMESTONES)  LITH=3(DOLOSTONES)                      05580001
3717    ; C     Z=DEPTH IN KILOFT.                                           05590001
3718    ; C     PSTAR=P*=P-WAVE MODULUS.                                     05600001
3719    ; C     KM,GM=SOLID MATRIX MODULI (KB.)                              05610001
3720    ; C     KF=FLUID MODULUS                                             05620001
3721    ; C     PHI=POROSITY (FRACTION)                                      05630031
3722    ; C     A=KA/KM, B=K*/KM , G=G*/GM ARE COMPUTED AND RETURNED.        05640001
3723    ; C     AK,BK,AG,BG ARE INTERPOLATED BETWEEN ABLKL...ABLKD..ETC.     05650001
3724    ; C                                                                  05660001
3725    ;       IMPLICIT REAL(K)                                             05670001
3726    ;                                                                    05680001
3727    ;                                                                    05690001
3728    ;                                                                    05700001
```

```
3729    !                                                                               05710001
3730    !                                                                               05720031
3731    !                                                                               05730001
3732    !                                                                               05740001
3733    !                                                                               05750001
3734    !                                                                               05760031
3735    ! C       IF(LITH.NE.2 .AND. LITH.NE.3)WRITE(NOUT,10)LITH                        05770026
3736    ! C    10 FORMAT(/5X,' LITH=',I3,' IN LIDOS SUBROUTINE-LOGICAL ERROR' //05780023
3737    !         IF(LITH.NE.2 .AND. LITH.NE.3)GO TO 20                                  05790023
3738              LDY     #1
3739              LDA     (LITH|107),Y
3740              CMP     #3
3741              BNE     .L000376
3742              LDA     (LITH|107)
3743              CMP     #0
3744              BEQ     .L000375
3745    .L000376  LDA     #80H
3746              BNE     *+4
3747    .L000375  LDA     #0
3748              LDY     #1
3749              STA     .T000374
3750              LDA     (LITH|107),Y
3751              CMP     #2
3752              BNE     .L000378
3753              LDA     (LITH|107)
3754              CMP     #0
3755              BEQ     .L000377
3756    .L000378  LDA     #80H
3757              BNE     *+4
3758    .L000377  LDA     #0
3759              AND     .T000374
3760              ASL     A
3761              BCS     *+5
3762              JMP     .L000380
3763              JMP     .L000381
3764    .L000380  EQU     *
3765    !         IF(LITH.EQ.2)CALL INTERP(NP,ABLKL,BBLKL,ASHRL,BSHRL,DP,DGRAD,Z,05800001
3766              LDY     #1
3767              LDA     (LITH|107),Y
3768              CMP     #2
3769              BNE     .L000382
3770              LDA     (LITH|107)
3771              CMP     #0
3772              BNE     .L000382
3773    !    *BK,AG,BG)                                                                  05810001
3774              LDA     #BG|||107 MOD .M
3775              STA     INTERP.2
3776              LDA     #BG|||107/256
3777              STA     INTERP.2+1
3778              LDA     #AG|||107 MOD .M
3779              STA     INTERP.1
3780              LDA     #AG|||107/256
3781              STA     INTERP.1+1
3782              LDA     #BK|||107 MOD .M
3783              STA     INTERP.0
3784              LDA     #BK|||107/256
3785              STA     INTERP.0+1
3786              LDA     #AK|||107 MOD .M
3787              STA     INTERP.9
3788              LDA     #AK|||107/256
3789              STA     INTERP.9+1
3790              LDA     Z|||107
3791              STA     INTERP.8
3792              LDA     Z|||107+1
3793              STA     INTERP.8+1
3794              LDA     DGRAD107
3795              STA     INTERP.7
3796              LDA     DGRAD107+1
3797              STA     INTERP.7+1
3798              LDA     #DP|||107 MOD .M
3799              STA     INTERP.6
3800              LDA     #DP|||107/256
3801              STA     INTERP.6+1
3802              LDA     #BSHRL107 MOD .M
3803              STA     INTERP.5
3804              LDA     #BSHRL107/256
3805              STA     INTERP.5+1
3806              LDA     #ASHRL107 MOD .M
3807              STA     INTERP.4
```

```
3808            LDA     #ASHRL107/256
3809            STA     INTERP.4+1
3810            LDA     #BHL+L107 MOD .M
3811            STA     INTERP.3
3812            LDA     #BBLKL107/256
3813            STA     INTERP.3+1
3814            LDA     #ABLKL107 MOD .M
3815            STA     INTERP.2
3816            LDA     #ABLKL107/256
3817            STA     INTERP.2+1
3818            LDA     NPI11107
3819            STA     INTERP.1
3820            LDA     NPI11107+1
3821            STA     INTERP.1+1
3822            JSR     INTERP
3823    .L000382 EQU    *
3824    ;       IF(LITH.EQ.2)GO TO 5                                        05820001
3825            LDY     #1
3826            LDA     (LITHI107),Y
3827            CMP     #2
3828            BNE     .L000384
3829            LDA     (LITHI107)
3830            CMP     #0
3831            BNE     .L000384
3832            JMP     .L000386
3833    .L000384 EQU    *
3834    ;       IF(LITH.EQ.3)CALL INTERP(NP,ABLKD,BBLKD,ASHRD,BSHRD,DP,DGRAD,Z,05830001
3835            LDY     #1
3836            LDA     (LITHI107),Y
3837            CMP     #3
3838            BNE     .L000387
3839            LDA     (LITHI107)
3840            CMP     #0
3841            BNE     .L000387
3842    ;       *BK,AG,BG)                                                  05840001
3843            LDA     #BG111107 MOD .M
3844            STA     INTERP.2
3845            LDA     #BG111107/256
3846            STA     INTERP.2+1
3847            LDA     #AG111107 MOD .M
3848            STA     INTERP.1
3849            LDA     #AG111107/256
3850            STA     INTERP.1+1
3851            LDA     #BK111107 MOD .M
3852            STA     INTERP.0
3853            LDA     #BK111107/256
3854            STA     INTERP.0+1
3855            LDA     #AK111107 MOD .M
3856            STA     INTERP.9
3857            LDA     #AK111107/256
3858            STA     INTERP.9+1
3859            LDA     ZI111107
3860            STA     INTERP.8
3861            LDA     ZI111107+1
3862            STA     INTERP.8+1
3863            LDA     DGRAD107
3864            STA     INTERP.7
3865            LDA     DGRAD107+1
3866            STA     INTERP.7+1
3867            LDA     #DP111107 MOD .M
3868            STA     INTERP.6
3869            LDA     #DP111107/256
3870            STA     INTERP.6+1
3871            LDA     #BSHRD107 MOD .M
3872            STA     INTERP.5
3873            LDA     #BSHRD107/256
3874            STA     INTERP.5+1
3875            LDA     #ASHRD107 MOD .M
3876            STA     INTERP.4
3877            LDA     #ASHRD107/256
3878            STA     INTERP.4+1
3879            LDA     #BBLKD107 MOD .M
3880            STA     INTERP.3
3881            LDA     #BBLKD107/256
3882            STA     INTERP.3+1
3883            LDA     #ABLKD107 MOD .M
3884            STA     INTERP.2
3885            LDA     #ABLKD107/256
3886            STA     INTERP.2+1
3887            LDA     NPI11107
3888            STA     INTERP.1
3889            LDA     NPI11107+1
```

```
3890            STA     INTERP.1+1
3891            JSR     INTERP
3892    .L000387 EQU    *                                                       05850001
3893    ;    5 G= (AG*PSTAR+BG)/GM
3894    .L000388 EQU    *
3895    .MFFMUL SET     1
3896            JSR     .FFMUL
3897            .BYTE   0
3898            .WORD   AG111107,-PSTAR107
3899            .WORD   .T000389
3900    .MFFADD SET     1
3901            JSR     .FFADD
3902            .BYTE   0
3903            .WORD   .T000389,BG111107
3904            .WORD   .T000393
3905    .MFFDIV SET     1
3906            JSR     .FFDIV
3907            .BYTE   0
3908            .WORD   .T000393,-GM111107
3909            .WORD   -G111107
3910    ;                                                                       05860001
3911    .MFFMUL SET     1
3912            JSR     .FFMUL
3913            .BYTE   0
3914            .WORD   AK111107,-PSTAR107
3915            .WORD   .T000389
3916    .MFFADD SET     1
3917            JSR     .FFADD
3918            .BYTE   0
3919            .WORD   .T000389,BK111107
3920            .WORD   .T000393
3921    .MFFDIV SET     1
3922            JSR     .FFDIV
3923            .BYTE   0
3924            .WORD   .T000393,-KM111107
3925            .WORD   -B111107
3926    ;                                                                       05870001
3927    .MFFDIV SET     1
3928            JSR     .FFDIV
3929            .BYTE   0
3930            .WORD   -KM111107,-KF111107
3931            .WORD   .T000389
3932    .MFFSUB SET     1
3933            JSR     .FFSUB
3934            .BYTE   0
3935            .WORD   .T000389,..C000394
3936            .WORD   F0111107
3937    ;                                                                       05880031
3938    .MFFMUL SET     1
3939            JSR     .FFMUL
3940            .BYTE   0
3941            .WORD   F0111107,-PHI11107
3942            .WORD   .T000389
3943    .MFFADD SET     1
3944            JSR     .FFADD
3945            .BYTE   0
3946            .WORD   .T000389,..C000395
3947            .WORD   .T000393
3948    .MFFMUL SET     1
3949            JSR     .FFMUL
3950            .BYTE   0
3951            .WORD   .T000393,-B111107
3952            .WORD   .T000389
3953    .MFFMUL SET     1
3954            JSR     .FFMUL
3955            .BYTE   0
3956            .WORD   F0111107,-PHI11107
3957            .WORD   .T000397
3958    .MFFADD SET     1
3959            JSR     .FFADD
3960            .BYTE   0
3961            .WORD   .T000397,-B111107
3962            .WORD   .T000398
3963    .MFFSUB SET     1
3964            JSR     .FFSUB
3965            .BYTE   0
3966            .WORD   .T000398,..C000399
3967            .WORD   .T000397
3968    .MFFSUB SET     1
```

```
3969              JSR    .FFSUB
3970              .BYTE  0
3971              .WORD  .T000389,.C000396
3972              .WORD  .T000393
3973   .MFFDIV    SET    1
3974              JSR    .FFDIV
3975              .BYTE  0
3976              .WORD  .T000393,.T000397
3977              .WORD  -A1111107
3978   ;    20 RETURN                                           05890001
3979   .L000381 EQU  *
3980              JMP    .R000372                               05900001
3981   ;     END
3982   .R000372 RTS
3983   ;      SUBROUTINE INTERP(N,ABLK,BBLK,ASHR,BSHR,DP,DGRAD,Z,AK,BK,AG,BG 05910001
3984   INTERP    EQU    *
3985   NI111108 EQU    INTERP,1
3986   ABLKI108 EQU    INTERP,2
3987   BBLKI108 EQU    INTERP,3
3988   ASHRI108 EQU    INTERP,4
3989   BSHRI108 EQU    INTERP,5
3990   DPI11108 EQU    INTERP,6
3991   DGRADI08 EQU    INTERP,7
3992   ZI111108 EQU    INTERP,8
3993   AKI11108 EQU    INTERP,9
3994   BKI11108 EQU    INTERP,0
3995   AGI11108 EQU    INTERP,1
3996   BGI11108 EQU    INTERP,2
3997   ; C     *                                                05920001
3998   ; C     R.J. RUNGE   COFRC                               05930001
3999   ; C     Z=DEPTH IN KILOFT                                05940030
4000   ; C     DGRAD=DIFFERENTIAL GRADIENT=DVGRAD-FGRAD (KPSI/KFT) 05950030
4001   ; C     ABLK=AK,BBLK=BK, ASHR=AG, BSHR=BG=COEFFICIENTS FOR DOUBLE 05960001
4002   ; C     EXPONENTIAL REGRESSION FMLAS (RJR-DOT,           05970030
4003   ; C     OR SOME OTHER POINTS OF INTERPOLATION IF DESIRED 05980030
4004   ; C     WE HAVE ABLK(J),BBLK(J),ASHR(J),BSHR(J) FOR EACH DIFFERENTIAL 05990001
4005   ; C     PRESSURE DP(J) (KPSI), J=1,N=NO. OF DIFF. PRESSURES 06000001
4006   ; C     EXTRAPOLATIONS OR INTERPOLATIONS ARE PERFORMED FOR ANY GIVEN 06010001
4007   ; C     COMPUTED QUANTITIES-                             06020030
4008   ; C     DIFF. PRESS., PDIFF (KPSI) TO OBTAIN AK,BK,AG,BG. 06030001
4009   ; C     PRESSURES IN KPSI, AK,BK,AG,BG.                  06040030
4010   ; C     *                                                06050001
4011   ;       IMPLICIT REAL (K)                                06060001
4012   ;       DIMENSION ABLK(20),BBLK(20),ASHR(20),BSHR(20),DP(20) 06070001
4013   ;                                                        06080001
4014   .MFFMUL   SET    1
4015             JSR    .FFMUL
4016             .BYTE  0
4017             .WORD  -DGRADI08,-ZI111108
4018             .WORD  PDIFF108
4019   ;       IF(PDIFF.GE.DP(1) .AND. PDIFF.LE.DP(N))GO TO 50  06090001
4020             LDY    #1
4021             LDA    (NI11108),Y
4022             SEC
4023             SBC    #1
4024             ASL    A
4025             ASL    A
4026             ADC    DPI11108
4027             STA    .T000403
4028             LDA    #0
4029             ADC    DPI11108+1
4030             STA    .T000403+1
4031   .MFFLE    SET    1
4032             JSR    .FFLE
4033             .BYTE  0
4034             .WORD  PDIFF108,-.T000403
4035             STA    .T000402
4036             LDA    #1
4037             SEC
4038             SBC    #1
4039             ASL    A
4040             ASL    A
4041             ADC    DPI11108
4042             STA    .T000403
4043             LDA    #0
4044             ADC    DPI11108+1
4045             STA    .T000403+1
4046   .MFFGE    SET    1
4047             JSR    .FFGE
4048             .BYTE  0
4049             .WORD  PDIFF108,-.T000403
```

```
4050            AND     .T000402
4051            ASL     A
4052            BCS     *+5
4053            JMP     .L000405
4054            JMP     .L000406
4055   .L000405 EQU     *                                           06100015
4056    ;       IF(PDIFF.LT.DP(1))GO TO 30
4057            LDA     #1
4058            SEC
4059            SBC     #1
4060            ASL     A
4061            ASL     A
4062            ADC     DP111108
4063            STA     .T000402
4064            LDA     #0
4065            ADC     DP111108+1
4066            STA     .T000402+1
4067   .MFFLT   SET     1
4068            JSR     .FFLT
4069            .BYTE   0
4070            .WORD   PDIFF108,-.T000402
4071            ASL     A
4072            BCS     *+5
4073            JMP     .L000407
4074            JMP     .L000408
4075   .L000407 EQU     *                                           06110001
4076    ;
4077            LDY     #1
4078            LDA     (N111108),Y
4079            SEC
4080            SBC     #1
4081            STA     .T000401
4082            LDA     .T000401
4083            SEC
4084            SBC     #1
4085            ASL     A
4086            ASL     A
4087            ADC     DP111108
4088            STA     .T000402
4089            LDA     #0
4090            ADC     DP111108+1
4091            STA     .T000402+1
4092            LDY     #1
4093            LDA     (N111108),Y
4094            SEC
4095            SBC     #1
4096            ASL     A
4097            ASL     A
4098            ADC     DP111108
4099            STA     .T000401
4100            LDA     #0
4101            ADC     DP111108+1
4102            STA     .T000401+1
4103   .MFFSUB  SET     1
4104            JSR     .FFSUB
4105            .BYTE   0
4106            .WORD   -.T000401,-.T000402
4107            .WORD   DELP1108
4108    ;                                                           06120001
4109            LDY     #1
4110            LDA     (N111108),Y
4111            SEC
4112            SBC     #1
4113            ASL     A
4114            ASL     A
4115            ADC     DP111108
4116            STA     .T000401
4117            LDA     #0
4118            ADC     DP111108+1
4119            STA     .T000401+1
4120   .MFFSUB  SET     1
4121            JSR     .FFSUB
4122            .BYTE   0
4123            .WORD   PDIFF108,-.T000401
4124            .WORD   PEXT1108
4125    ;                                                           06130001
4126            LDY     #1
4127            LDA     (N111108),Y
4128            SEC
4129            SBC     #1
```

```
4130            STA     .T000401
4131            LDA     .T000401
4132            SEC
4133            SBC     #1
4134            ASL     A
4135            ASL     A
4136            ADC     ABLK1108
4137            STA     .T000402
4138            LDA     #0
4139            ADC     ABLK1108+1
4140            STA     .T000402+1
4141            LDY     #1
4142            LDA     (N11111108),Y
4143            SEC
4144            SBC     #1
4145            ASL     A
4146            ASL     A
4147            ADC     ABLK1108
4148            STA     .T000401
4149            LDA     #0
4150            ADC     ABLK1108+1
4151            STA     .T000401+1
4152   .MFFSUB  SET     1
4153            JSR     .FFSUB
4154            .BYTE   0
4155            .WORD   -.T000401,-.T000402
4156            .WORD   .T000409
4157   .MFFDIV  SET     1
4158            JSR     .FFDIV
4159            .BYTE   0
4160            .WORD   .T000409,DELP1108
4161            .WORD   S1111108
4162   ;
4163   .MFFMUL  SET     1
4164            JSR     .FFMUL
4165            .BYTE   0
4166            .WORD   S1111108,PEXT1108
4167            .WORD   .T000401
4168            LDY     #1
4169            LDA     (N11111108),Y
4170            SEC
4171            SBC     #1
4172            ASL     A
4173            ASL     A
4174            ADC     ABLK1108
4175            STA     .T000402
4176            LDA     #0
4177            ADC     ABLK1108+1
4178            STA     .T000402+1
4179   .MFFADD  SET     1
4180            JSR     .FFADD
4181            .BYTE   0
4182            .WORD   .T000401,-.T000402
4183            .WORD   -AK111108
4184   ;
4185            LDY     #1
4186            LDA     (N11111108),Y
4187            SEC
4188            SBC     #1
4189            STA     .T000401
4190            LDA     .T000401
4191            SEC
4192            SBC     #1
4193            ASL     A
4194            ASL     A
4195            ADC     BBLK1108
4196            STA     .T000402
4197            LDA     #0
4198            ADC     BBLK1108+1
4199            STA     .T000402+1
4200            LDY     #1
4201            LDA     (N11111108),Y
4202            SEC
4203            SBC     #1
4204            ASL     A
4205            ASL     A
4206            ADC     BBLK1108
4207            STA     .T000401
4208            LDA     #0
4209            ADC     BBLK1108+1
```

```
4210            STA     .T000401+1
4211   .MFFSUB  SET     1
4212            JSR     .FFSUB
4213            .BYTE   0
4214            .WORD   -.T000401,-.T000402
4215            .WORD   .T000409
4216   .MFFDIV  SET     1
4217            JSR     .FFDIV
4218            .BYTE   0
4219            .WORD   .T000409,DELPII08
4220            .WORD   SIIIII08
4221   ;
4222   .MFFMUL  SET     1
4223            JSR     .FFMUL
4224            .BYTE   0
4225            .WORD   SIIIII08,PEXTII08
4226            .WORD   .T000401
4227            LDY     #1
4228            LDA     (NIIIII08),Y
4229            SEC
4230            SBC     #1
4231            ASL     A
4232            ASL     A
4233            ADC     BBLKII08
4234            STA     .T000402
4235            LDA     #0
4236            ADC     BBLKII08+1
4237            STA     .T000402+1
4238   .MFFADD  SET     1
4239            JSR     .FFADD
4240            .BYTE   0
4241            .WORD   .T000401,-.T000402
4242            .WORD   -BKIII08
4243   ;
4244            LDY     #1
4245            LDA     (NIIIII08),Y
4246            SEC
4247            SBC     #1
4248            STA     .T000401
4249            LDA     .T000401
4250            SEC
4251            SBC     #1
4252            ASL     A
4253            ASL     A
4254            ADC     ASHRII08
4255            STA     .T000402
4256            LDA     #0
4257            ADC     ASHRII08+1
4258            STA     .T000402+1
4259            LDY     #1
4260            LDA     (NIIIII08),Y
4261            SEC
4262            SBC     #1
4263            ASL     A
4264            ASL     A
4265            ADC     ASHRII08
4266            STA     .T000401
4267            LDA     #0
4268            ADC     ASHRII08+1
4269            STA     .T000401+1
4270   .MFFSUB  SET     1
4271            JSR     .FFSUB
4272            .BYTE   0
4273            .WORD   -.T000401,-.T000402
4274            .WORD   .T000409
4275   .MFFDIV  SET     1
4276            JSR     .FFDIV
4277            .BYTE   0
4278            .WORD   .T000409,DELPII08
4279            .WORD   SIIIII08
4280   ;
4281   .MFFMUL  SET     1
4282            JSR     .FFMUL
4283            .BYTE   0
4284            .WORD   SIIIII08,PEXTII08
4285            .WORD   .T000401
4286            LDY     #1
4287            LDA     (NIIIII08),Y
4288            SEC
4289            SBC     #1
```

```
4290            ASL    A
4291            ASL    A
4292            ADC    ASHRI108
4293            STA    .T000402
4294            LDA    #0
4295            ADC    ASHRI108+1
4296            STA    .T000402+1
4297   .MFFADD  SET    1
4298            JSR    .FFADD
4299            .BYTE  0
4300            .WORD  .T000401,-.T000402
4301            .WORD  -AGI11108
4302   ;
4303            LDY    #1
4304            LDA    (NI11108),Y
4305            SEC
4306            SBC    #1
4307            STA    .T000401
4308            LDA    .T000401
4309            SEC
4310            SBC    #1
4311            ASL    A
4312            ASL    A
4313            ADC    BSHRI108
4314            STA    .T000402
4315            LDA    #0
4316            ADC    BSHRI108+1
4317            STA    .T000402+1
4318            LDY    #1
4319            LDA    (NI11108),Y
4320            SEC
4321            SBC    #1
4322            ASL    A
4323            ASL    A
4324            ADC    BSHRI108
4325            STA    .T000401
4326            LDA    #0
4327            ADC    BSHRI108+1
4328            STA    .T000401+1
4329   .MFFSUB  SET    1
4330            JSR    .FFSUB
4331            .BYTE  0
4332            .WORD  -.T000401,-.T000402
4333            .WORD  .T000409
4334   .MFFDIV  SET    1
4335            JSR    .FFDIV
4336            .BYTE  0
4337            .WORD  .T000409,DELPI108
4338            .WORD  SI11108
4339   ;
4340   .MFFMUL  SET    1
4341            JSR    .FFMUL
4342            .BYTE  0
4343            .WORD  SI11108,PEXTI108
4344            .WORD  .T000401
4345            LDY    #1
4346            LDA    (NI11108),Y
4347            SEC
4348            SBC    #1
4349            ASL    A
4350            ASL    A
4351            ADC    BSHRI108
4352            STA    .T000402
4353            LDA    #0
4354            ADC    BSHRI108+1
4355            STA    .T000402+1
4356   .MFFADD  SET    1
4357            JSR    .FFADD
4358            .BYTE  0
4359            .WORD  .T000401,-.T000402
4360            .WORD  -BGI11108
4361   ;        GO TO 100
4362            JMP    .L000410
4363   ;    30 DELP=DP(2)-DP(1)
4364   .L000408 EQU    *
4365            LDA    #1
4366            SEC
4367            SBC    #1
4368            ASL    A
4369            ASL    A
```

```
4370            ADC     DP11108
4371            STA     .T000401
4372            LDA     #0
4373            ADC     DP11108+1
4374            STA     .T000401+1
4375            LDA     #2
4376            SEC
4377            SBC     #1
4378            ASL     A
4379            ASL     A
4380            ADC     DP11108
4381            STA     .T000402
4382            LDA     #0
4383            ADC     DP11108+1
4384            STA     .T000402+1
4385   .MFFSUB  SET     1
4386            JSR     .FFSUB
4387            .BYTE   0
4388            .WORD   -.T000402,-.T000401
4389            .WORD   DELP1108                                06230001
4390   ;
4391            LDA     #1
4392            SEC
4393            SBC     #1
4394            ASL     A
4395            ASL     A
4396            ADC     DP11108
4397            STA     .T000402
4398            LDA     #0
4399            ADC     DP11108+1
4400            STA     .T000402+1
4401   .MFFSUB  SET     1
4402            JSR     .FFSUB
4403            .BYTE   0
4404            .WORD   -.T000402,PDIFF108
4405            .WORD   PEXT1108                                06240001
4406   ;
4407            LDA     #2
4408            SEC
4409            SBC     #1
4410            ASL     A
4411            ASL     A
4412            ADC     ABLK1108
4413            STA     .T000402
4414            LDA     #0
4415            ADC     ABLK1108+1
4416            STA     .T000402+1
4417            LDA     #1
4418            SEC
4419            SBC     #1
4420            ASL     A
4421            ASL     A
4422            ADC     ABLK1108
4423            STA     .T000403
4424            LDA     #0
4425            ADC     ABLK1108+1
4426            STA     .T000403+1
4427   .MFFSUB  SET     1
4428            JSR     .FFSUB
4429            .BYTE   0
4430            .WORD   -.T000403,-.T000402
4431            .WORD   .T000401
4432   .MFFDIV  SET     1
4433            JSR     .FFDIV
4434            .BYTE   0
4435            .WORD   .T000401,DELP1108
4436            .WORD   S11108
4437   ;                                                        0625000
4438   .MFFMUL  SET     1
4439            JSR     .FFMUL
4440            .BYTE   0
4441            .WORD   S11108,PEXT1108
4442            .WORD   .T000401
4443            LDA     #1
4444            SEC
4445            SBC     #1
4446            ASL     A
4447            ASL     A
4448            ADC     ABLK1108
4449            STA     .T000402
```

```
4450            LDA     #0
4451            ADC     ABLK1108+1
4452            STA     .T000402+1
4453   .MFFADD  SET     1
4454            JSR     .FFADD
4455            .BYTE   0
4456            .WORD   .T000401,-.T000402
4457            .WORD   -AK111108
4458   ;                                                06260001
4459            LDA     #2
4460            SEC
4461            SBC     #1
4462            ASL     A
4463            ASL     A
4464            ADC     BBLK1108
4465            STA     .T000402
4466            LDA     #0
4467            ADC     BBLK1108+1
4468            STA     .T000402+1
4469            LDA     #1
4470            SEC
4471            SBC     #1
4472            ASL     A
4473            ASL     A
4474            ADC     BBLK1108
4475            STA     .T000403
4476            LDA     #0
4477            ADC     BBLK1108+1
4478            STA     .T000403+1
4479   .MFFSUB  SET     1
4480            JSR     .FFSUB
4481            .BYTE   0
4482            .WORD   -.T000403,-.T000402
4483            .WORD   .T000401
4484   .MFFDIV  SET     1
4485            JSR     .FFDIV
4486            .BYTE   0
4487            .WORD   .T000401,DELP1108
4488            .WORD   S111110R
4489   ;                                                06270001
4490   .MFFMUL  SET     1
4491            JSR     .FFMUL
4492            .BYTE   0
4493            .WORD   S11111108,PEXT1108
4494            .WORD   .T000401
4495            LDA     #1
4496            SEC
4497            SBC     #1
4498            ASL     A
4499            ASL     A
4500            ADC     BBLK1108
4501            STA     .T000402
4502            LDA     #0
4503            ADC     BBLK1108+1
4504            STA     .T000402+1
4505   .MFFADD  SET     1
4506            JSR     .FFADD
4507            .BYTE   0
4508            .WORD   .T000401,-.T000402
4509            .WORD   -BK111108
4510   ;                                                06280001
4511            LDA     #2
4512            SEC
4513            SBC     #1
4514            ASL     A
4515            ASL     A
4516            ADC     ASHR1108
4517            STA     .T000402
4518            LDA     #0
4519            ADC     ASHR1108+1
4520            STA     .T000402+1
4521            LDA     #1
4522            SEC
4523            SBC     #1
4524            ASL     A
4525            ASL     A
4526            ADC     ASHR1108
4527            STA     .T000403
4528            LDA     #0
4529            ADC     ASHR1108+1
```

```
4530            STA     .T000403+1
4531   .MFFSUB  SET     1
4532            JSR     .FFSUB
4533            .BYTE   0
4534            .WORD   -.T000403,-.T000402
4535            .WORD   .T000401
4536   .MFFDIV  SET     1
4537            JSR     .FFDIV
4538            .BYTE   0
4539            .WORD   .T000401,DELP1108
4540            .WORD   S1111108
4541   ;                                                06290001
4542   .MFFMUL  SET     1
4543            JSR     .FFMUL
4544            .BYTE   0
4545            .WORD   S1111108,PEXT1108
4546            .WORD   .T000401
4547            LDA     #1
4548            SEC
4549            SBC     #1
4550            ASL     A
4551            ASL     A
4552            ADC     ASHR1108
4553            STA     .T000402
4554            LDA     #0
4555            ADC     ASHR1108+1
4556            STA     .T000402+1
4557   .MFFADD  SET     1
4558            JSR     .FFADD
4559            .BYTE   0
4560            .WORD   .T000401,-.T000402
4561            .WORD   -AG111108
4562   ;                                                06300001
4563            LDA     #2
4564            SEC
4565            SBC     #1
4566            ASL     A
4567            ASL     A
4568            ADC     BSHR1108
4569            STA     .T000402
4570            LDA     #0
4571            ADC     BSHR1108+1
4572            STA     .T000402+1
4573            LDA     #1
4574            SEC
4575            SBC     #1
4576            ASL     A
4577            ASL     A
4578            ADC     BSHR1108
4579            STA     .T000403
4580            LDA     #0
4581            ADC     BSHR1108+1
4582            STA     .T000403+1
4583   .MFFSUB  SET     1
4584            JSR     .FFSUB
4585            .BYTE   0
4586            .WORD   -.T000403,-.T000402
4587            .WORD   .T000401
4588   .MFFDIV  SET     1
4589            JSR     .FFDIV
4590            .BYTE   0
4591            .WORD   .T000401,DELP1108
4592            .WORD   S1111108
4593   ;                                                06310001
4594   .MFFMUL  SET     1
4595            JSR     .FFMUL
4596            .BYTE   0
4597            .WORD   S1111108,PEXT1108
4598            .WORD   .T000401
4599            LDA     #1
4600            SEC
4601            SBC     #1
4602            ASL     A
4603            ASL     A
4604            ADC     BSHR1108
4605            STA     .T000402
4606            LDA     #0
4607            ADC     BSHR1108+1
4608            STA     .T000402+1
4609   .MFFADD  SET     1
```

```
4610              JSR     .FFADD
4611              .BYTE   0
4612              .WORD   .T000401,-.T000402
4613              .WORD   -BG111108
4614    !    GO TO 100                                               06320001
4615              JMP     .L000410
4616    !    50 JJ=1                                                 06330001
4617    .L000406 EQU     *
4618              LDA     #0
4619              STA     JJ111108
4620              LDA     #1
4621              STA     JJ111108+1
4622    !                                                            06340001
4623              LDY     #1
4624              LDA     (N111108),Y
4625              SEC
4626              SBC     #1
4627              STA     NM111108+1
4628              LDA     (N111108)
4629              SBC     #0
4630              STA     NM111108
4631    !    DO 60 J=1,NM1                                           06350001
4632              LDA     #0
4633              STA     J111108
4634              LDA     #1
4635              STA     J111108+1
4636              JMP     .L000413
4637    .L000411 EQU     *
4638              LDA     J111108+1
4639              CLC
4640              ADC     #1
4641              STA     J111108+1
4642              LDA     J111108
4643              ADC     #0
4644              STA     J111108
4645              LDA     NM111108+1
4646              CMP     J111108+1
4647              LDA     NM111108
4648              SBC     J111108
4649              BMI     .L000412
4650    .L000413 EQU     *
4651    !    JP1=J+1                                                 06360001
4652              LDA     J111108+1
4653              CLC
4654              ADC     #1
4655              STA     JP1111108+1
4656              LDA     J111108
4657              ADC     #0
4658              STA     JP1111108
4659    !    IF(PDIFF.GE.DP(J) .AND. PDIFF.LE.DP(JP1))GO TO 70       06370001
4660              LDA     JP1111108+1
4661              SEC
4662              SBC     #1
4663              ASL     A
4664              ASL     A
4665              ADC     DP111108
4666              STA     .T000403
4667              LDA     #0
4668              ADC     DP111108+1
4669              STA     .T000403+1
4670    .MFFLE    SET     1
4671              JSR     .FFLE
4672              .BYTE   0
4673              .WORD   PDIFF108,-.T000403
4674              STA     .T000402
4675              LDA     J111108+1
4676              SEC
4677              SBC     #1
4678              ASL     A
4679              ASL     A
4680              ADC     DP111108
4681              STA     .T000403
4682              LDA     #0
4683              ADC     DP111108+1
4684              STA     .T000403+1
4685    .MFFGE    SET     1
4686              JSR     .FFGE
4687              .BYTE   0
4688              .WORD   PDIFF108,-.T000403
4689              AND     .T000402
```

```
4691            BCS     *+5
4692            JMP     .L000416
4693            JMP     .L000417
4694  .L000416 EQU     *
4695  ;                                                                06380001
4696            LDA     JJI11108+1
4697            CLC
4698            ADC     #1
4699            STA     JJI11108+1
4700            LDA     JJI11108
4701            ADC     #0
4702            STA     JJI11108
4703  ;    60 CONTINUE                                                 06390001
4704  .L000415 EQU     *
4705            JMP     .L000411
4706  .L000412 EQU     *
4707  ;                                                                06400001
4708  .L000417 EQU     *
4709            LDA     JJI11108+1
4710            CLC
4711            ADC     #1
4712            STA     .T000401
4713            LDA     JJI11108+1
4714            SEC
4715            SBC     #1
4716            ASL     A
4717            ASL     A
4718            ADC     DPI11108
4719            STA     .T000402
4720            LDA     #0
4721            ADC     DPI11108+1
4722            STA     .T000402+1
4723            LDA     .T000401
4724            SEC
4725            SBC     #1
4726            ASL     A
4727            ASL     A
4728            ADC     DPI11108
4729            STA     .T000403
4730            LDA     #0
4731            ADC     DPI11108+1
4732            STA     .T000403+1
4733  .MFFSUB  SET     1
4734            JSR     .FFSUB
4735            .BYTE   0
4736            .WORD   -.T000403,-.T000402
4737            .WORD   DELPI108
4738  ;                                                                06410001
4739            LDA     JJI11108+1
4740            SEC
4741            SBC     #1
4742            ASL     A
4743            ASL     A
4744            ADC     DPI11108
4745            STA     .T000401
4746            LDA     #0
4747            ADC     DPI11108+1
4748            STA     .T000401+1
4749  .MFFSUB  SET     1
4750            JSR     .FFSUB
4751            .BYTE   0
4752            .WORD   PDIFF108,-.T000401
4753            .WORD   PEXTI108
4754  ;                                                                06420001
4755            LDA     JJI11108+1
4756            CLC
4757            ADC     #1
4758            STA     .T000401
4759            LDA     JJI11108+1
4760            SEC
4761            SBC     #1
4762            ASL     A
4763            ASL     A
4764            ADC     ABLKI108
4765            STA     .T000402
4766            LDA     #0
4767            ADC     ABLKI108+1
4768            STA     .T000402+1
4769            LDA     .T000401
```

```
4770                SEC
4771                SBC     #1
4772                ASL     A
4773                ASL     A
4774                ADC     ABLK1108
4775                STA     .T000403
4776                LDA     #0
4777                ADC     ABLK1108+1
4778                STA     .T000403+1
4779    .MFFSUB     SET     1
4780                JSR     .FFSUB
4781                .BYTE   0
4782                .WORD   -.T000403,-.T000402
4783                .WORD   .T000409
4784    .MFFDIV     SET     1
4785                JSR     .FFDIV
4786                .BYTE   0
4787                .WORD   .T000409,DELP1108
4788                .WORD   S1111108
4789        ;
4790    .MFFMUL     SET     1
4791                JSR     .FFMUL
4792                .BYTE   0
4793                .WORD   S1111108,PEXT1108
4794                .WORD   .T000401
4795                LDA     JJ111108+1
4796                SEC
4797                SBC     #1
4798                ASL     A
4799                ASL     A
4800                ADC     ABLK1108
4801                STA     .T000402
4802                LDA     #0
4803                ADC     ABLK1108+1
4804                STA     .T000402+1
4805    .MFFADD     SET     1
4806                JSR     .FFADD
4807                .BYTE   0
4808                .WORD   .T000401,-.T000402
4809                .WORD   -AK111108
4810        ;
4811                LDA     JJ111108+1
4812                CLC
4813                ADC     #1
4814                STA     .T000401
4815                LDA     JJ111108+1
4816                SEC
4817                SBC     #1
4818                ASL     A
4819                ASL     A
4820                ADC     BBLK1108
4821                STA     .T000402
4822                LDA     #0
4823                ADC     BBLK1108+1
4824                STA     .T000402+1
4825                LDA     .T000401
4826                SEC
4827                SBC     #1
4828                ASL     A
4829                ASL     A
4830                ADC     BBLK1108
4831                STA     .T000403
4832                LDA     #0
4833                ADC     BBLK1108+1
4834                STA     .T000403+1
4835    .MFFSUB     SET     1
4836                JSR     .FFSUB
4837                .BYTE   0
4838                .WORD   -.T000403,-.T000402
4839                .WORD   .T000409
4840    .MFFDIV     SET     1
4841                JSR     .FFDIV
4842                .BYTE   0
4843                .WORD   .T000409,DELP1108
4844                .WORD   S1111108
4845        ;
4846    .MFFMUL     SET     1
4847                JSR     .FFMUL
4848                .BYTE   0
4849                .WORD   S1111108,PEXT1108
```

```
4851            LDA     JJI11108+1
4852            SEC
4853            SBC     #1
4854            ASL     A
4855            ASL     A
4856            ADC     BBLKI108
4857            STA     .T000402
4858            LDA     #0
4859            ADC     BBLKI108+1
4860            STA     .T000402+1
4861  .MFFADD   SET     1
4862            JSR     .FFADD
4863            .BYTE   0
4864            .WORD   .T000401,-.T000402
4865            .WORD   -BKI11108
4866    ;                                               06460001
4867            LDA     JJI11108+1
4868            CLC
4869            ADC     #1
4870            STA     .T000401
4871            LDA     JJI11108+1
4872            SEC
4873            SBC     #1
4874            ASL     A
4875            ASL     A
4876            ADC     ASHRI108
4877            STA     .T000402
4878            LDA     #0
4879            ADC     ASHRI108+1
4880            STA     .T000402+1
4881            LDA     .T000401
4882            SEC
4883            SBC     #1
4884            ASL     A
4885            ASL     A
4886            ADC     ASHRI108
4887            STA     .T000403
4888            LDA     #0
4889            ADC     ASHRI108+1
4890            STA     .T000403+1
4891  .MFFSUB   SET     1
4892            JSR     .FFSUB
4893            .BYTE   0
4894            .WORD   -.T000403,-.T000402
4895            .WORD   .T000409
4896  .MFFDIV   SET     1
4897            JSR     .FFDIV
4898            .BYTE   0
4899            .WORD   .T000409,DELPI108
4900            .WORD   SI11108
4901    ;                                               06470001
4902  .MFFMUL   SET     1
4903            JSR     .FFMUL
4904            .BYTE   0
4905            .WORD   SI11108,PEXTI108
4906            .WORD   .T000401
4907            LDA     JJI11108+1
4908            SEC
4909            SBC     #1
4910            ASL     A
4911            ASL     A
4912            ADC     ASHRI108
4913            STA     .T000402
4914            LDA     #0
4915            ADC     ASHRI108+1
4916            STA     .T000402+1
4917  .MFFADD   SET     1
4918            JSR     .FFADD
4919            .BYTE   0
4920            .WORD   .T000401,-.T000402
4921            .WORD   -AGI11108
4922    ;                                               06480001
4923            LDA     JJI11108+1
4924            CLC
4925            ADC     #1
4926            STA     .T000401
4927            LDA     JJI11108+1
4928            SEC
4929            SBC     #1
```

```
4930            ASL     A
4931            ASL     A
4932            ADC     BSHR1108
4933            STA     .T000402
4934            LDA     #0
4935            ADC     BSHR1108+1
4936            STA     .T000402+1
4937            LDA     .T000401
4938            SEC
4939            SBC     #1
4940            ASL     A
4941            ASL     A
4942            ADC     BSHR1108
4943            STA     .T000403
4944            LDA     #0
4945            ADC     BSHR1108+1
4946            STA     .T000403+1
4947   .MFFSUB  SET     1
4948            JSR     .FFSUB
4949            .BYTE   0
4950            .WORD   -.T000403,-.T000402
4951            .WORD   .T000409
4952   .MFFDIV  SET     1
4953            JSR     .FFDIV
4954            .BYTE   0
4955            .WORD   .T000409,DELP1108
4956            .WORD   S1111108
4957   ;
4958   .MFFMUL  SET     1
4959            JSR     .FFMUL
4960            .BYTE   0
4961            .WORD   S1111108,PEXT1108
4962            .WORD   .T000401
4963            LDA     JJ111108+1
4964            SEC
4965            SBC     #1
4966            ASL     A
4967            ASL     A
4968            ADC     BSHR1108
4969            STA     .T000402
4970            LDA     #0
4971            ADC     BSHR1108+1
4972            STA     .T000402+1
4973   .MFFADD  SET     1
4974            JSR     .FFADD
4975            .BYTE   0
4976            .WORD   .T000401,-.T000402
4977            .WORD   -BG111108
4978   ;    100 CONTINUE
4979   .L000410 EQU     *
4980   ;        RETURN
4981            JMP     .R000400
4982   ; C      *
4983   ;        END
4984   .R000400 RTS
4985   ;        SUBROUTINE GASMD2(PFLUID,FTEMP,RHOGAS,KGAS,GASGRV,TOL,NBUG,NOUT'
4986            EQU     *
4987   PFLUID09 EQU     GASMD2.1
4988   FTEMP109 EQU     GASMD2.2
4989   RHOGAS09 EQU     GASMD2.3
4990   KGAS1109 EQU     GASMD2.4
4991   GASGRV09 EQU     GASMD2.5
4992   TOL11109 EQU     GASMD2.6
4993   NBUG1109 EQU     GASMD2.7
4994   NOUT1109 EQU     GASMD2.8
4995   ;        *GASMIX )
4996   GASMIX09 EQU     GASMD2.9
4997   ; C      R.J.RUNGE              COFRC.
4998   ; C      CALCULATES & RETURNS METRIC RHOGAS & KGAS  DENSITY & BULK MODUL
4999   ; C      OF NATURAL GAS OF GRAVITY GASGRAV (API) USING THE BENEDICT-WEBB
5000   ; C      RUBIN EQN.  SEE K.THOMAS, W.HANKINSON, A.PHILLIPS.
5001   ; C      JOUR. PET.TECH. V.22 (1970) PGS. 889-895 FOR THE THEORY.
5002   ; C      ENGR. UNITS-VOLUME=FT**3,MASS=LB.,MODULI & PRESSURES IN PSI,
5003   ; C      DENSITY IN LB./FT**3 , TEMP=RANKINE, GRAVITY=API REF. TO AIR,
5004   ; C      CONVERSIONS TO RHOGAS (GM./CM**3) AND KGAS (KILOBARS) AT END.
5005   ; C      ISOTHERMAL KGAS COMPUTED
5006   ;
5007   ;
5008   ;
```

```
5009    ;
5010    ;       IMPLICIT REAL(K)
5011    ; C     BENEDICT-WEBB-RUBIN COEFFICIENTS (BWR) SEE T-H-P TABLE 1 PG.890
5012    ;
5013    ;
5014    ;
5015    ;
5016    ;
5017    ;
5018    ; C
5019    ;
5020    .MFLTASG SET   1
5021             JSR   .FLTASGN
5022             .BYTE 0
5023             .WORD .C000419
5024             .WORD RH111109
5025
5026
5027
5028    ; C     RANKINE TEMPERATURE=T, P=PRESSURE IN PSI. (PLUID ENTERS IN KPSI
5029    ; C     FTEMP=FARENHEIT TEMP.
5030    ;                                                                       06830025
5031    .MFLTASG SET   1
5032             JSR   .FLTASGN
5033             .BYTE 0
5034             .WORD .C000422
5035             .WORD RR111109
5036    ;                                                                       06840011
5037    .MFFADD  SET   1
5038             JSR   .FFADD
5039             .BYTE 0
5040             .WORD -FTEMP109,.C000423
5041             .WORD T1111109
5042    ;                                                                       06850041
5043    .MFLTASG SET   1
5044             JSR   .FLTASGN
5045             .BYTE 0
5046             .WORD -FTEMP109
5047             .WORD FT111109
5054    ;                                                                       06870037
5055    .MFLTASG SET   1
5056             JSR   .FLTASGN
5057             .BYTE 0
5058             .WORD -PFLUID09
5059             .WORD P1111109
5060    ;                                                                       06880016
5061    .MFFLT   SET   1
5062             JSR   .FFLT
5063             .BYTE 0
5064             .WORD PLFUID09,.C000425
5065             ASL   A
5066             BCS   *+5
5067             JMP   .L000426
5068    ; C     PSEUDO CRITICAL TEMP.& PRESSURE   TPC,PPC.                      06890011
5069    ; C     SEE THOMAS,HANKINSON & PHILLIPS EQNS. (11),(12) PG. 891.        06900011
5070    .MFFMUL  SET   1
5071             JSR   .FFMUL
5072             .BYTE 0
5073             .WORD -PFLUID09,.C000427
5074             .WORD P1111109
5075    .L000426 EQU   *
5076    ;                                                                       06910011
5077    .MFFMUL  SET   1
5078             JSR   .FFMUL
5079             .BYTE 0
5080             .WORD .C000429,-GASGRV09
5081             .WORD .T000424
5082    .MFFSUB  SET   1
5083             JSR   .FFSUB
5084             .BYTE 0
5085             .WORD .C000428,.T000424
5086             .WORD PPC111109
5087    ;                                                                       06920011
5088    ; C     PSEUDO REDUCED TEMP. & PRESSURE=TPR,PPR.                        06930025
5089    .MFFMUL  SET   1
5090             JSR   .FFMUL
5091             .BYTE 0
```

```
5092                .WORD   .C000433,-GASGRV09
5093                .WORD   .T000424
5094    .MFFADD     SET     1
5095                JSR     .FFADD
5096                .BYTE   0
5097                .WORD   .C000432,.T000424
5098                .WORD   TPCI1109
5099        ;                                                                   06940011
5100    .MFFDIV     SET     1
5101                JSR     .FFDIV
5102                .BYTE   0
5103                .WORD   PI11109,PPCI1109
5104                .WORD   PPRI1109
5131        ;       IX=1                                                        07000011
5132                LDA     #0
5133                STA     IXI11109
5134                LDA     #1
5135                STA     IXI11109+1
5136        ;       IF(PPR.GT.5.0)IX=2                                          07010011
5137    .MFFGT      SET     1
5138                JSR     .FFGT
5139                .BYTE   0
5140                .WORD   PPRI1109,.C000436
5141                ASL     A
5142                BCS     *+5
5143                JMP     .L000437
5144        ; C     BWR COEFFICIENTS (PSEUDO REDUCED, T-H-P EQN. 6)             07020025
5145                LDA     #0
5146                STA     IXI11109
5147                LDA     #2
5148                STA     IXI11109+1
5149    .L000437 EQU *
5150        ;       AR=BWR(1,IX)                                                07030011
5151        ;       AOR=BWR(2,IX)                                               07040011
5152        ;       BR=BWR(3,IX)                                                07050011
5153        ;       BOR=BWR(4,IX)                                               07060011
5154        ;       CR=BWR(5,IX)                                                07070011
5155        ;       COR=BWR(6,IX)                                               07080011
5156        ;       ALPHAR=BWR(7,IX)                                            07090011
5157        ;       GAMMR=BWR(8,IX)                                             07100011
5158        ; C     COEFFICIENTS                                                07110011
5159        ;                                                                   07120011
5160    .MFFMUL     SET     1
5161                JSR     .FFMUL
5162                .BYTE   0
5163                .WORD   BORI1109,TPRI1109
5164                .WORD   .T000424
5165    .MFFMUL     SET     1
5166                JSR     .FFMUL
5167                .BYTE   0
5168                .WORD   TPRI1109,TPRI1109
5169                .WORD   .T000438
5170    .MFFDIV     SET     1
5171                JSR     .FFDIV
5172                .BYTE   0
5173                .WORD   CORI1109,.T000438
5174                .WORD   .T000439
5175    .MFFSUB     SET     1
5176                JSR     .FFSUB
5177                .BYTE   0
5178                .WORD   .T000424,AORI1109
5179                .WORD   .T000431
5180    .MFFSUB     SET     1
5181                JSR     .FFSUB
5182                .BYTE   0
5183                .WORD   .T000431,.T000439
5184                .WORD   S1I1109
5185        ;                                                                   07130011
5186    .MFFMUL     SET     1
5187                JSR     .FFMUL
5188                .BYTE   0
5189                .WORD   BRI1109,TPRI1109
5190                .WORD   .T000424
5191    .MFFSUB     SET     1
5192                JSR     .FFSUB
5193                .BYTE   0
5194                .WORD   .T000424,ARI1109
5195                .WORD   S2I1109
```

```
5196   ;
5197   ; C      BEGIN HAVING SEARCH              SOLVING BWR EQUATION (6)        07140011
                                                                                 07150011
5198   ; C      OF THOMAS,HANKINSON & PHILLIPS . VPR=PSEUDO-REDUCED-VOLUME.      07160011
5199   .MFFMUL  SET     1
5200            JSR     .FFMUL
5201            .BYTE   0
5202            .WORD   AR111109,ALPHAR09
5203            .WORD   S3111109
5204   ;        XLOW=0.0                                                         07170011
5205   .MFLTASG SET     1
5206            JSR     .FLTASGN
5207            .BYTE   0
5208            .WORD   .C000440
5209            .WORD   XLOW1109
5210   ;                                                                         07180011
5211   .MFLTASG SET     1
5212            JSR     .FLTASGN
5213            .BYTE   0
5214            .WORD   .C000441
5215            .WORD   XHIGH109
5216   ;                                                                         07190011
5217   .MFFDIV  SET     1
5218            JSR     .FFDIV
5219            .BYTE   0
5220            .WORD   PPR11109,TPR11109
5221            .WORD   X1111109
5222   ;        N=1                                                              07200011
5223            LDA     #0
5224            STA     N111109
5225            LDA     #1
5226            STA     N111109+1
5227   ;    10 Y=FCNBWR(X,S1,S2,S3,CR,GAMMR,TPR,PPR)                             07210011
5228   .L000442 EQU     *
5229            LDA     #PPR11109 MOD .M
5230            STA     FCNBWR.8
5231            LDA     #PPR11109/256
5232            STA     FCNBWR.8+1
5233            LDA     #TPR11109 MOD .M
5234            STA     FCNBWR.7
5235            LDA     #TPR11109/256
5236            STA     FCNBWR.7+1
5237            LDA     #GAMMR109 MOD .M
5238            STA     FCNBWR.6
5239            LDA     #GAMMR109/256
5240            STA     FCNBWR.6+1
5241            LDA     #CR111109 MOD .M
5242            STA     FCNBWR.5
5243            LDA     #CR111109/256
5244            STA     FCNBWR.5+1
5245            LDA     #S3111109 MOD .M
5246            STA     FCNBWR.4
5247            LDA     #S3111109/256
5248            STA     FCNBWR.4+1
5249            LDA     #S2111109 MOD .M
5250            STA     FCNBWR.3
5251            LDA     #S2111109/256
5252            STA     FCNBWR.3+1
5253            LDA     #S1111109 MOD .M
5254            STA     FCNBWR.2
5255            LDA     #S1111109/256
5256            STA     FCNBWR.2+1
5257            LDA     #X1111109 MOD .M
5258            STA     FCNBWR.1
5259            LDA     #X1111109/256
5260            STA     FCNBWR.1+1
5261            LDA     #.T000424 MOD .M
5262            STA     FCNBWR.0
5263            LDA     #.T000424/256
5264            STA     FCNBWR.0+1
5265            JSR     FCNBWR
5266   .MFLTASG SET     1
5267            JSR     .FLTASGN
5268            .BYTE   0
5269            .WORD   .T000424
5270            .WORD   Y1111109                                                 07220011
5271   ;       IF(Y.LT.0.0)XHIGH=X
5272   .MFFLT   SET     1
5273            JSR     .FFLT
```

```
5274                .BYTE 0
5275                .WORD YIIII109,.C000443
5276                ASL   A
5277                BCS   *+5
5278                JMP   .L000444
5279    .MFLTASG SET 1
5280                JSR   .FLTASGN
5281                .BYTE 0
5282                .WORD XIIII109
5283                .WORD XHIGHI09
5284    .L000444 EQU  *
5285    ;           IF(Y.GT.0.0)XLOW=X                                              07230011
5286    .MFFGT   SET  1
5287                JSR   .FFGT
5288                .BYTE 0
5289                .WORD YIIII109,.C000445
5290                ASL   A
5291                BCS   *+5
5292                JMP   .L000446
5293    .MFLTASG SET  1
5294                JSR   .FLTASGN
5295                .BYTE 0
5296                .WORD XIIII109
5297                .WORD XLOWII09
5298    .L000446 EQU  *
5299    ;           X=(XHIGH+XLOW)/2.0                                              07240011
5300    .MFFADD  SET  1
5301                JSR   .FFADD
5302                .BYTE 0
5303                .WORD XHIGHI09,XLOWII09
5304                .WORD .T000424
5305    .MFFDIV  SET  1
5306                JSR   .FFDIV
5307                .BYTE 0
5308                .WORD .T000424,.C000447
5309                .WORD XIIII109
5310    ;           V=ABS(Y)                                                        07250011
5311                LDA   #YIIII109 MOD .M
5312                STA   ABS.0001
5313                LDA   #YIIII109/256
5314                STA   ABS.0001+1
5315                LDA   #.T000424 MOD .M
5316                STA   ABS.0000
5317                LDA   #.T000424/256
5318                STA   ABS.0000+1
5319                JSR   ABS
5320    .MFLTASG SET  1
5321                JSR   .FLTASGN
5322                .BYTE 0
5323                .WORD .T000424
5324                .WORD VIIII109
5325    ;           IF(V.LE.TOL)GO TO 20                                            07260011
5326    .MFFLE   SET  1
5327                JSR   .FFLE
5328                .BYTE 0
5329                .WORD VIIII109,-TOLII109
5330                ASL   A
5331                BCS   *+5
5332                JMP   .L000448
5333                JMP   .L000449
5334    .L000448 EQU  *
5335    ;           R=XHIGH-XLOW                                                    07270011
5336    .MFFSUB  SET  1
5337                JSR   .FFSUB
5338                .BYTE 0
5339                .WORD XHIGHI09,XLOWII09
5340                .WORD RIIII109
5341    ;           R=ABS(R)                                                        07280011
5342                LDA   #RIIII109 MOD .M
5343                STA   ABS.0001
5344                LDA   #RIIII109/256
5345                STA   ABS.0001+1
5346                LDA   #.T000424 MOD .M
5347                STA   ABS.0000
5348                LDA   #.T000424/256
5349                STA   ABS.0000+1
5350                JSR   ABS
5351    .MFLTASG SET  1
```

```
5352            JSR     .FLTASGN
5353            .BYTE   0
5354            .WORD   .T000424
5355            .WORD   R1111109
5356    ;       R=R/X                                                           07290011
5357    .MFFDIV SET     1
5358            JSR     .FFDIV
5359            .BYTE   0
5360            .WORD   R1111109,X1111109
5361            .WORD   R1111109
5362    ;       IF(R.LT.0.001)GO TO 20                                          07300011
5363    .MFFLT  SET     1
5364            JSR     .FFLT
5365            .BYTE   0
5366            .WORD   R1111109,.C000450
5367            ASL     A
5368            BCS     *+5
5369            JMP     .L000451
5370            JMP     .L000449
5371    .L000451 EQU    *
5372    ;       N=N+1                                                           07310011
5373            LDA     N1111109+1
5374            CLC
5375            ADC     #1
5376            STA     N1111109+1
5377            LDA     N1111109
5378            ADC     #0
5379            STA     N1111109
5380    ;       IF(N.GT.201)GO TO 20                                            07320012
5381            LDA     #201
5382            CMP     N1111109+1
5383            LDA     #0
5384            SBC     N1111109
5385            BMI     .L000454
5386            JMP     .L000453
5387    .L000454 EQU    *
5388            JMP     .L000449
5389    .L000453 EQU    *
5390    ;       GO TO 10                                                        07330011
5391            JMP     .L000442
5392    ;    20 CONTINUE                                                        07340011
5393    .L000449 EQU    *
5394    ; C     CALCULATE RHOGAS, X=1/VPR   T-H-P EQN.7  RM=10.73=RMOLAR,       07350024
5395    ;                                                                       07360024
5396    ; C     28.9=POUND MOLAR WT. OF AIR, WT=POUND MOLAR WT. OF GAS.         07370011
5397    .MFFMUL SET     1
5398            JSR     .FFMUL
5399            .BYTE   0
5400            .WORD   PPC11109,X1111109
5401            .WORD   .T000431
5402    .MFFMUL SET     1
5403            JSR     .FFMUL
5404            .BYTE   0
5405            .WORD   RM111109,TPC11109
5406            .WORD   .T000424
5407    .MFFDIV SET     1
5408            JSR     .FFDIV
5409            .BYTE   0
5410            .WORD   .T000424,.T000431
5411            .WORD   VMOLAR09
5412    ;                                                                       07380011
5413    .MFFMUL SET     1
5414            JSR     .FFMUL
5415            .BYTE   0
5416            .WORD   .C000455,-GASGRV09
5417            .WORD   WT111109
5418    ;       RHO=WT/VMOLAR                                                   07390018
5419    ; C     RHO IN LB./FT**3,  RHOGAS IN GM./CM**3                          07400011
5420    .MFFDIV SET     1
5421            JSR     .FFDIV
5422            .BYTE   0
5423            .WORD   WT111109,VMOLAR09
5424            .WORD   RHO11109
5425    ;                                                                       07410011
5426    ; C     CALCULATE ISOTHERMAL KGAS=KISOGS                                07420024
5427    .MFFMUL SET     1
5428            JSR     .FFMUL
5429            .BYTE   0
5430            .WORD   RHO11109,.C000456
```

```
5431              .WORD -RHOGAS09
5432        ;     X2=X*X                                                    07430011
5433     .MFFMUL  SET    1
5434              JSR    .FFMUL
5435              .BYTE  0
5436              .WORD  X1111109,X1111109
5437              .WORD  X2111109
5438        ;     X3=X2*X                                                   07440011
5439     .MFFMUL  SET    1
5440              JSR    .FFMUL
5441              .BYTE  0
5442              .WORD  X2111109,X1111109
5443              .WORD  X3111109
5444        ;     X4=X3*X                                                   07450011
5445     .MFFMUL  SET    1
5446              JSR    .FFMUL
5447              .BYTE  0
5448              .WORD  X3111109,X1111109
5449              .WORD  X4111109
5450        ;     X5=X4*X                                                   07460011
5451     .MFFMUL  SET    1
5452              JSR    .FFMUL
5453              .BYTE  0
5454              .WORD  X4111109,X1111109
5455              .WORD  X5111109
5456        ;     X6=X5*X                                                   07470011
5457     .MFFMUL  SET    1
5458              JSR    .FFMUL
5459              .BYTE  0
5460              .WORD  X5111109,X1111109
5461              .WORD  X6111109
5462        ;     X7=X6*X                                                   07480011
5463     .MFFMUL  SET    1
5464              JSR    .FFMUL
5465              .BYTE  0
5466              .WORD  X6111109,X1111109
5467              .WORD  X7111109
5468        ;                                                               07490011
5469     .MFFMUL  SET    1
5470              JSR    .FFMUL
5471              .BYTE  0
5472              .WORD  .C000457,S1111109
5473              .WORD  .T000431
5474     .MFFMUL  SET    1
5475              JSR    .FFMUL
5476              .BYTE  0
5477              .WORD  .T000431,X2111109
5478              .WORD  .T000438
5479     .MFFMUL  SET    1
5480              JSR    .FFMUL
5481              .BYTE  0
5482              .WORD  X1111109,TPR11109
5483              .WORD  .T000424
5484     .MFFMUL  SET    1
5485              JSR    .FFMUL
5486              .BYTE  0
5487              .WORD  .C000458,S2111109
5488              .WORD  .T000439
5489     .MFFMUL  SET    1
5490              JSR    .FFMUL
5491              .BYTE  0
5492              .WORD  .T000439,X3111109
5493              .WORD  .T000459
5494     .MFFADD  SET    1
5495              JSR    .FFADD
5496              .BYTE  0
5497              .WORD  .T000424,.T000438
5498              .WORD  .T000431
5499     .MFFMUL  SET    1
5500              JSR    .FFMUL
5501              .BYTE  0
5502              .WORD  .C000460,S3111109
5503              .WORD  .T000438
5504     .MFFMUL  SET    1
5505              JSR    .FFMUL
5506              .BYTE  0
5507              .WORD  .T000438,X6111109
5508              .WORD  .T000439
5509     .MFFADD  SET    1
```

```
5510            JSR     .FFADD
5511            .BYTE   0
5512            .WORD   .T000431,.T000459
5513            .WORD   .T000424
5514   .MFFADD  SET     1
5515            JSR     .FFADD
5516            .BYTE   0
5517            .WORD   .T000424,.T000439
5518            .WORD   T1111109
5519   !                                                                           07500039
5520   .MFFMUL  SET     1
5521            JSR     .FFMUL
5522            .BYTE   0
5523            .WORD   GAMMR109,GAMMR109
5524            .WORD   .T000431
5525   .MFFMUL  SET     1
5526            JSR     .FFMUL
5527            .BYTE   0
5528            .WORD   .C000461,X7111109
5529            .WORD   .T000424
5530   .MFFMUL  SET     1
5531            JSR     .FFMUL
5532            .BYTE   0
5533            .WORD   .C000462,X5111109
5534            .WORD   .T000439
5535   .MFFMUL  SET     1
5536            JSR     .FFMUL
5537            .BYTE   0
5538            .WORD   .T000439,GAMMR109
5539            .WORD   .T000459
5540   .MFFMUL  SET     1
5541            JSR     .FFMUL
5542            .BYTE   0
5543            .WORD   .T000424,.T000431
5544            .WORD   .T000438
5545   .MFFMUL  SET     1
5546            JSR     .FFMUL
5547            .BYTE   0
5548            .WORD   .C000463,X3111109
5549            .WORD   .T000431
5550   .MFFSUB  SET     1
5551            JSR     .FFSUB
5552            .BYTE   0
5553            .WORD   .T000438,.T000459
5554            .WORD   .T000424
5555   .MFFADD  SET     1
5556            JSR     .FFADD
5557            .BYTE   0
5558            .WORD   .T000424,.T000431
5559            .WORD   T2111109
5560   !                                                                           07510011
5561   .MFUNMIN SET     1
5562            JSR     .FUNMIN
5563            .BYTE   0
5564            .WORD   GAMMR109
5565            .WORD   .T000424
5566   .MFFMUL  SET     1
5567            JSR     .FFMUL
5568            .BYTE   0
5569            .WORD   .T000424,X2111109
5895   ! C  30 FORMAT(/5X,' IN SUBROUTINE GASMD2 THE DIAGNOSTIC QUANTITIES ARE08030041
5896   ! C.    *5X,' N=',I3,' X=',F10.3,' PPR=',F10.5,' VMOLAR=',F10.5,' WT=08040012
5897   ! C.    *F7.3,' TPR=',F10.5,'  IX=',I2 /5X,'                         08050041
5898                                                                               08060041
5899   .MFFMUL  SET     1
5900            JSR     .FFMUL
5901            .BYTE   0
5902            .WORD           KADGAS09
5903            .WORD   .T000438
5904   .MFFMUL  SET     1
5905            JSR     .FFMUL
5906            .BYTE   0
5907            .WORD   KISOGS09,.T000424
5908            .WORD   .T000431
5909   .MFFADD  SET     1
5910            JSR     .FFADD
5911            .BYTE   0
5912            .WORD   .T000431,.T000438
```

```
5913              .WORD  -KGAS1109
5914     ;        RETURN                                                08070011
5915              JMP    .R000418
5916     ;        END                                                   08080011
5917     .R000418 RTS
  18     ;                                                              08090011
  19     FCNBWR   EQU    *
  20     FCNBWR01 EQU    FCNBWR.0
  11     X1111101 EQU    FCNBWR.1
  12     S1111101 EQU    FCNBWR.2
  13     S2111101 EQU    FCNBWR.3
  14     S3111101 EQU    FCNBWR.4
  15     CR111101 EQU    FCNBWR.5
  16     GAMMR101 EQU    FCNBWR.6
  17     TPR11101 EQU    FCNBWR.7
  18     PPR11101 EQU    FCNBWR.8
  19
  20     ; C      R.J.RUNGE              COFRC.                         08100028
  21     ; C      BENEDICT-WEBB-RUBIN GAS LAW (BWR) CALCULATION IN X=1/VPR  08110011
  22     ; C      THOMAS,HANKINSON & PHILLIPS  EQN. (6) DEFINES FUNCTION.  08120011
  23     ;                                                              08130011
  24     .MFFMUL  SET    1
  25              JSR    .FFMUL
  26              .BYTE  0
  27              .WORD  -TPR11101,-TPR11101
  28              .WORD  TSQ11101
  29     ;                                                              08140011
  30     .MFFMUL  SET    1
  31              JSR    .FFMUL
  32              .BYTE  0
  33              .WORD  -X1111101,-X1111101
  34              .WORD  X2111101
  35     ;                                                              08150011
  36     .MFFMUL  SET    1
  37              JSR    .FFMUL
  38              .BYTE  0
  39              .WORD  X2111101,-X1111101
  40              .WORD  X3111101
  41     ;                                                              08160011
  42     .MFFMUL  SET    1
  43              JSR    .FFMUL
  44              .BYTE  0
  45              .WORD  X3111101,X3111101
  46              .WORD  X6111101
  47     ;                                                              08170011
  48     .MFFMUL  SET    1
  49              JSR    .FFMUL
  50              .BYTE  0
  51              .WORD  -X1111101,-TPR11101
  52              .WORD  .T000002
  53     .MFFMUL  SET    1
  54              JSR    .FFMUL
  55              .BYTE  0
  56              .WORD  -S1111101,X2111101
  57              .WORD  .T000007
  58     .MFFSUB  SET    1
  59              JSR    .FFSUB
  60              .BYTE  0
  61              .WORD  -PPR11101,.T000002
  62              .WORD  .T000006
  63     .MFFMUL  SET    1
  64              JSR    .FFMUL
  65              .BYTE  0
  66              .WORD  -S2111101,X3111101
  67              .WORD  .T000008
  68     .MFFSUB  SET    1
  69              JSR    .FFSUB
  70              .BYTE  0
  71              .WORD  .T000006,.T000007
  72              .WORD  .T000002
  73     .MFFMUL  SET    1
  74              JSR    .FFMUL
  75              .BYTE  0
  76              .WORD  -S3111101,X6111101
  77              .WORD  .T000007
  78     .MFFSUB  SET    1
  79              JSR    .FFSUB
  80              .BYTE  0
```

```
81              .WORD   .T000002,.T000008
82              .WORD   .T000006
83    .HFFSUB   SET     1
84              JSR     .FFSUB
85              .BYTE   0
86              .WORD   .T000006,.T000007
87              .WORD   T1111101
88    ;
89    .MFUNMIN  SET     1
90              JSR     .FUNMIN
91              .BYTE   0
92              .WORD   -GAMMR101
93              .WORD   .T000002
94    .MFFMUL   SET     1
95              JSR     .FFMUL
96              .BYTE   0
97              .WORD   .T000002,X2111101
98              .WORD   ARG11101
99    ;
100             LDA     #ARG11101 MOD .M
101             STA     EXP.0001
102             LDA     #ARG11101/256
103             STA     EXP.0001+1
104             LDA     #.T000006 MOD .M
105             STA     EXP.0000
106             LDA     #.T000006/256
107             STA     EXP.0000+1
108             JSR     EXP
109   .MFUNMIN  SET     1
110             JSR     .FUNMIN
111             .BYTE   0
112             .WORD   X3111101
113             .WORD   .T000002
114   .MFFMUL   SET     1
115             JSR     .FFMUL
116             .BYTE   0
117             .WORD   .T000002,.T000006
118             .WORD   .T000007
119   .MFFADD   SET     1
120             JSR     .FFADD
121             .BYTE   0
122             .WORD   .C000009,ARG11101
123             .WORD   .T000006
124   .MFFMUL   SET     1
125             JSR     .FFMUL
126             .BYTE   0
127             .WORD   .T000007,-CR111101
128             .WORD   .T000002
129   .MFFMUL   SET     1
130             JSR     .FFMUL
131             .BYTE   0
132             .WORD   .T000002,.T000006
133             .WORD   .T000007
134   .MFFDIV   SET     1
135             JSR     .FFDIV
136             .BYTE   0
137             .WORD   .T000007,TS011101
138             .WORD   T2111101
139   ;
140   .MFFADD   SET     1
141             JSR     .FFADD
142             .BYTE   0
143             .WORD   T1111101,T2111101
144             .WORD   -FCNBWR01
145   ;        RETURN
146             JMP     .R000001
147   ;        END
```

CONCLUSION

Diagnostic capability of the method of the present invention can be perhaps better illustrated by an example of actual use.

Seismic data were obtained in a field environment and are depicted in FIG. 7. The geologic section was limestone embedded in shale. The gas-related anomaly is located over the indicated area.

From well logging and geologic data, the method of the present invention was used to provide the synthetic depthogram of FIG. 8. Note the close similarity of relative amplitudes for the events of interest. From FIG. 8, it was determined that the area of interest was 70% gas-saturated. Field data affirmed the estimate.

From the above, it is apparent that the method of the present invention as described hereinbefore provides a geophysicist with a strong tool for determining amounts of gas/oil-filled reservoirs in a variety of structural combinations, e.g., in sand, limestone, etc. However, the invention is not limited to the above structural combinations but is applicable to other anomalous circumstances as known to those skilled in the art. E.g., while the above presentations were directed in the most part to creating synthetic gas/oil-indicating characteristics for sandstones, limestone or dolostone at different saturations, other strata can be used. It should thus be understood that the invention is not limited to any specific embodiments set forth herein, as variations are readily apparent, and thus the invention is to be given the broadest possible interpretation within the terms of the following claims.

What is claimed is:

1. System for resolving event characteristics of a seismic record so as to determine gas/oil fractions in a selected zone of an earth formation by creating synthetic gas/oil-indicating characteristics from brine-saturated petrophysical parameters corresponding to each selected zone of interest, and comparing such characteristics with said record comprising:
   (A) Means for obtaining said seismic record for at least said selected zone;
   (B) Means for determining actual compressional velocity and density values of said zone of interest based on field information associated with a known zonal lithology selected from a group comprising sandstone, limestone and dolostone;
   (C) A programmable digital computer for:
      (i) from the parameters of (B), generating a brine-saturated P-wave modulus value corresponding to said zone of interest;
      (ii) from said generated brine-saturated P-wave modulus value of (i), predicting compressional velocities of said zone with gas/oil in differing amounts present in said zone, in accordance with the relationship $$V_p = 1/\rho_b \hat{K}_a + \frac{(1 - \hat{K}_a/K_m)^2}{\phi K_f + (1 - \phi)/K_m - K_a/K_m^2} + (4/3)\hat{G}^{*\frac{1}{2}}$$

where rho-b is the bulk density, $\phi$ is the porosity, $G^*$ is the shear modulus at the saturations of interest, Kf equals the bulk modulus for the liquid-gas mixture, Ka is the frame modulus, Km is the bulk modulus of a hypothetical rock, i.e., same composition but perfectly cemented with zero porosity;
      (iii) from seismic velocities of (B), predicting synthetic seismic amplitude information with gas/oil present in said zone in differing amounts; and
      (iv) comparing said predicted amplitude information with actual field-acquired amplitude data associated with said seismic record of (A) so as to determine both presence and amounts of gas/oil within said zone of interest.

2. System of claim 1 in which (ii) is further characterized by:
simultaneously solving through iteration the following equations:

$$\rho_B V_p^2 = P^* = K^* + (4/3)G^* \quad (1)$$

$$(K^* - K_a)/K_m = K_{fc}/K_m = b - a = \quad (2)$$

$$\frac{(1-a)^2}{f\phi + (1-a)} = \frac{(1-b)^2}{f\phi - (1-b)} \quad$$

$$a - q = f_3(c, a + g) \quad (3)$$

to provide estimations of Ka and $G^*$ as a function of fluid saturation, where:
rho-b is the bulk density of the zone of interest,
Vp is the compressional velocity,
$P^*$ is the P-wave modulus at said saturations of interest,
$K^*$ is the bulk modulus at said saturations of interest,
$G^*$ is the shear modulus at said saturations of interest,
Ka and Ga are frame moduli,
Kfc is the fluid correction equal to $K^* - Ka$,
Km and Gm are the bulk and shear moduli of a hypothetical rock (i.e., same composition but perfectly cemented with zero porosity),
$\phi$ = porosity
a = Ka/Km
b = K*/Km
g = G*/Gm = Ga/Gm
f = (Km/Kf) − 1
C is an empirical parameter and
f3 describes a functional operator which relates to the variables of interest of Equation (3).

3. System of claim 2 in which said iteration involves:
(i)' predicting brine-saturated bulk and shear moduli (Kw* and Gw*) using empirical equations containing coefficients and a P-wave modulus value (Pw*), said coefficients varying in empirical fashion as a function of at least porosity, pressure and temperature, said P-wave modulus value (Pw*) being a P-wave modulus value for a brine-saturated rock which corresponds to said zone of interest based on well logging geologic data, said shear modulus value Gw* being equal to Ggas/oil* where Ggas/oil* is the shear modulus of said zone with gas/oil present;
(ii)' estimating frame modulus values (Ka) of said zone of interest using a relationship involving Kw*, Kb, Km and $\phi$, where Kw* is brine-saturated bulk density of the aggregate, Kb is the bulk modulus of brine, and Km is the bulk modulus of the solid material making up the zone of interest and $\phi$ is porosity.

4. Method for resolving event characteristics of a seismic record so as to determine gas/oil fractions in a selected zone of an earth formation by creating synthetic gas/oil-indicating characteristics from brine-saturated petrophysical parameters corresponding to each selected zone of interest, and comparing such characteristics with said record comprising the steps of:
   (a) obtaining said seismic record for at least said selected zone by field measurement;
   (b) determining actual compressional velocity and density values of said zone of interest based on field information associated with a known zonal lithology selected from a group comprising sandstone, limestone and dolostone;
   (c) from the parameters of (b), generating a brine-saturated P-wave modulus value corresponding to said zone of interest;
   (d) from said brine-saturated P-wave modulus value of (c), predicting P-wave moduli of said zone with gas/oil in differing amounts present in said zone, in accordance with the relationship $$\hat{P}^*_{gas/oil} = \hat{K}^*_{gas/oil} + (4/3)\hat{G}_w^*$$

where Pgas/oil* is the predicted P-wave modulus with gas/oil present in predetermined amounts;

Kgas/oil* is the predicted bulk modulus of said zone with gas/oil present in said predetermined amounts;

GW* is the brine-saturated shear modulus of said zone;

(e) from seismic velocities of said zone calculated from step (d), predicting synthetic seismic values associated with different gas/oil fractions present in said zone; and (f) comparing said synthetic seismic values with actual field-acquired values associated with said seismic record of (a) so as to determine both presence and amounts of gas/oil within said zone of interest.

5. Method of claim 4 in which said synthetic seismic values are estimated amplitude values determined in accordance with $$Ar = \frac{V_2 d_2 - V_1 d_1}{V_2 d_2 + V_1 d_1} Ai$$

where Ar is the amplitude from the reflected signal at said zone of interest and Ai is the amplitude of the incident signal; $V_1$ is the compressional velocity of the wave in an overlying medium 1; $V_2$ *is the compressional velocity in the zone of interest below the contact line;* $d_1$ is the density of the overlying medium 1; and $d_2$ is the density of the underlying medium 2.

6. Method for resolving event characteristics of a seismic record so as to determine gas/oil fractions in a selected zone of an earth formation by creating synthetic gas/oil-indicating characteristics from brine-saturated petrophysical parameters corresponding to each selected zone of interest, and comparing such characteristics with said record comprising the steps of:

(a) obtaining said seismic record for at least said selected zone by field measurement;

(b) determining actual compressional velocity and density values of said zone of interest based on field information associated with a known zonal lithology selected from a group comprising sandstone, limestone and dolostone;

(c) from brine-saturated P-wave modulus values corresponding to said zone of interest generated using the values of (b), predicting velocities of said zone as a function of gas/oil in differing amounts in said zone, in accordance with the relationship $$V_p = 1/\rho_b \hat{K}_a + \frac{(1 - \hat{K}_a/K_m)^2}{\phi K_f + (1 - \phi)/K_m - K_a/K_m^2} + (4/3)\hat{G}^*$$

where rho-b is the bulk density, $\phi$ is the porosity, G* is the shear modulus at the saturations of interest, Ka is the frame modulus, Kf equals the bulk modulus for the liquid-gas mixture, Km is the bulk modulus of a hypothetical rock, i.e., same composition but perfectly cemented with zero porosity;

(d) from velocities of said zone calculated from step (c), predicting synthetic amplitude information with gas/oil present in said zone; and (e) comparing said predicted amplitude information with gas/oil present with actual field-acquired amplitude data associated with said seismic record of (a) so as to determine both presence and amounts of gas/oil within said zone of interest.

7. Method of claim 6 in which step (c) is further characterized by: simultaneously solving through iteration the following equations:

$$\rho_B V_p^2 = P^* = K^* + (4/3)G^* \tag{1}$$

$$(K^* - K_a)/K_m = K_{fc}/K_m = b - a = \tag{2}$$

$$\frac{(1-a)^2}{f\phi + (1-a)} = \frac{(1-b)^2}{f\phi - (1-b)}$$

$$a - q = f_3(c, a + g) \tag{3}$$

to provide estimations of Ka and G* as a function of fluid saturation, where:

rho-b is the bulk density of the zone of interest,

Vp is the compressional velocity,

P* is the P-wave modulus at said saturations of interest,

K* is the bulk modulus at said saturations of interest,

G* is the shear modulus at said saturations of interest,

Ka and Ga are the frame moduli,

Kfc is the fluid correction equal to K*−Ka,

Km and Gm are the bulk and shear moduli of a hypothetical rock (i.e., same composition but perfectly cemented with zero porosity), $\phi$ = porosity a = Ka/Km b = K*/Km g = G*/Gm = Ga/Gm f = (Km/Kf) − 1

C is an empirical parameter, and $f_3$ describes a functional operation which relates the variables of Equation (3).

8. Method of claim 7 in which said K* of said iteration comprising a gas modulus component (Kg*) and oil bulk modulus (Koil*) at selected saturations and gravities, and whose saturations vary in accordance with Soil+Sgas<1.0.

9. Method of claim 8 in which said gas bulk modulus component (Kg*) is calculated under the isothermal form of Benedict-Webb-Rubin in accordance with the equation $$K_g^* = K_{g\,pr}^* P_{pc} = \left[ \chi \frac{\partial P_{pr}}{\partial \chi} = \chi T_{pr} + 2S_1\chi^2 + 3S_2\chi^3 + 6S_3\chi^6 + \right.$$

$$\left. C_r e^{-\gamma r} (\chi^2 2\gamma_1^r \chi^2 - 7\gamma\chi^5 + 3\chi^3)/T_{pr}^2 \right]$$

where:

(i) Kg*pr is the pseudo-reduced bulk modulus equal to the first term of the above equation in which X is the reciprocal of the pseudo-reduced volume, Tpr is the pseudo temperature, Cr and gamma-r are coefficients and $S_1$ and $S_2$ are functions of Tr and $S_3$ is a function of gamma-r; and (ii) Ppc is the pseudo-critical pressure which varies as a function of gas gravity (gamma).

10. Method of claim 8 in which said oil bulk modulus Koil* is calculated in accordance with the equation Koil* = 36 Poil − 19.6 = 141.5/gamma-oil + 131.5 where Poil is the oil density and gamma-oil is the oil gravity (API).

* * * * *